United States Patent
Ericson et al.

(10) Patent No.: US 12,032,804 B1
(45) Date of Patent: Jul. 9, 2024

(54) USING REFINEMENT WIDGETS FOR DATA FIELDS REFERENCED BY NATURAL LANGUAGE EXPRESSIONS IN A DATA VISUALIZATION USER INTERFACE

(71) Applicant: Tableau Software, Inc., Seattle, WA (US)

(72) Inventors: Jeffrey Ericson, Menlo Park, CA (US); Vidya Raghavan Setlur, Portola Valley, CA (US); Alex Djalali, Los Gatos, CA (US); Hao Zhuang, Vancouver (CA); Christopher Shawn Suley, Santa Clara, CA (US); Suyang Duan, Vancouver (CA); Eliana Leite Goldner, Vancouver (CA)

(73) Assignee: Tableau Software, Inc., Seattle, WA (US)

( * ) Notice: Subject to any disclaimer, the term of this patent is extended or adjusted under 35 U.S.C. 154(b) by 146 days.

(21) Appl. No.: 16/680,431

(22) Filed: Nov. 11, 2019

Related U.S. Application Data

(60) Provisional application No. 62/897,187, filed on Sep. 6, 2019.

(51) Int. Cl.
  *G06F 16/248* (2019.01)
  *G06F 3/0482* (2013.01)
  (Continued)

(52) U.S. Cl.
  CPC .......... *G06F 3/0482* (2013.01); *G06F 40/166* (2020.01); *G06F 40/30* (2020.01)

(58) Field of Classification Search
  None
  See application file for complete search history.

(56) References Cited

U.S. PATENT DOCUMENTS 7,019,749 B2  3/2006  Guo et al.
7,089,266 B2  8/2006  Stolte et al.
(Continued)

FOREIGN PATENT DOCUMENTS

WO  WO2018/204696 A1  11/2018

OTHER PUBLICATIONS

Merriam-Webster's Collegiate Dictionary 327 (11th ed. 2012).*
(Continued)

*Primary Examiner* — Matthew Ell
*Assistant Examiner* — Samuel Shen
(74) *Attorney, Agent, or Firm* — Morgan, Lewis & Bockius LLP

(57) ABSTRACT

A method executes at a computing device that includes a display, one or more processors, and memory. The device displays a data visualization based on a dataset retrieved from a database. The device also displays one or more first phrases in a first region. The first phrases define the data visualization. The device receives a first user input in a second region to specify a natural language command related to the displayed data visualization. In response to the first user input, the device displays one or more proposed actions. The device receives user selection of a first proposed action of the proposed actions. In response to the user selection, the device generates an updated data visualization. The device displays the updated data visualization and displays a plurality of second phrases in the first region. The second phrases define the updated data visualization.

23 Claims, 42 Drawing Sheets

(51) Int. Cl.
*G06F 3/04842* (2022.01)
*G06F 40/166* (2020.01)
*G06F 40/30* (2020.01)

(56) References Cited

U.S. PATENT DOCUMENTS

| | | | |
|---|---|---|---|
| 7,391,421 | B2 | 6/2008 | Guo et al. |
| 7,606,714 | B2 | 10/2009 | Williams et al. |
| 7,716,173 | B2 | 5/2010 | Stolte et al. |
| 8,321,465 | B2 | 11/2012 | Farber et al. |
| 8,489,641 | B1 | 7/2013 | Seefeld et al. |
| 8,713,072 | B2 | 4/2014 | Stolte et al. |
| 8,972,457 | B2 | 3/2015 | Stolte et al. |
| 9,183,235 | B2 | 11/2015 | Stolte et al. |
| 9,244,971 | B1 | 1/2016 | Kalki |
| 9,477,752 | B1 | 10/2016 | Romano |
| 9,501,585 | B1 | 11/2016 | Gautam et al. |
| 9,575,720 | B2 * | 2/2017 | Faaborg ............... G06F 3/04817 |
| 9,794,613 | B2 | 10/2017 | Jang et al. |
| 9,858,292 | B1 | 1/2018 | Setlur et al. |
| 9,953,645 | B2 | 4/2018 | Bak et al. |
| 11,132,492 | B2 | 9/2021 | Bouton |
| 2004/0030741 | A1 | 2/2004 | Wolton et al. |
| 2004/0039564 | A1 | 2/2004 | Mueller |
| 2004/0073565 | A1 | 4/2004 | Kaufman et al. |
| 2004/0114258 | A1 | 6/2004 | Harris, III et al. |
| 2005/0015364 | A1 | 1/2005 | Gupta et al. |
| 2006/0021840 | A1 | 2/2006 | Kimes et al. |
| 2006/0218140 | A1 | 9/2006 | Whitney et al. |
| 2006/0259394 | A1 | 11/2006 | Cushing et al. |
| 2006/0259775 | A2 | 11/2006 | Oliphant |
| 2007/0174350 | A1 | 7/2007 | Pell et al. |
| 2007/0179939 | A1 | 8/2007 | O'Neil et al. |
| 2008/0046462 | A1 | 2/2008 | Kaufman et al. |
| 2009/0171924 | A1 | 7/2009 | Nash et al. |
| 2009/0299990 | A1 | 12/2009 | Setlur et al. |
| 2009/0313576 | A1 * | 12/2009 | Neumann ............... G06T 11/206 715/783 |
| 2009/0319172 | A1 | 12/2009 | Almeida et al. |
| 2010/0030552 | A1 | 2/2010 | Chen et al. |
| 2010/0110076 | A1 | 5/2010 | Hao et al. |
| 2010/0313164 | A1 | 12/2010 | Louch et al. |
| 2011/0066972 | A1 | 3/2011 | Sugiura |
| 2011/0191303 | A1 | 8/2011 | Kaufman et al. |
| 2012/0047134 | A1 | 2/2012 | Hansson et al. |
| 2012/0179713 | A1 | 7/2012 | Stolte et al. |
| 2013/0031126 | A1 | 1/2013 | Setlur |
| 2013/0055097 | A1 | 2/2013 | Soroca et al. |
| 2014/0189548 | A1 | 7/2014 | Werner |
| 2014/0192140 | A1 | 7/2014 | Peevers et al. |
| 2015/0019216 | A1 | 1/2015 | Singh et al. |
| 2015/0026153 | A1 * | 1/2015 | Gupta ............... G06F 16/3329 707/711 |
| 2015/0026609 | A1 | 1/2015 | Kim |
| 2015/0058318 | A1 | 2/2015 | Blackwell et al. |
| 2015/0095365 | A1 | 4/2015 | Olenick et al. |
| 2015/0123999 | A1 | 5/2015 | Ofstad et al. |
| 2015/0269175 | A1 | 9/2015 | Espenshade et al. |
| 2015/0310855 | A1 | 10/2015 | Bak et al. |
| 2015/0379989 | A1 | 12/2015 | Balasubramanian et al. |
| 2016/0070430 | A1 | 3/2016 | Kim et al. |
| 2016/0070451 | A1 | 3/2016 | Kim et al. |
| 2016/0103886 | A1 | 4/2016 | Prophete et al. |
| 2016/0188539 | A1 | 6/2016 | Parker et al. |
| 2016/0261675 | A1 | 9/2016 | Block et al. |
| 2016/0283588 | A1 | 9/2016 | Katae |
| 2016/0335180 | A1 | 11/2016 | Teodorescu et al. |
| 2016/0378725 | A1 | 12/2016 | Marchsreiter |
| 2017/0083615 | A1 | 3/2017 | Boguraev et al. |
| 2017/0285931 | A1 * | 10/2017 | Duhon ............... G06F 40/171 |
| 2017/0357625 | A1 | 12/2017 | Carpenter et al. |
| 2018/0108359 | A9 | 4/2018 | Gunn et al. |
| 2018/0114190 | A1 | 4/2018 | Borrel et al. |
| 2018/0121618 | A1 | 5/2018 | Smith et al. |
| 2018/0181608 | A1 | 6/2018 | Wu et al. |
| 2019/0034429 | A1 | 1/2019 | Das et al. |
| 2019/0065456 | A1 * | 2/2019 | Platow ............... G06F 3/0482 |
| 2019/0205442 | A1 | 7/2019 | Vasudev et al. |
| 2019/0272296 | A1 | 9/2019 | Prakash et al. |
| 2019/0362009 | A1 | 11/2019 | Miseldine et al. |
| 2020/0012638 | A1 * | 1/2020 | Luo ............... G06F 16/243 |
| 2020/0065769 | A1 | 2/2020 | Gupta et al. |
| 2020/0089700 | A1 | 3/2020 | Ericson et al. |
| 2020/0089760 | A1 | 3/2020 | Ericson et al. |
| 2020/0097494 | A1 | 3/2020 | Vertsel et al. |
| 2020/0274841 | A1 * | 8/2020 | Lee ............... H04L 51/14 |
| 2020/0293167 | A1 * | 9/2020 | Blyumen ............... G06F 16/245 |
| 2020/0301916 | A1 | 9/2020 | Nguyen et al. |
| 2021/0042308 | A1 | 2/2021 | Mustafi |
| 2021/0279805 | A1 * | 9/2021 | Elkan ............... G06N 5/04 |

OTHER PUBLICATIONS

Allen, J. Recognizing Intentions from Natural Language Utterances. In Computational Models of Discourse, M. Brady, Ed. M.I.T. Press, Cambridge, Massachusetts, 1982, 12 pgs.

Androutsopoulos, I., Ritchie, G. D., and Thanisch, P. Natural language interfaces to databases—an introduction. Natural Language Engineering 1, Mar. 16, 1995, 50 pgs.

Aurisano, J., Kumar, A., Gonzales, A., Reda, K., Leigh, J., Di Eugenio, B., and Johnson, A. Show me data? observational study of a conversational interface in visual data exploration. In Poster at IEEE VIS 2015, IEEE (2015), 2 pgs.

Bostock, M., Ogievetsky, V., and Heer, J. D3: Data-driven documents. IEEE Transactions on Visualization & Computer Graphics (Proc. Info Vis), Oct. 23, 2011, 9 pgs.

Carbonell, J. G., Boggs, W. M., Mauldin, M. L., and Anick, P. G. The xcalibur project, a natural language interface to expert systems and data bases, 1985, 5 pgs.

Cover, T. M., and Thomas, J. A. Elements of Information Theory. Wiley-Interscience, New York, NY, USA, 1991, 36 pgs.

Cox, K., Grinter, R. E., Hibino, S. L., Jagadeesan, L. J., and Mantilla, D. A multi-modal natural language interface to an information visualization environment. International Journal of Speech Technology 4, 3 (2001), 18 pgs.

Egenhofer, M. Spatial sql: A query and presentation language. IEEE Transactions on Knowledge and Data Engineering 6, 1 (1994), 12 pgs.

Finin, T., Joshi, A. K., and Webber, B. Natural language interactions with artificial experts. Proceedings of the IEEE 74, 7 (Jun. 1986), 19 pgs.

Frank, A. U., and Mark, D. M. Language issues for geographical information systems. In Geographical Information Systems: Principles and Applications, vol. 1, D. Maguire, M. Goodchild, and D. Rhind, Eds. Longman, London, 1991, 26 pgs.

Gao, T., Dontcheva, M., Adar, E., Liu, Z., and Karahalios, K. G. Datatone: Managing ambiguity in natural language interfaces for data visualization. In Proceedings of the 28th Annual ACM Symposium on User Interface Software Technology, UIST '15, ACM (New York, NY, USA, 2015), 12 pgs.

Grammel, L., Tory, M., and Storey, M. A. How information visualization novices construct visualizations. IEEE Transactions on Visualization and Computer Graphics 16, 6 (Nov. 2010), 10 pgs.

IBM Watson Analytics. http://www.ibm.com/analytics/watson-analytics/, downloaded on May 9, 2017, 6 pgs.

Kumar et al., "Towards a Dialogue System that Supports Rich Visualizations of Data," Proceeding of the Sigdual 2016 Conference, LA, USA, ACL, Sep. 13, 2016, pp. 304-209, Xp055496498.

Lawson, I-want-to-go moments: From search to store. https://www.thinkwithgoogle.com/articles/i-want-to-go-micro-moments.html, Apr. 2015, 7 pgs.

Li, F., and Jagadish, H. V. Constructing an interactive natural language interface for relational databases. Proc. VLDB Endow. 8, 1 (Sep. 2014), 12 pgs.

Microsoft Q & A. https://powerbi.microsoft.com/en-us/documentation/powerbi-service-q-and-a/, Mar. 14, 2017, 5 pgs.

(56) References Cited

OTHER PUBLICATIONS

Montello, D., Goodchild, M., Gottsegen, J., and Fohl, P. Where's downtown? behavioral methods for determining referents for vague spatial queries. Spatial Cognition and Computation 3, 2&3 (2003), 20 pgs.
NarrativeScience, Turn your data into better decisions with Quill, https://www.narrativescience.com/quill, downloaded on May 9, 2017, 12 pgs.
Ng, H. T., and Zelle, J. Corpus-based approaches to semantic interpretation in natural language processing. AI Magazine Winter 1997, (1997), 20 pgs.
Node.js®. https://nodejs.org/, downloaded on May 10, 2017, 1 pg.
Oviatt, S., and Cohen, P. Perceptual user interfaces: Multimodal interfaces that process what comes naturally, Commun. ACM 43, 3 (Mar. 2000), 9 pgs.
Parr, T. The Definitive ANTLR 4 Reference, 2nd ed. Pragmatic Bookshelf, 2013, 322 pgs.
Pedersen, T., Patwardhan, S., and Michelizzi, J. Wordnet::similarity: Measuring the relatedness of concepts. In Demonstration Papers at HLT-NAACL 2004, HLT-NAACL-Demonstrations '04, Association for Computational Linguistics (Stroudsburg, PA, USA, 2004), 2 pgs.
Popescu, A.-M., Etzioni, O., and Kautz, H. Towards a theory of natural language interfaces to databases. In Proceedings of the 8th International Conference on Intelligent User Interfaces, IUI '03, ACM (New York, NY, USA, 2003), 9 pgs.
Pustejovsky, J., Castaño, J., Ingria, R., Saurí, R., Gaizauskas, R., Setzer, A., and Katz, G. Timeml: Robust specification of vvont and temporal expressions in text. In in Fifth International Workshop on Computational Semantics (IWCS-5 (2003), 7 pgs.
Reinhart, T. Pragmatics and Linguistics: An Analysis of Sentence Topics. IU Linguistics Club publications. Reproduced by the Indiana University Linguistics Club, 1982, 5 pgs.
Setlur, Pre-Interview First Office Action dated Jul. 5, 2018, received in U.S. Appl. No. 15/486,265, 5 pgs.
Setlur, First Action Interview Office Action dated Aug. 29, 2018, received in U.S. Appl. No. 15/486,265, 6 pgs.
Setlur, Final Office Action dated Apr. 25, 2019, received in U.S. Appl. No. 15/486,265, 15 pgs.
Setlur, Notice of Allowance dated Sep. 16, 2019, received in U.S. Appl. No. 15/486,265, 13 pgs.
Setlur, Pre-Interview First Office Action dated Sep. 6, 2019, received in U.S. Appl. No. 15/804,991, 4 pgs.
Setlur, First Action Interview Office Action dated Oct. 29, 2019, received in U.S. Appl. No. 15/804,991, 6 pgs.
Setlur et al., Eviza: A Natural Language Interface for Visual Analysis, ACM Oct. 16, 2016, 13 pgs.
Sun, Y., L. J. J. A., and Di Eugenio, B. Articulate: Creating meaningful visualizations from natural language. In Innovative Approaches of Data Visualization and Visual Analytics, IGI Global, Hershey, PA (2014), 20 pgs.
Tableau, Communication Pursuant to Rules 161(1) and 162, EP18729514.2, Jun. 17, 2019, 3 pgs.
Tableau Software, Inc., International Searh Report and Written Opinion, PCT/US2018/030959, Sep. 14, 2018, 13 pgs.
Tableau Software, Inc., International Preliminary Report on Patentability, PCT/US2018/030959, Nov. 5, 2019, 11 pgs.
ThoughtSpot. Search-Driven Analytics for Humans, http://www.thoughtspot.com/, downloaded May 9, 2017, 9 pgs.
Turf: Advanced geospatial analysis for browsers and node. http://turfjs.org, downloaded May 9, 2017, 2 pgs.
Wikipedia, Extended Backus-Naur Form. https://en.wikipedia.org/wiki/Extended_Backus%E2%80%93Naur_Form, last edited on Jan. 7, 2017, 7 pgs.
Winograd, T. Procedures as a Representation for Data in a Computer Program for Understanding Natural Language, PHD thesis, Feb. 1971, 472 pgs.
WolframAlpha. Profesional-grade computational, https://www.wolframalpha.com/, downloaded May 9, 2017, 25 pgs.
Wu, Z., and Palmer, M. Verbs semantics and lexical selection. In Proceedings of the 32nd Annual Meeting on Association for Computational Linguistics, ACL '94, Association for Computational Linguistics (Stroudsburg, PA, USA, 1994), 6 pgs.
Setlur, Final Office Action, U.S. Appl. No. 15/804,991, dated Mar. 4, 2020, 14 pgs.
Setlur, Notice of Allowance, U.S. Appl. No. 15/804,991, dated Jul. 1, 2020, 15 pgs.
Setlur, Preinterview 1st Office Action, U.S. Appl. No. 15/978,062, dated Mar. 6, 2020, 4 pgs.
Setlur, Notice of Allowance, U.S. Appl. No. 15/978,062, dated May 29, 2020, 19 pgs.
Setlur, Office Action, U.S. Appl. No. 15/978,066, dated Mar. 18, 2020, 23 pgs.
Setlur, Final Office Action, U.S. Appl. No. 15/978,066, dated Aug. 19, 2020, 22 pgs.
Setlur, Office Action, U.S. Appl. No. 15/978,067, dated Feb. 21, 2020, 20 pgs.
Setlur, Final Office Action, U.S. Appl. No. 15/978,067, dated Aug. 5, 2020, 19 pgs.
Tableau, Extended European Search Report, EP18729514.2, dated Mar. 4, 2020, 4 pgs.
Atallah, Office Action, U.S. Appl. No. 17/063,663, dated Feb. 26, 2021, 19 pgs.
Ericson, Office Action, U.S. Appl. No. 16/134,907, dated May 13, 2020, 9 pgs.
Ericson, Office Action, U.S. Appl. No. 16/134,907, dated Nov. 12, 2020, 10 pgs.
Ericson, Office Action, U.S. Appl. No. 16/134,892, dated May 15, 2020, 10 pgs.
Ericson, Final Office Action, U.S. Appl. No. 16/134,892, dated Nov. 24, 2020, 11 pgs.
Ericson, Notice of Allowance, U.S. Appl. No. 16/134,892, dated Mar. 9, 2021, 11 pgs.
Hoque, Enamul et al., "Applying Pragmatics Principles for Interaction with Visual Analytics," IEEE Transaction of Visualization and Computer Graphics, IEEE Service Center, Los Alamitos, CA, vol. 24, No. 1, Jan. 1, 2018, 10 pgs.
Tableau Software Inc., International Search Report and Written Opinion, PCT/US2019/047892, Mar. 4, 2020, 24 pgs.
Atallah, Final Office Action, U.S. Appl. No. 17/063,663, dated Jul. 19, 2021, 20 pgs.
Ericson, Office Action, U.S. Appl. No. 16/601,437, dated Jun. 24, 2021, 15 pgs.
Arnold et al., On Suggesting Phrases vs. Predicting Words for Mobile Text Composition, UIST, 2016, pp. 603-608 (Year: 2016).
Atallah, Notice of Allowance, U.S. Appl. No. 17/063,663, Dec. 22, 2021, 11 pgs.
Atallah, Office Action, U.S. Appl. No. 17/026,113, Aug. 18, 2022, 11 pgs.
Atallah, Notice of Allowance, U.S. Appl. No. 17/026,113, Feb. 22, 2023, 8 pgs.
Atallah, Office Action, U.S. Appl. No. 17/719,319, Apr. 20, 2023, 15 pgs.
Atallah, Notice of Allowance, U.S. Appl. No. 17/719,319, Aug. 4, 2023, 11 pgs.
Ericson, Final Office Action, U.S. Appl. No. 16/601,437, Nov. 12, 2021, 17 pgs.
Ericson, Notice of Allowance, U.S. Appl. No. 16/601,437, May 2, 2022, 10 pgs.
Ericson, Notice of Allowance, U.S. Appl. No. 17/887,387, Jun 22, 2023, 10 pgs.
Goldner, Office Action, U.S. Appl. No. 16/681,754, Mar. 2, 2022, 11 pgs.
Goldner, Notice of Allowance, U.S. Appl. No. 16/681,754, Sep. 8, 2022, 16 pgs.
Maxwell et al., "Large-scale Generative Query Autocompletion," Proceedings of the 22nd Australasian Document Computing Symposium, 2017, (Year: 2017), 8 pgs.

* cited by examiner

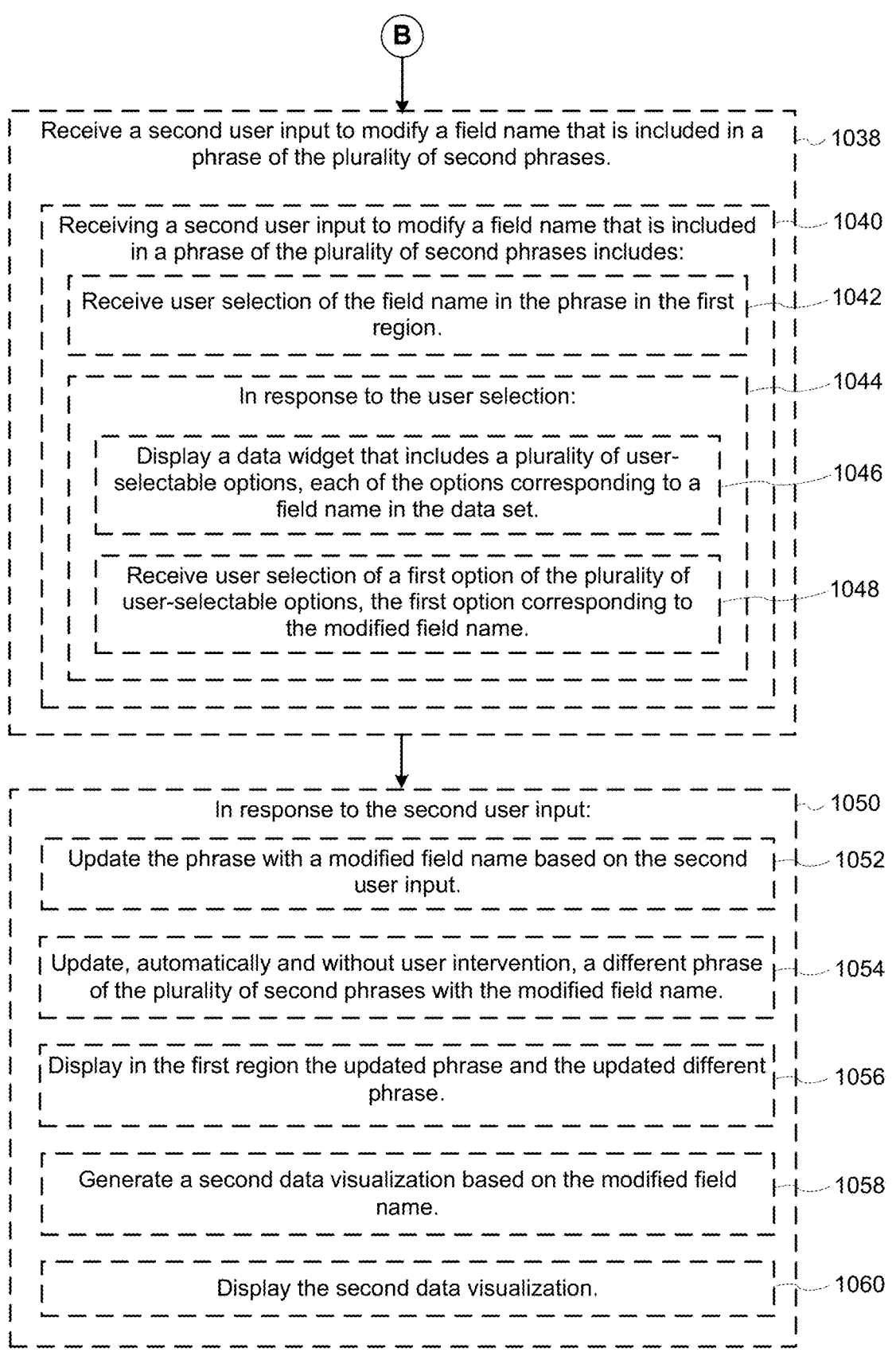

- 1038 Receive a second user input to modify a field name that is included in a phrase of the plurality of second phrases.
  - 1040 Receiving a second user input to modify a field name that is included in a phrase of the plurality of second phrases includes:
    - 1042 Receive user selection of the field name in the phrase in the first region.
    - 1044 In response to the user selection:
      - 1046 Display a data widget that includes a plurality of user-selectable options, each of the options corresponding to a field name in the data set.
      - 1048 Receive user selection of a first option of the plurality of user-selectable options, the first option corresponding to the modified field name.
- 1050 In response to the second user input:
  - 1052 Update the phrase with a modified field name based on the second user input.
  - 1054 Update, automatically and without user intervention, a different phrase of the plurality of second phrases with the modified field name.
  - 1056 Display in the first region the updated phrase and the updated different phrase.
  - 1058 Generate a second data visualization based on the modified field name.
  - 1060 Display the second data visualization.

Figure 10C

USING REFINEMENT WIDGETS FOR DATA FIELDS REFERENCED BY NATURAL LANGUAGE EXPRESSIONS IN A DATA VISUALIZATION USER INTERFACE

RELATED APPLICATIONS

This application claims priority to U.S. Provisional Application Ser. No. 62/897,187, filed Sep. 6, 2019, entitled "Interface Defaults for Vague Modifiers in Natural Language Interfaces for Visual Analysis," which is incorporated by reference herein in its entirety.

This application is related to the following applications, each of which is incorporated by reference herein in its entirety: (i) U.S. patent application Ser. No. 15/486,265, filed Apr. 12, 2017, entitled "Systems and Methods of Using Natural Language Processing for Visual Analysis of a Data Set"; (ii) U.S. patent application Ser. No. 15/804,991, filed Nov. 6, 2017, entitled "Systems and Methods of Using Natural Language Processing for Visual Analysis of a Data Set"; (iii) U.S. patent application Ser. No. 15/978,062, filed May 11, 2018, entitled "Applying Natural Language Pragmatics in a Data Visualization User Interface"; (iv) U.S. patent application Ser. No. 16/219,406, filed Dec. 13, 2018, entitled "Identifying Intent in Visual Analytical Conversations"; (v) U.S. patent application Ser. No. 16/134,892, filed Sep. 18, 2018, entitled "Analyzing Natural Language Expressions in a Data Visualization User Interface"; (vi) U.S. patent application Ser. No. 15/978,066, filed May 11, 2018, entitled "Data Visualization User Interface Using Cohesion of Sequential Natural Language Commands"; (vii) U.S. patent application Ser. No. 15/978,067, filed May 11, 2018, entitled "Updating Displayed Data Visualizations According to Identified Conversation Centers in Natural Language Commands"; (viii) U.S. patent application Ser. No. 16/166,125, filed Oct. 21, 2018, entitled "Determining Levels of Detail for Data Visualizations Using Natural Language Constructs"; (ix) U.S. patent application Ser. No. 16/134,907, filed Sep. 18, 2018, entitled "Natural Language Interface for Building Data Visualizations, Including Cascading Edits to Filter Expressions"; (x) U.S. patent application Ser. No. 16/234,470, filed Dec. 27, 2018, entitled "Analyzing Underspecified Natural Language Utterances in a Data Visualization User Interface"; and (xi) U.S. patent application Ser. No. 16/601,437, filed Oct. 14, 2019, titled "Incremental Updates to Natural Language Expressions in a Data Visualization User Interface".

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks.

SUMMARY

The use of natural language expressions to generate data visualizations provides a user with greater accessibility to data visualization features, including updating the fields and changing how the data is filtered. A natural language interface enables a user to develop valuable data visualizations with little or no training.

There is a need for improved systems and methods that support and refine natural language interactions with visual analytical systems. The present disclosure describes data visualization applications that provide more efficient methods and interfaces for manipulating and generating graphical views of data using natural language inputs. Such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

In accordance with some implementations, a method executes at a computing device that includes a display. The computing device includes one or more processors, and memory. The memory stores one or more programs configured for execution by the one or more processors. The method includes displaying a data visualization based on a dataset retrieved from a database. The method includes displaying one or more first phrases in a first region in proximity to the displayed data visualization. Each of the first phrases includes one or more first field names of data fields in the dataset. The first phrases define the data visualization. The method also receives a first user input in a second region, distinct from the first region, to specify a natural language command related to the displayed data visualization. In response to the first user input, the computing device displays one or more proposed actions. The computing device receives user selection of a first proposed action of the proposed actions. In response to the user selection, the computing device generates an updated data visualization. The computing device displays the updated data visualization and displays a plurality of second phrases in the first region. The plurality of second phrases include the first phrases and one or more additional phrases corresponding to the first proposed action. The second phrases define the updated data visualization.

In some implementations, the natural language command includes a command to sort data marks in the displayed data visualization.

In some instances, the one or more first phrases and the one or more additional phrases share a common field name.

In some instances, each of the additional phrases shares a second field name that is distinct from the one or more first field names.

In some instances, the additional phrases include: a first additional phrase to sort data fields by the second field name and a second additional phrase consisting of an expression to group the data fields by the second field.

In some instances, the method further comprises: receiving a second user input to modify a field name that is included in a phrase of the plurality of second phrases. In response to the second user input, the computing device updates the phrase with a modified field name based on the second user input and updates, automatically and without user intervention, a different phrase of the plurality of second phrases with the modified field name. The computing device displays in the first region the updated phrase and the updated different phrase. The computing device generates a second data visualization based on the modified field name and displays the second data visualization.

In some instances, receiving the second user input to modify the field name that is included in a phrase of the plurality of second phrases includes receiving user selection of the field name in the phrase in the first region. In response to the user selection, the computing device displays a data widget that includes a plurality of user-selectable options. Each of the options corresponds to a field name in the data set. The computing device receives user selection of a first option of the plurality of user-selectable options. The first option corresponds to the modified field name.

In some implementations, the method further comprises: receiving a user input in the second region to specify a natural language command related to removing a data field with a dimension data type. In response to the user input, the computing device removes from display in the second region at least two phrases of the plurality of second phrases, where each of the at least two phrases includes the data field with the dimension data type.

In some implementations, the method further comprises: receiving user input in the second region to specify a natural language command related to replacing a data field of the data visualization with a new data field. In response to the user input, the computing device identifies a subset of the plurality of second phrases that includes the data field. The computing device replaces the data field in each of the subset with the new data field. The computing device generates a third data visualization based on the new data field. The computing device further displays the third data visualization.

In some implementations, the natural language command includes a command to filter the displayed data visualization by a date field. The one or more additional phrases includes a phrase that comprises the date field and a first term corresponding to a time range.

In some instances, the method further comprises: receiving user selection of the first term in the first region. In response to the user selection, the computing device displays a date widget and displays in the date widget a range of dates corresponding to the time range.

In some instances, the range of dates include past dates.

In some instances, the range of dates includes future dates.

In some instances, the date widget includes a plurality of user-selectable time options, each of the options corresponding to a different range of dates.

In some instances, the plurality of user-selectable options include a first option having a predefined time range and a second option having a user-defined time range.

In some instances, the method further comprises: receiving user selection of a time option. In response to the user selection, the computing device displays in the date widget an updated range of dates corresponding to the time option.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 10A-10G provide a flowchart of a method for updating visual analysis of datasets according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices disclosed in the present specification improve upon data visualization methods by performing conversational operations that update an existing data visualization. The conversational operations add, remove, and/or replace phrases that define an existing data visualization and create modified data visualizations. Some methods and devices disclosed in the present specification also improve upon data visualization methods by automatically updating natural language inputs used to generate data visualizations. Such methods and devices improve user interaction with the natural language interface by providing quicker and easier incremental updates to natural language expressions in a data visualization.

Figure 1:
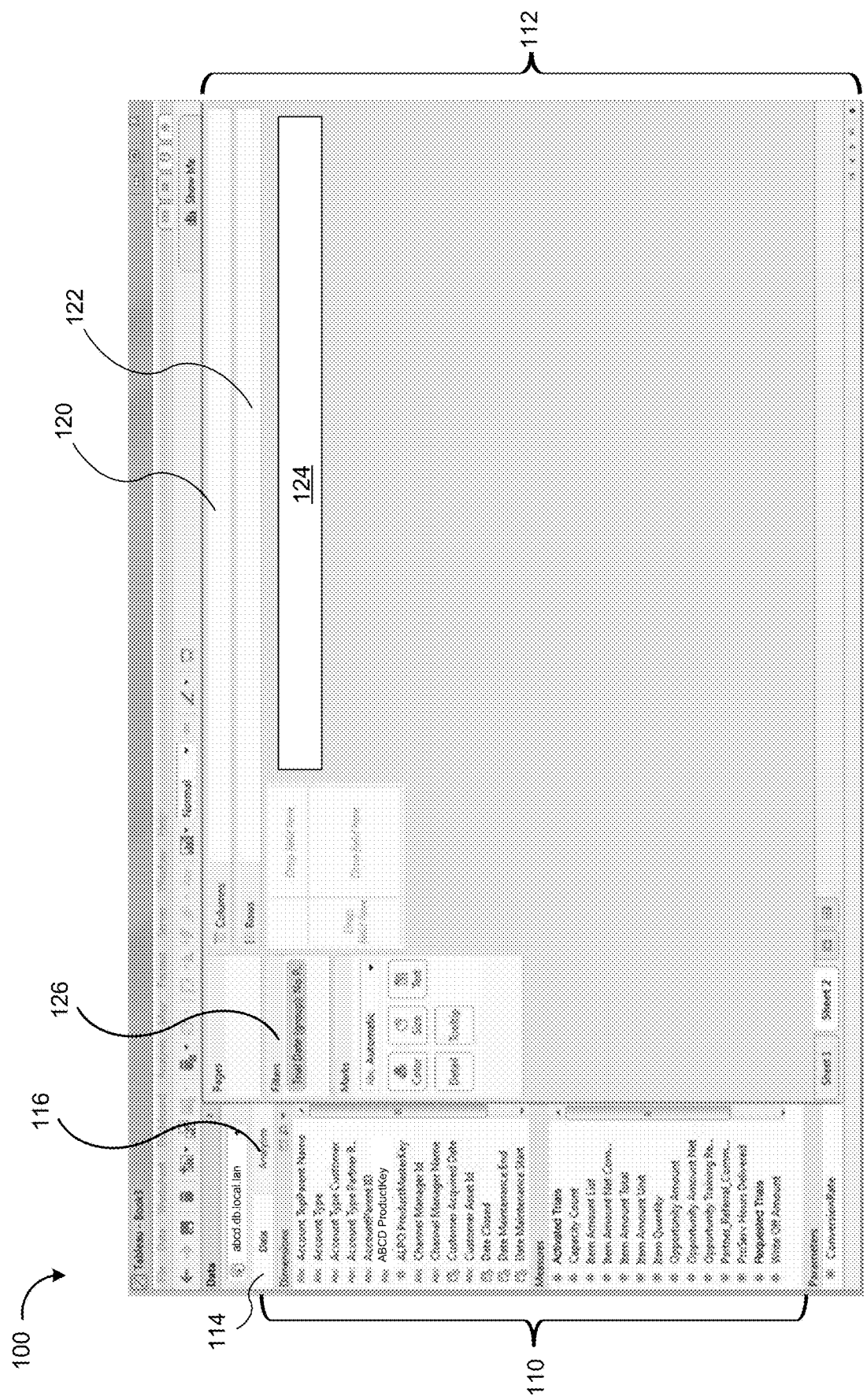
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2:
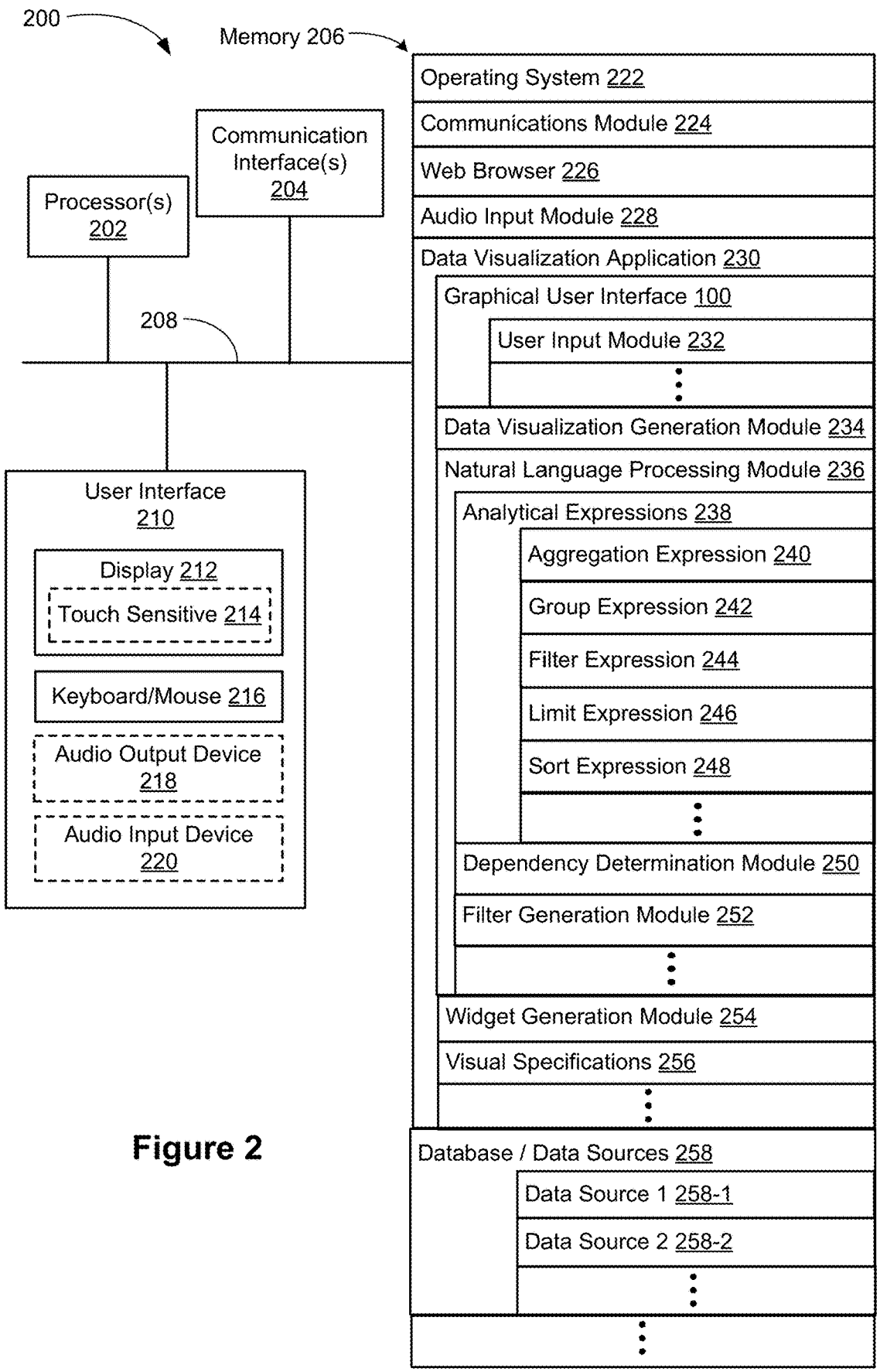
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230 or the natural language processing module 236);
- a data visualization application 230, which generates data visualizations and related features. In some implementations, the data visualization application 230 includes:
  a graphical user interface 100 for a user to construct visual graphics. In some implementations, the graphical user interface includes a user input module 232 for receiving user input through the natural language box 124. For example, a user inputs a natural language command or expression into the natural language box 124 identifying one or more data sources 258 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;

a data visualization generation module 234, which automatically generates and displays a corresponding visual graphic (also referred to as a "data visualization" or a "data viz") using the user input (e.g., the natural language input);

a natural language processing module 236, which receives and parses the natural language input provided by the user. The natural language processing module 236 may identify analytical expressions 238, such as:

aggregation expressions 240. For example, "average Sales" is an aggregate expression that includes an aggregate term "average" and an attribute "Sales";

group expressions 242. For example, "by Region" is a group expression that includes a group term "by" and an attribute "Region";

filter expressions 244. For example, "Customer Name starts with John" is a filter expression that contains an attribute "Customer," a filter "starts with", and a value "John";

limit expressions 246. For example, "top 5 Wineries by sum of Sales" is a limit expression that contains a limit term "top", a value "5", a group by attribute "Wineries," and an aggregation expression "sum of Sales;" and sort expressions 248. For example, in "sort Products in ascending order by sum of Profit," the phrase "ascending order" is the sort term, "Products" is the attribute to group by, and "sum of Profit" is the aggregation expression;

the natural language processing module 236 may also include a dependency determination module 250, which looks up dependencies in a database 258 to determine how particular terms and/or phrases are related (e.g., dependent);

in some implementations, the natural language processing module 236 includes a filter generation module 252, which determines if one or more filters are related to a field that has been modified by a user. The filter generation module 252 generates the one or more filters based on a change to the field;

a widget generation module 254, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field;

visual specifications 256, which are used to define characteristics of a desired data visualization. In some implementations, the information the user provides (e.g., user input) is stored as a visual specification. In some implementations, the visual specifications 256 includes previous natural language commands received from a user or properties specified by the user through natural language commands. In some instances, a visual specification 256 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," and U.S. patent application Ser. No. 16/166,125, filed Oct. 21, 2018, titled "Determining Levels of Detail for Data Visualizations Using Natural Language Constructs," each of which is incorporated by reference herein in its entirety; and zero or more databases or data sources 258 (e.g., a first data source 258-1 and a second data source 258-2), which are used by the data visualization application 230. In some implementations, the data sources are stored as spreadsheet files, CSV files, XML files, flat files, or JSON files, or stored in a relational database. For example, a user selects one or more databases or data sources 258 (which may be stored on the computing device 200 or stored remotely), selects data fields from the data source(s), and uses the selected fields to define a visual graphic.

In some implementations the computing device 200 further includes an inferencing module (not shown), which is used to resolve underspecified (e.g., omitted information) or ambiguous (e.g., vague) natural language commands (e.g., expressions or utterances) directed to the databases or data sources 258, using one or more inferencing rules. Further information about the inferencing module can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, canonical representations are assigned to the analytical expressions 238 (e.g., by the natural language processing module 236) to address the problem of proliferation of ambiguous syntactic parses inherent to natural language querying. The canonical structures are unambiguous from the point of view of the parser and the natural language processing module 238 is able to choose quickly between multiple syntactic parses to form intermediate expressions. Further information about the canonical representations can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these sub-modules are described in U.S. patent application Ser. No.

16/134,892, titled "Analyzing Natural Language Expressions in a Data Visualization User Interface, filed Sep. 18, 2018, which is incorporated by reference herein in its entirety.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

FIGS. 3A-3E provide a series of screen shots for updating a data visualization using a "sort" conversational operation according to some implementations. In this example, a user is interacting with a data source (e.g., the database/date source 258). The schema information region 110 provides named data elements (e.g., field names) of the data source 258 that may be selected and used to build a data visualization.

Figure 3A:
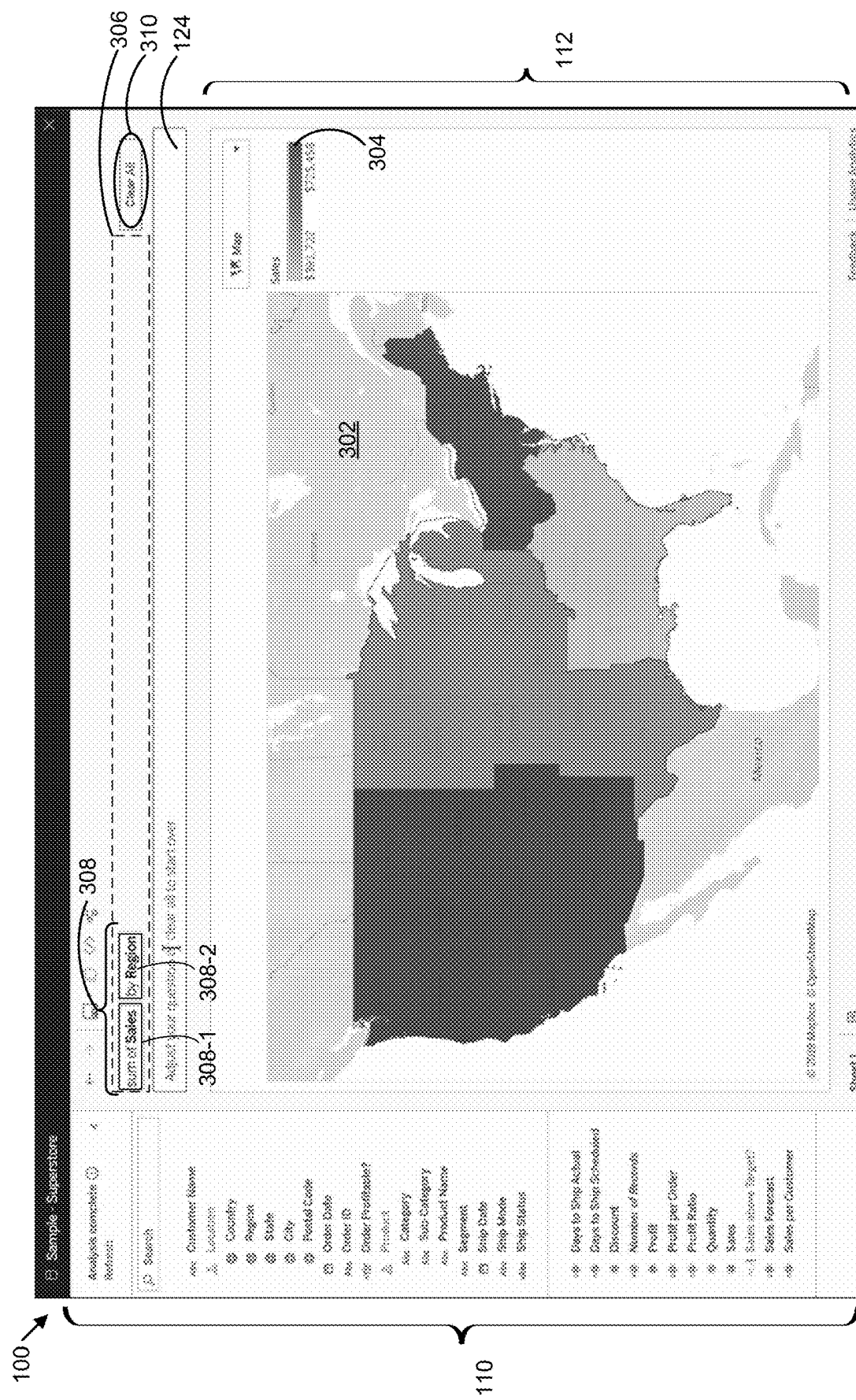
FIGS. 3A-3E provide a series of screen shots for updating a data visualization using a "sort" conversational operation according to some implementations.

In some implementations, and as illustrated in FIG. 3A, the data visualization region 112 displays a data visualization 302 (e.g., a map). The graphical user interface 100 also displays, in a region 306 that is distinct from (e.g., above) the command box 124, phrases 308 that define the data visualization 322. In this example, the phrases 308 include a first phrase 308-1 "sum of Sales" and a second phrase 308-2 "by Region," and define the data visualization 302. The phrases 308 include the terms "Sales" and "Region," which correspond to field names of data fields in the dataset. The terms are visually distinguished (e.g., in boldface) from other words included in the phrases 308. In some implementations, the phrases 308 are individually enclosed in boxes, as illustrated here. The data visualization 302 also includes a legend 304 that visually explains the amount of sales (in dollars) corresponding to a respective shading on the data visualization 302.

In FIG. 3A, the graphical user interface 100 displays a "Clear All" icon (e.g. button) 310. In some implementations, the user can remove an existing data visualization from the visualization region 112 by selecting the icon 310. User selection of the icon 310 also removes from display the phrases 308 (including the individual phrases 308-1 and 308-2) that define the data visualization.

Figure 3B:
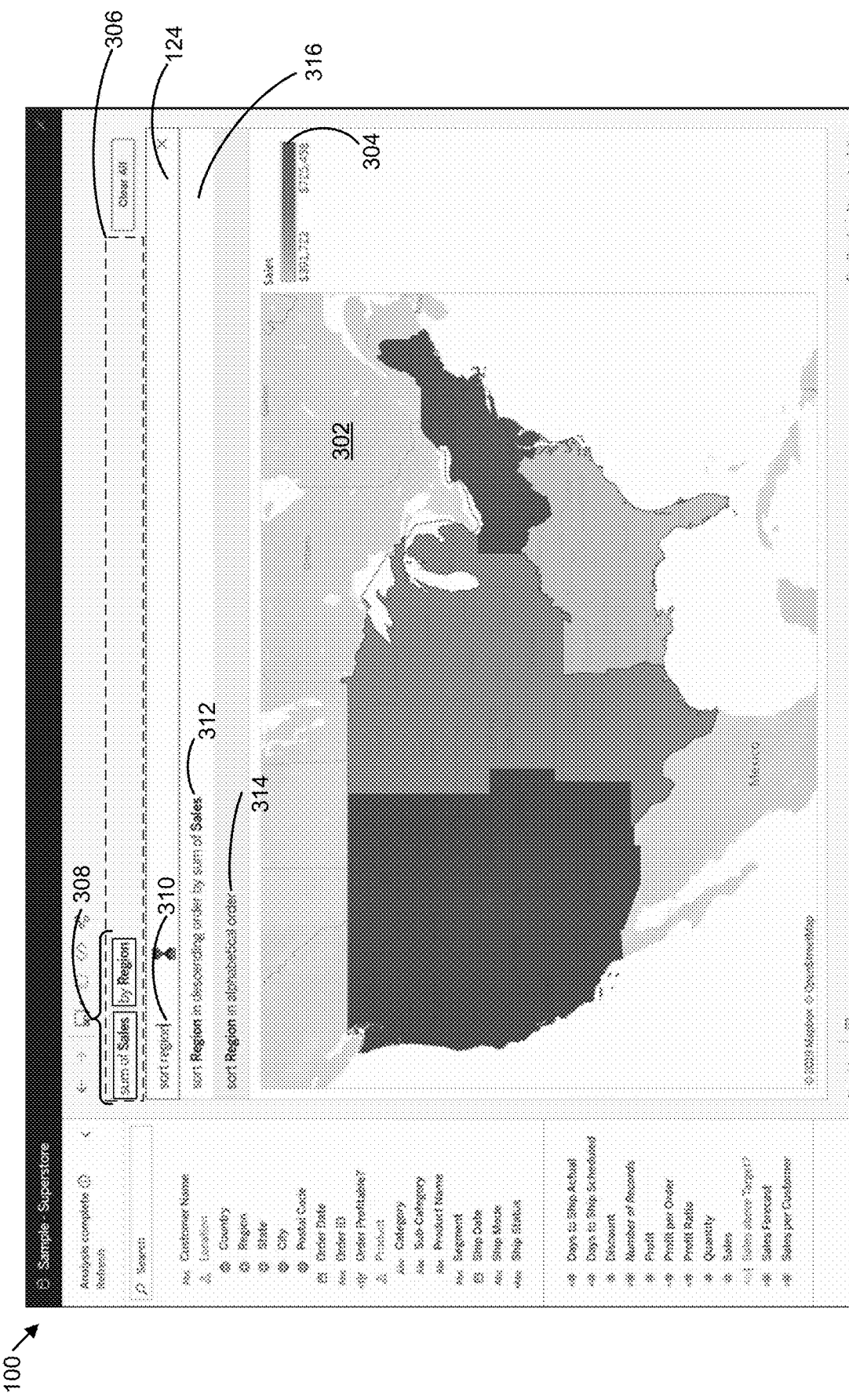

FIG. 3B illustrates a user interaction with the graphical user interface 100. In this example, the user inputs (e.g., enters or types) a natural language expression (e.g., a natural language command) 310 "sort region" in the command box 124. The user may also input the natural language expression by speech, which is then captured using an audio input device 220 (e.g. a microphone) coupled to the computing device 200. Typically, the natural language expression includes one or more terms that identify data fields from a data source 258. A term may be a dimension (e.g., categorical data) or a measure (e.g., a numerical quantity). As illustrated by the example, the natural language input typically includes one or more terms (e.g., the term "region" identifies a data field from the data source).

In some implementations, and as described in U.S. patent application Ser. No. 16/166,125, after the user inputs the natural language command, the natural language processing module 236 parses the command into tokens. The natural language processing module 236 may use a lexicon corresponding to the data source 258 to identify analytical concepts, aggregation type, and data fields to be aggregated. The graphical user interface 100 returns (e.g., displays) one or more interpretations for the natural language command.

Referring back to FIG. 3B, the graphical user interface 100 displays a first interpretation 312 (also referred to as a proposed action) "sort Region in descending order by sum of Sales" and a second interpretation 314 "sort Region in alphabetical order" in a dropdown menu 316 in response to the natural language command 310. In some implementations, and as illustrated in FIG. 3B, the field names "Region" and "Sales" are displayed in a visually distinctive manner (e.g., in boldface) relative to other words included in the interpretations 312 and 314. The first interpretation 312 corresponds to a proposed action to sort values (e.g., data fields) of the field "Region" in descending order based on a sum of sales for each value of the field "Region." Because "Region" has a dimensional data type, its values comprise categorical data such as "East," "West," "Central," and "South." The second interpretation 314 corresponds to a proposed action to arrange the values of "Region" in alphabetical order.

Figure 3C:
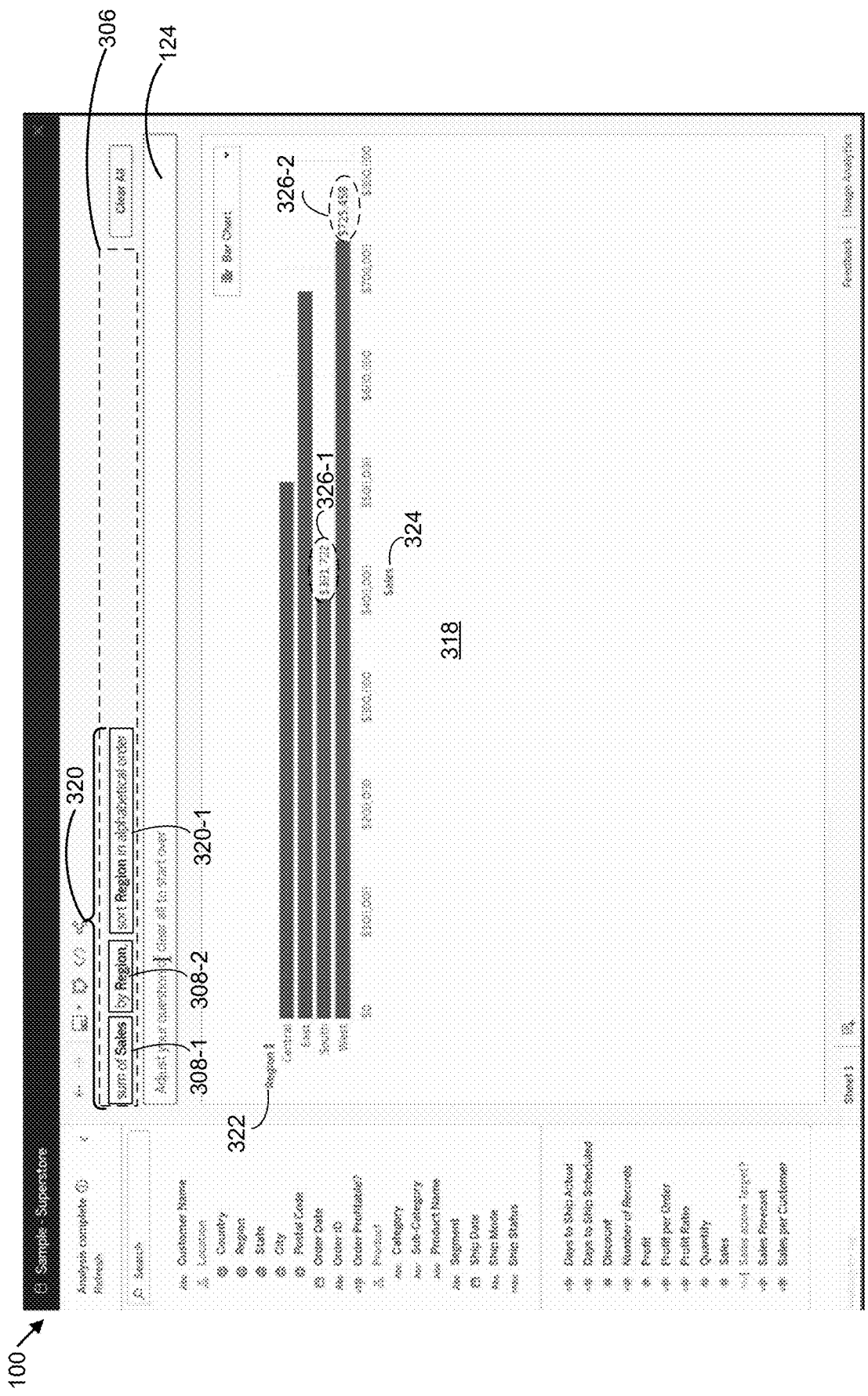

FIG. 3C illustrates a data visualization 318 (e.g., a bar chart) that is automatically generated and displayed in the graphical user interface 100 in response to user selection of the second interpretation 314 "sort Region in alphabetical order" in FIG. 3B. In this example, the data visualization 318 is a bar chart comprising "Region" on the y-axis 322 and "Sales" on the x-axis 324. The four rows in the bar chart correspond to the regions (e.g., values) "Central," "East," "South," and "West." The rows are displayed in alphabetical order, consistent with the proposed action 314 to sort values of the data field "Region" in alphabetical order. In some implementations the interface displays data values 326-1 and 326-2 corresponding to one or more bars in the bar chart (e.g., the maximum value 326-2 and/or the minimum value 326-1). In response to the user selection, the updated phrases 320 includes the phrase "sort Region in alphabetical order" 320-1. These updated phrase 320 define the data visualization 318 that is displayed.

Figure 3D:
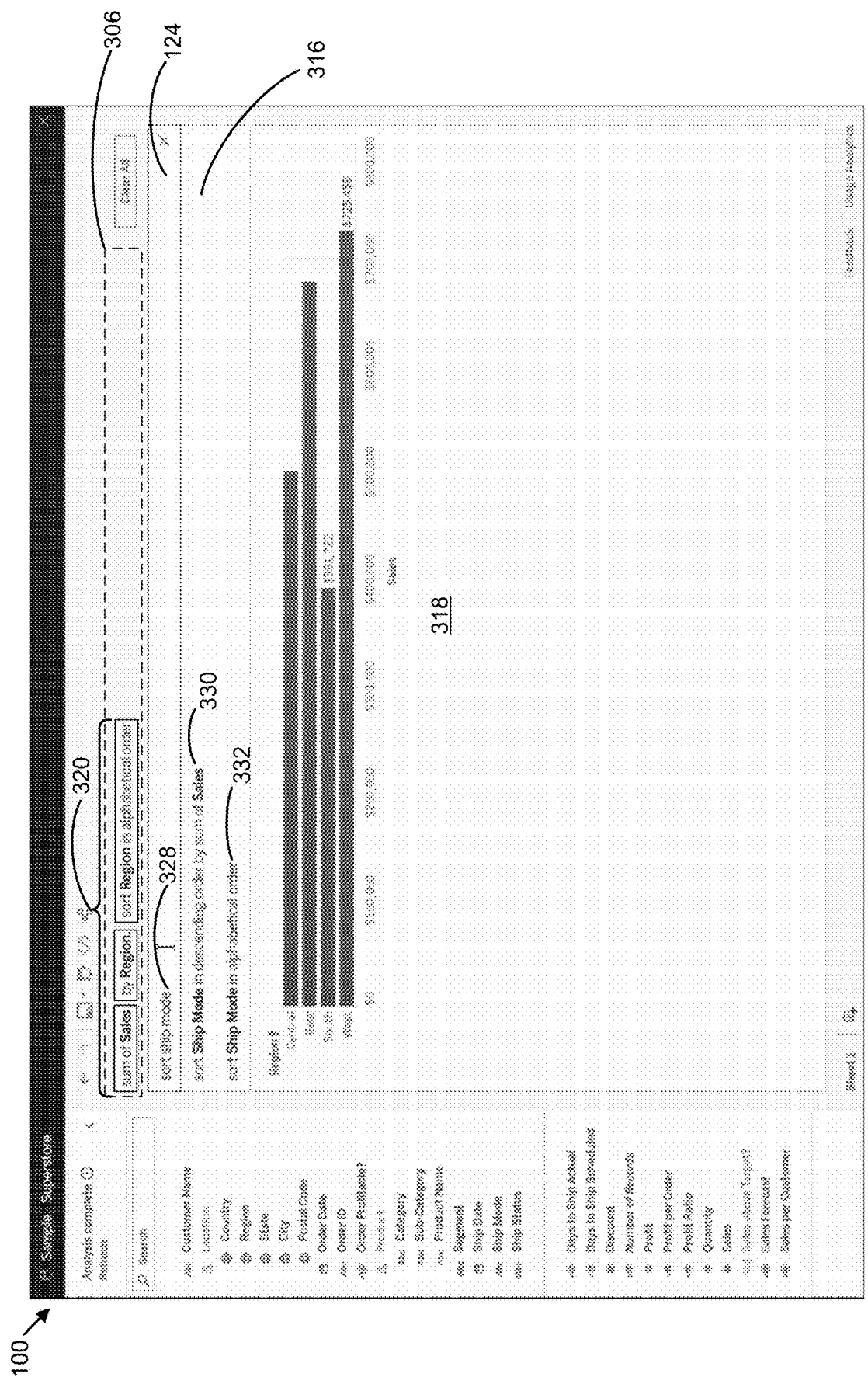

FIG. 3D illustrates another user interaction with the graphical user interface 100. In this example, the user inputs a natural language command 328 "sort ship mode" in the command box 124. The graphical user interface 100 displays a first interpretation 330 "sort Ship Mode in descending order by sum of Sales" and a second interpretation 332 "sort Ship Mode in alphabetical order" in the dropdown menu 316 in response to the command.

Figure 3E:
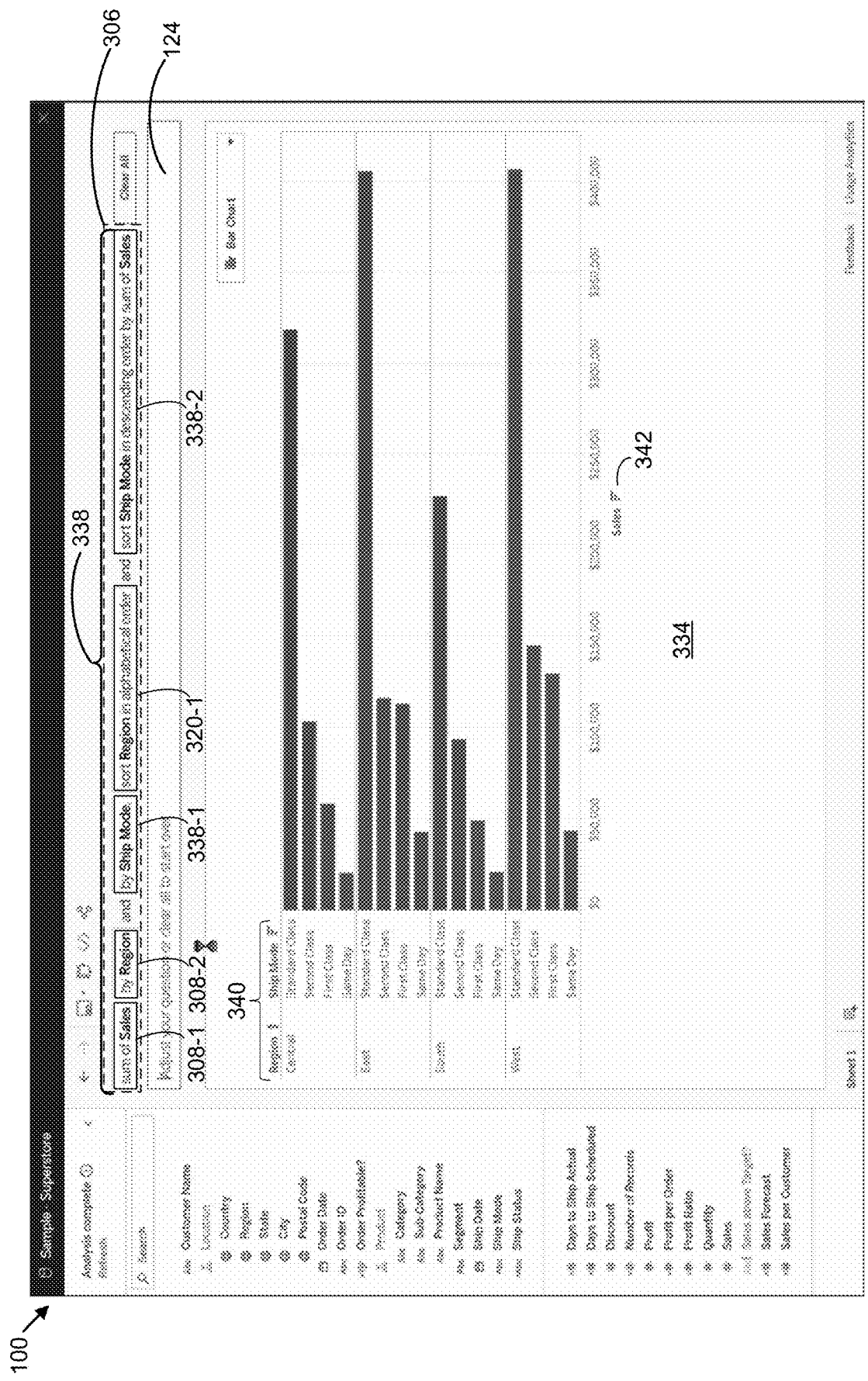

FIG. 3E illustrates an updated data visualization 334 (e.g., a bar chart) that is automatically generated and displayed in the graphical user interface 100 in response to user selection of the interpretation 330. The phrases 338 include the phrases 320 in FIGS. 3C and 3D. The phrases 338 also include a phrase 338-2 "sort Ship Mode in descending order by sum of Sales." The phrases 338 further include a phrase 338-1 "by Ship Mode." In some implementations, and as illustrated in FIG. 3E, in order to sort on a field (e.g., the dimensional field "Ship Mode"), it has to be part of the data visualization. The system cannot perform a sort on the field "Ship Mode" when the requested data has not been grouped by ship mode. Instead of raising an error, the computing device automatically determines that the phrase 338-1 "by Ship Mode" must also be added in order to prevent returning an error based on the user input. This improves the user experience because the user is not required to manually update phrase(s) in order to prevent the error.

Referring back to FIG. 3E, the data visualization 334 is a bar chart comprising, on the y-axis 340, "Regions" and "Ship Mode" and comprising, on the x-axis 342, "Sales." A comparison between FIG. 3E and FIG. 3C shows that the data visualization 334 includes the additional dimension "Ship Mode" on the y-axis. The data visualization 334 breaks down, for each region, the sum of sales for each of the ship modes "Standard class," "Second class," "First class," and "Same day." The ship modes are then sorted in descending order by sum of sales for each of the regions.

Figure 4A:
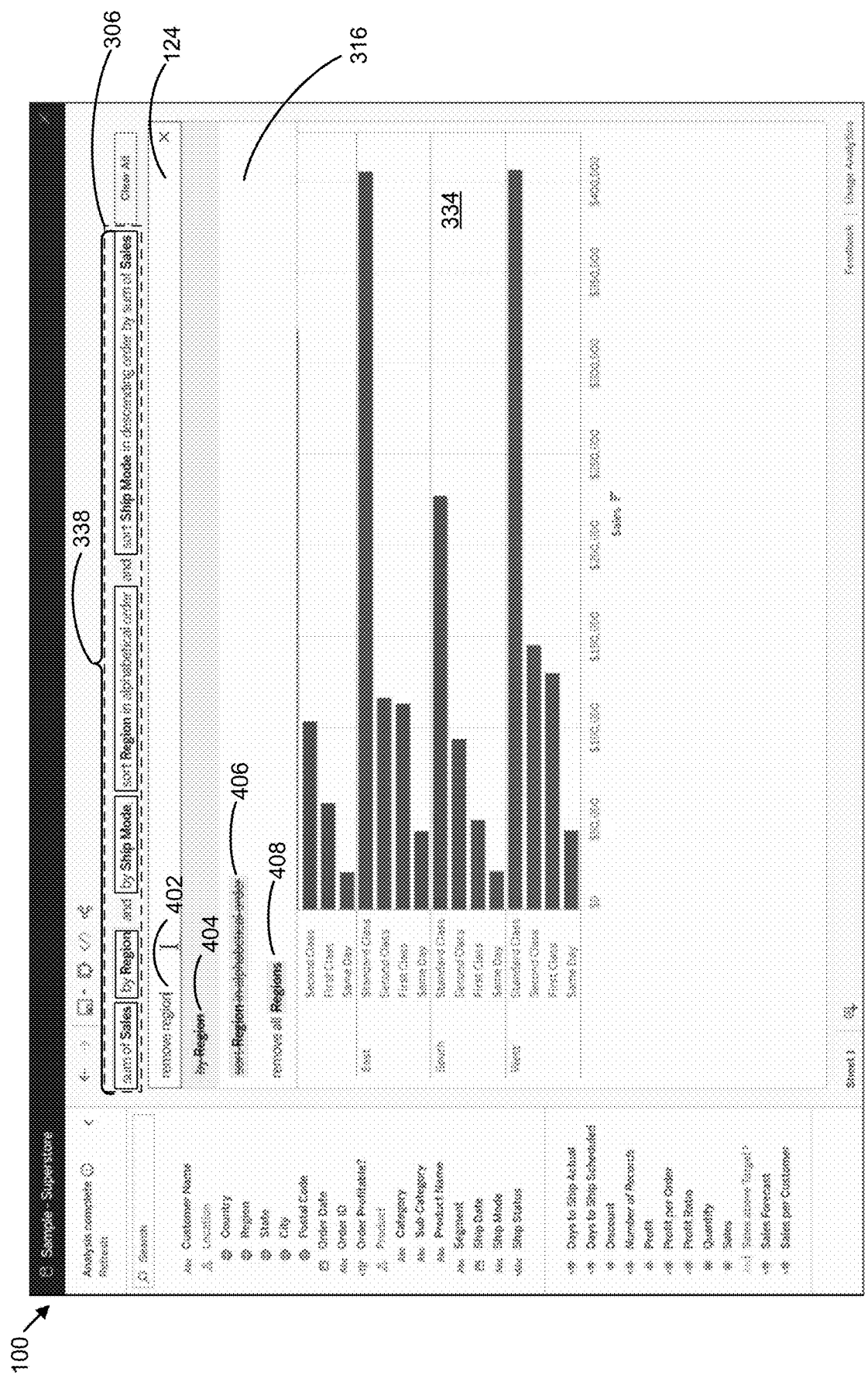
FIGS. 4A and 4B provide a series of screen shots for updating a data visualization using a "remove" conversational operation according to some implementations.
Figure 4B:
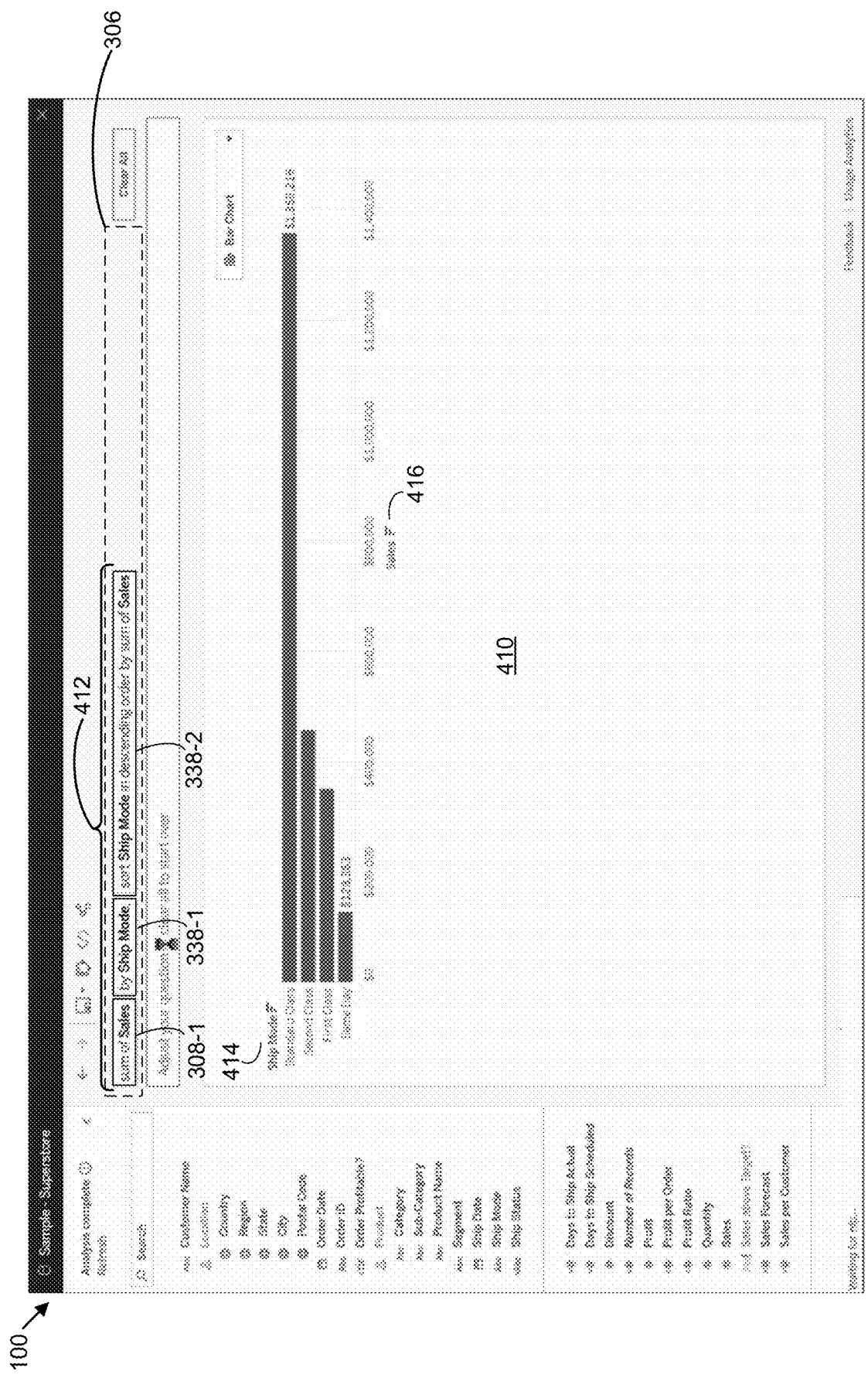

FIGS. 4A and 4B provide a series of screen shots for updating a data visualization using a "remove" conversational operation according to some implementations.

FIG. 4A illustrates a user interaction with the data visualization 334 in FIG. 3E. In this example, the user inputs a natural language command 402 "remove region" in the command box 124. The graphical user interface 100 displays, in the dropdown menu 316, a first interpretation 404, a second interpretation 406, and a third interpretation 408. The first interpretation 404 corresponds to a proposed action to remove, from the phrases 338, the phrase "by Region." The second interpretation 406 corresponds to a proposed action to remove, from the phrases 338, the phrase "sort Region in alphabetical order." The third interpretation 408 "remove all Regions" corresponds to a proposed action to remove, from the phrases 338, all phrases that contain the field "Region." In some implementations, and as illustrated in FIG. 4A, the interpretations 404, 406, and 408 are displayed in a strikethrough format, so as to elucidate to the user that selection of any one of the interpretations will cause its corresponding phrase(s) to be removed.

FIG. 4B illustrates a data visualization 410 (e.g., a bar chart) that is automatically generated and displayed in the graphical user interface 100 in response to user selection of the interpretation 408. In this example, all of the phrases that contain the data field "Region" have been removed. The remaining phrases 412 that define the data visualization 410 are the phrase 308-1 "sum of Sales", the phrase 338-1 "by Ship Mode" and the phrase 338-2 "sort Ship Mode in descending order by sum of Sales." As depicted in FIG. 4B, the data visualization 410 is a bar chart with rows corresponding to ship modes. The rows are arranged in descending order by sum of sales. The y-axis 414 specifies the Ship Mode and the x-axis 416 specifies Sales.

In some implementations, if the user removes a group expression, the dependent sort expression that contains the attribute (e.g., data field) of the group expression is automatically removed. For example, if the user inputs (or selects) a command to remove the phrase "by Region," which is a command to group values by region, the corresponding sort expression "sort Region in alphabetical order" will be automatically removed as well.

Figure 5A:
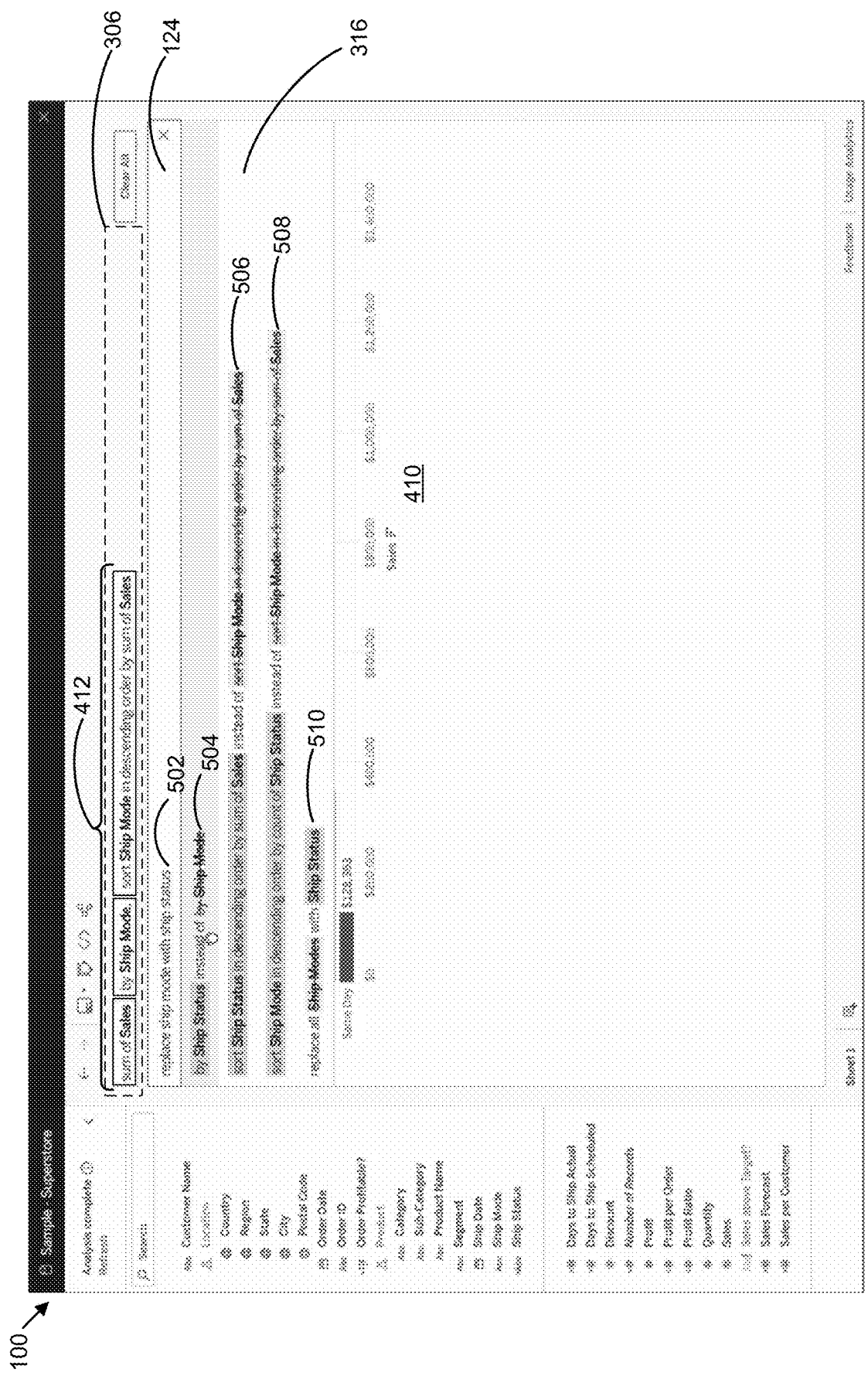
FIGS. 5A and 5B provide a series of screen shots for updating a data visualization using a "replace" conversational operation according to some implementations.
Figure 5B:
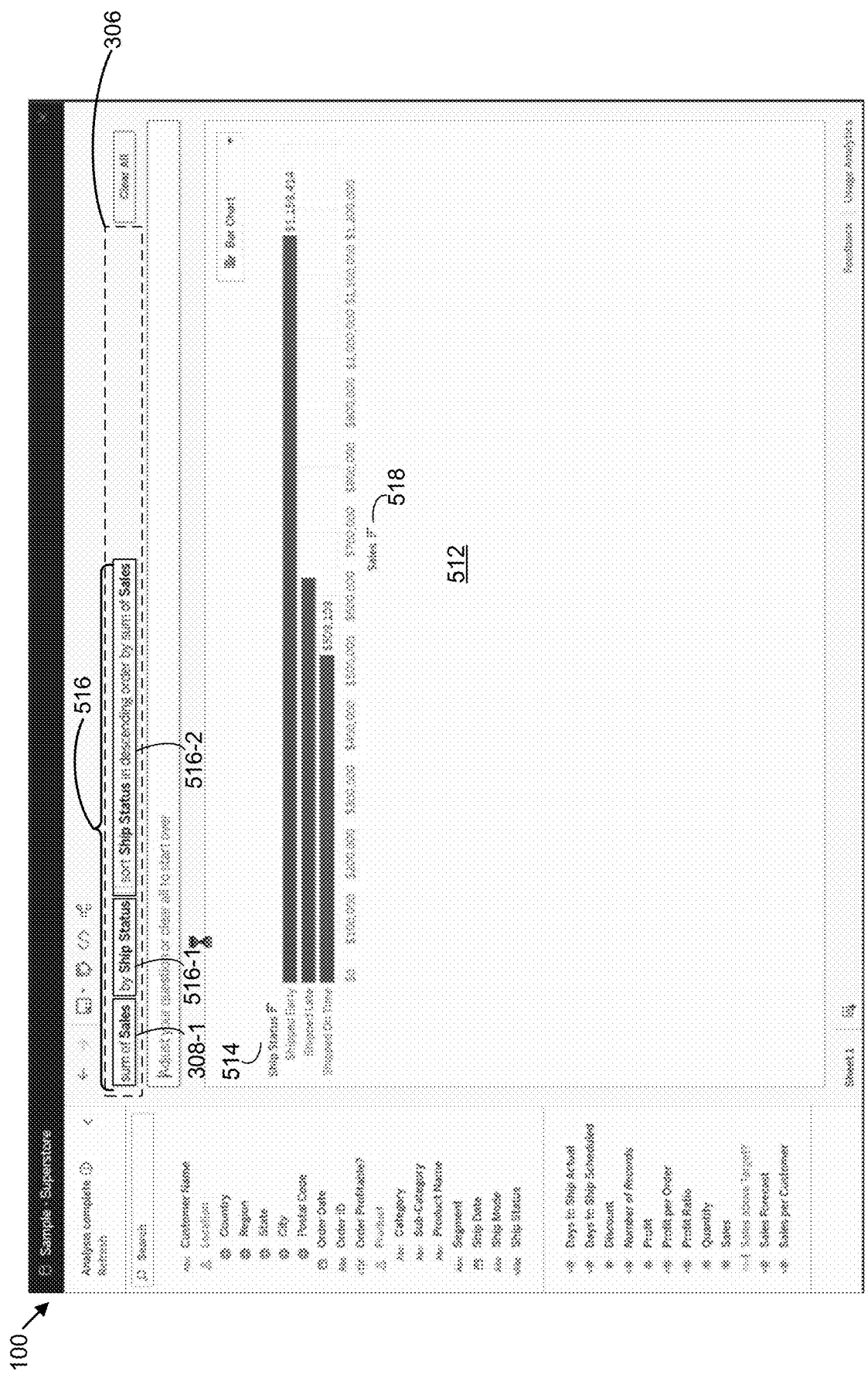

FIGS. 5A and 5B provide a series of screen shots for updating a data visualization using a "replace" conversational operation according to some implementations.

FIG. 5A illustrates a user interaction with the data visualization 410 in FIG. 4B. In this example, the user inputs a natural language command 502 "replace ship mode with ship status" in the command box 124. In response to the natural language command 502, the graphical user interface 100 displays a first interpretation 504 "by Ship Status instead of", a second interpretation 506 "sort Ship Status in descending order by sum of Sales instead of", a third interpretation 508 "sort Ship Mode in descending order by count of Ship Status instead of", and a fourth interpretation 510 "replace all with Ship Status." The first interpretation 504 corresponds to a proposed action to replace the phrase "by Ship Mode" with a new phrase "by Ship Status." The second interpretation 506 corresponds to a proposed action to replace the phrase "sort Ship Mode in descending order by sum of Sales" with a new phrase "sort Ship Status in descending order by sum of Sales." The third interpretation 508 corresponds to a proposed action to replace the phrase "sort Ship Mode in descending order by sum of Sales" with a new phrase "sort Ship Mode in descending order by count of Ship Status." The fourth interpretation 510 corresponds to a proposed action to replace all phrase(s) that contain the dimension "Ship Modes" with the dimension "Ship Status."

FIG. 5B illustrates a data visualization 512 (e.g., a bar chart) that is automatically generated and displayed in the graphical user interface 100 in response to user selection of the interpretation 504. A comparison between FIGS. 5B and 5A show that the phrases 412 in FIG. 5A that contain the dimension data field "Ship Mode" have been replaced with phrases 516 (including the phrases by Ship Status 516-1 and sort Ship Status in descending order by sum of Sales 516-2) that contain another dimension data field "Ship Status."

In FIG. 5B, the data visualization 512 is a bar chart comprising "Ship Status" on the y-axis 514 and "Sales" on the x-axis 518. The rows of the bar chart 512 correspond to various ship statuses, which are arranged in descending order according to the sum of sales for a respective status.

FIGS. 6A-6D provide a series of screen shots for updating a data visualization using conversational operations according to some implementations.

Figure 6A:
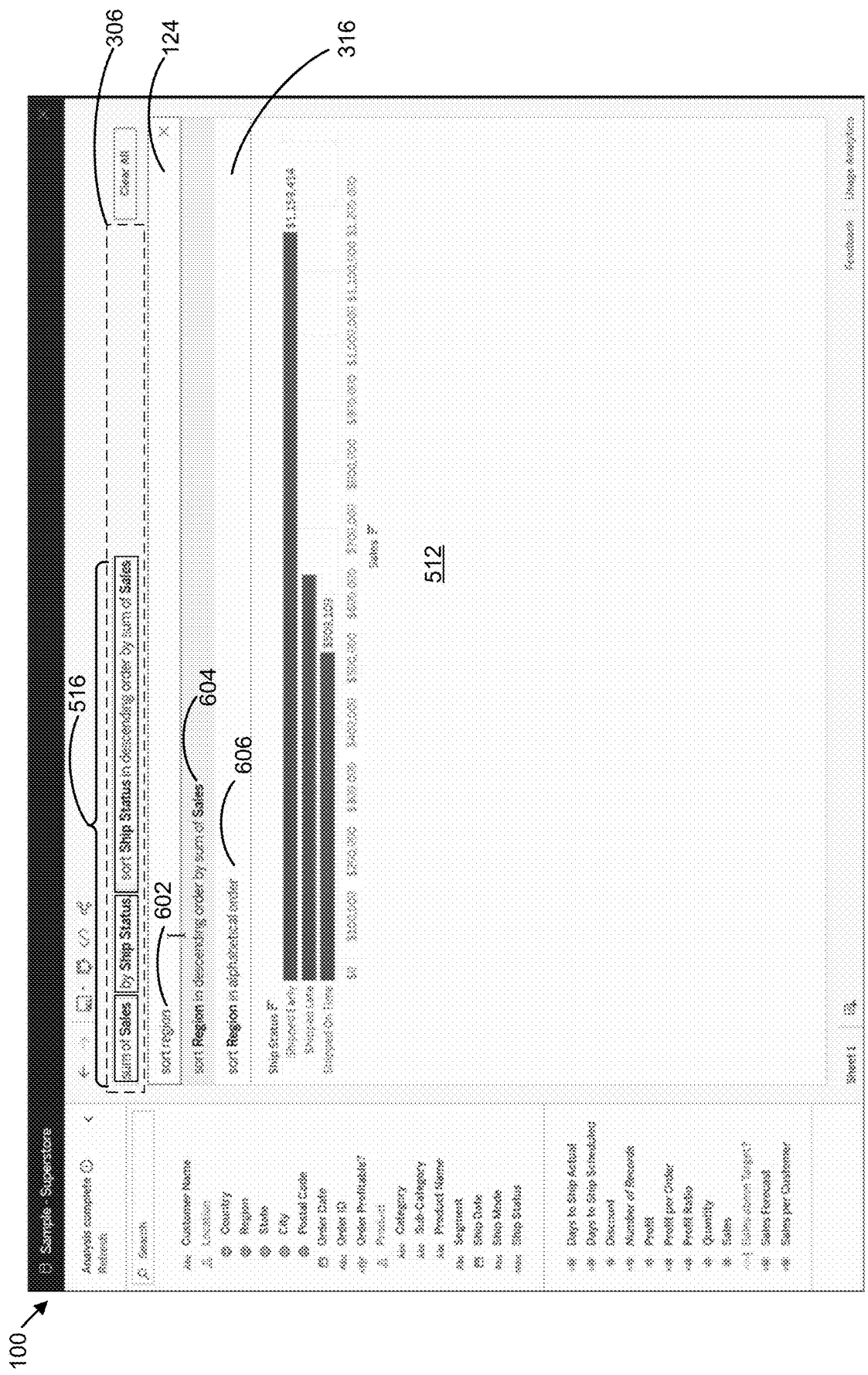
FIGS. 6A-6D provide a series of screen shots for updating a data visualization using conversational operations according to some implementations.

FIG. 6A illustrates a user interaction with the data visualization 512 in FIG. 5B. In this example, the user inputs a natural language command 602 "sort region" in the command box 124. In response to the natural language command 602, the graphical user interface 100 displays a first interpretation 604 "sort Region in descending order by sum of Sales" and a second interpretation 606 "sort Region in alphabetical order" in the dropdown menu 316. The first interpretation 604 corresponds to a proposed action to sort values of the dimension "Region" in descending order according to an aggregate expression "sum of sales." The second interpretation 606 corresponds to a proposed action to sort values of the dimension "Region" in alphabetical order.

Figure 6B:
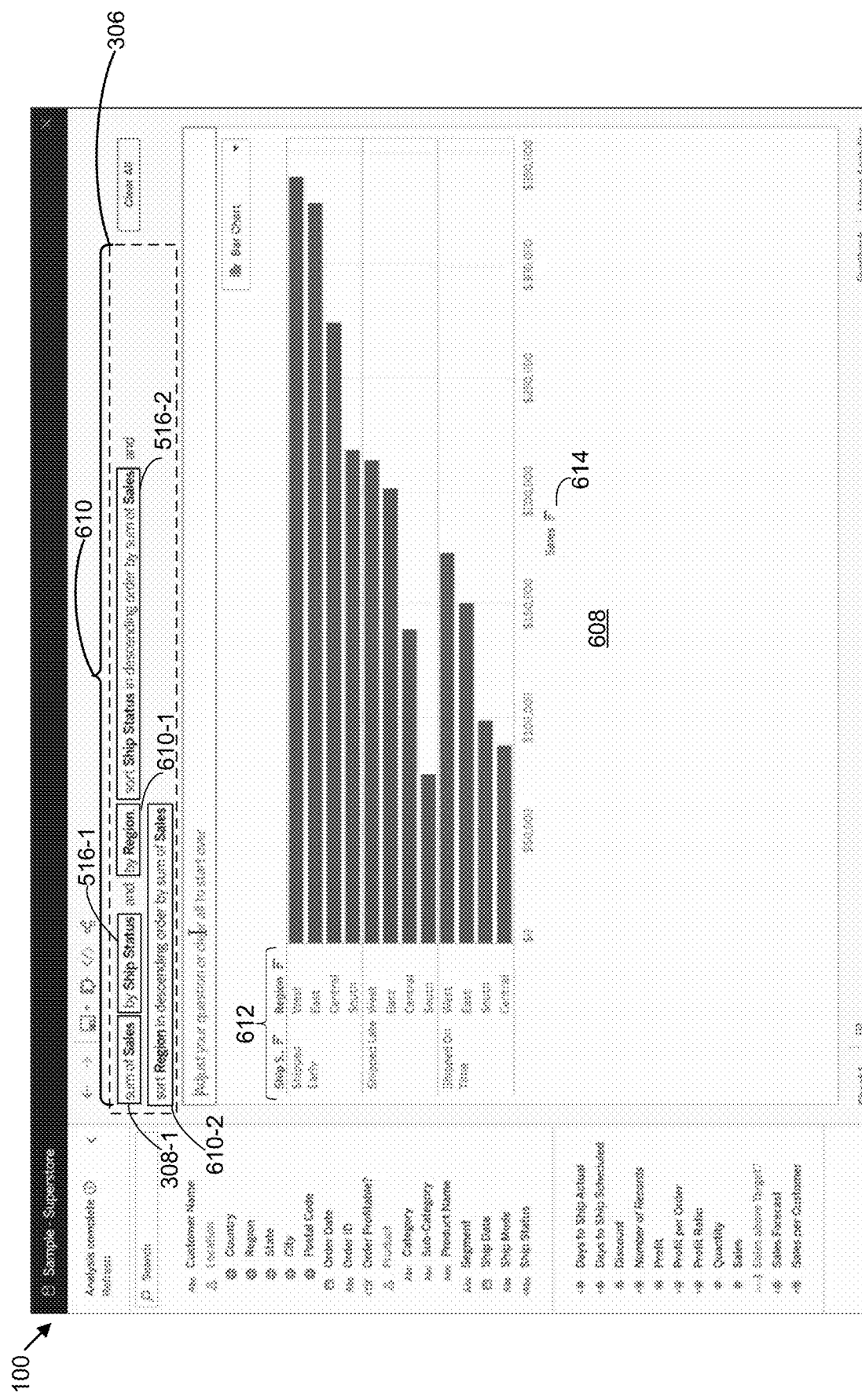

FIG. 6B illustrates a data visualization 608 (e.g., a bar chart) that is automatically generated and displayed in the graphical user interface 100 in response to user selection of the interpretation 604. In this example, the phrases 610 that define the data visualization 608 include the phrases 516 in FIG. 6A. The phrases 610 also include a phrase 610-1 "by Region" and a phrase 610-2 "sort Region in descending order by sum of Sales." As discussed earlier in FIGS. 3D and 3E, in order to sort on the dimension "Region", the dimension has to be part of the data visualization. In this example, the phrase 610-1 "by Region" is automatically added by the data visualization application 230. Because phrases in the region 306 define the data visualization, the inclusion of the phrase 610-1 "by Region" indicates to the user that the generation of data visualization 608 includes a grouping by values of "Region."

As further illustrated in FIG. 6B, the phrases 610 includes the phrase 516-2 "sort ship status in descending order by sum or sales" followed by the phrase 610-1 "sort Region in descending order by sum of Sales." Thus, in the data visualization 608, the data values are first grouped and sorted by ship status. Then for each ship status, the data values are further grouped and sorted by region. Accordingly, the data visualization 608 is a bar chart comprising, on the y-axis 612, "Ship Status" and "Region." Compared to the data visualization 512 in FIG. 6A, the data visualization 608 further breaks down, for each ship status, the sum of sales in the regions "Central," "East," "West," and "South" corresponding to the ship status. For each ship status, the regions are sorted in descending order by sum of sales.

Figure 6C:
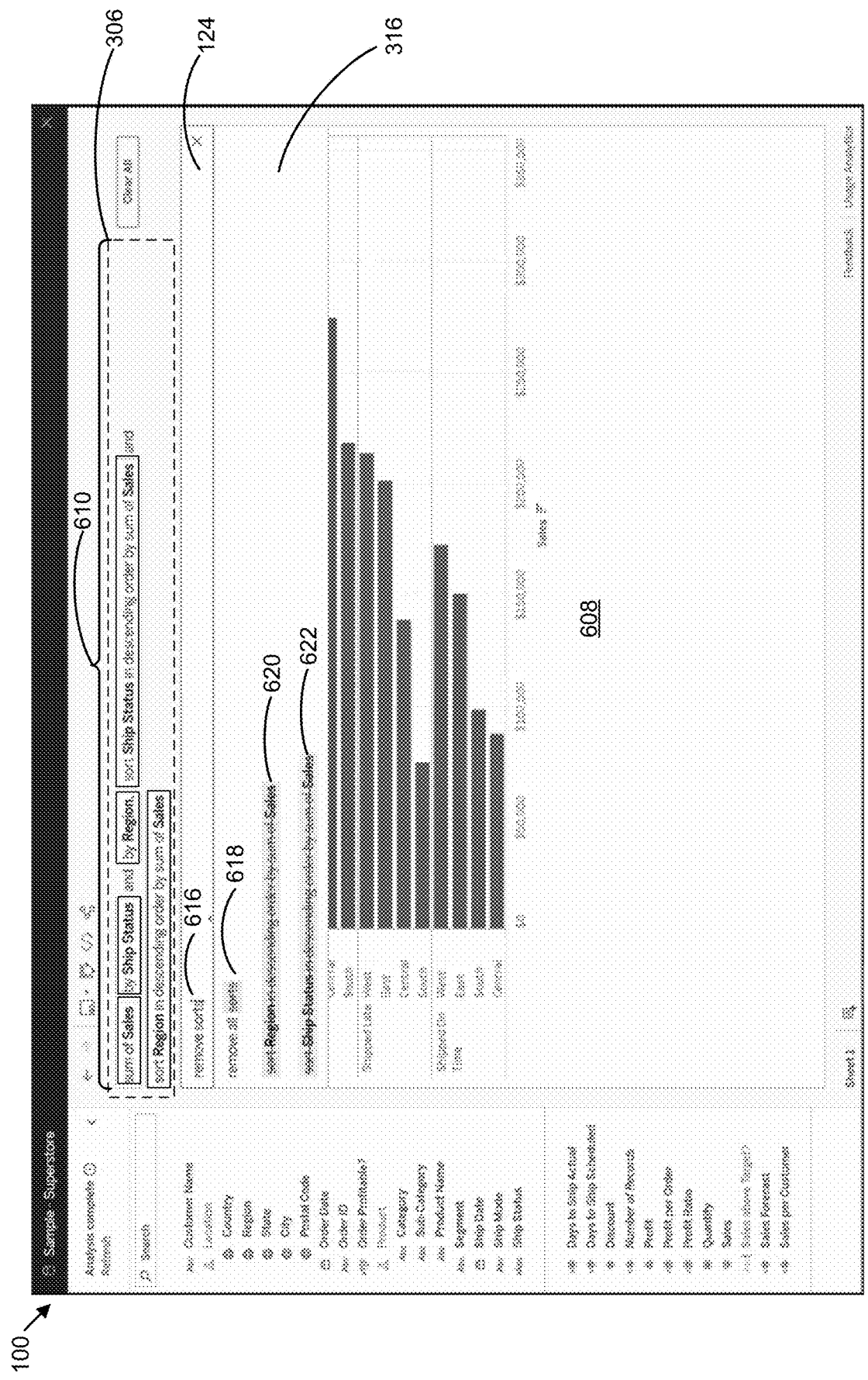

FIG. 6C illustrates a user interaction with the data visualization 608 in FIG. 6B. In this example, the user inputs a natural language command 616 "remove sorts." In response to the natural language command 616, the graphical user interface 100 displays a first interpretation 618 "remove all", a second interpretation 620, and a third interpretation 622. The first interpretation 618 corresponds to a proposed action to remove all sort expressions from the phrases 610. The second interpretation 620 corresponds to a proposed action to remove the phrase "sort Region in descending order by sum of Sales" from the phrases 610. The third interpretation 622 corresponds to a proposed action to remove the phrase "sort Ship Status in descending order by sum of Sales" from the phrases 610.

Figure 6D:
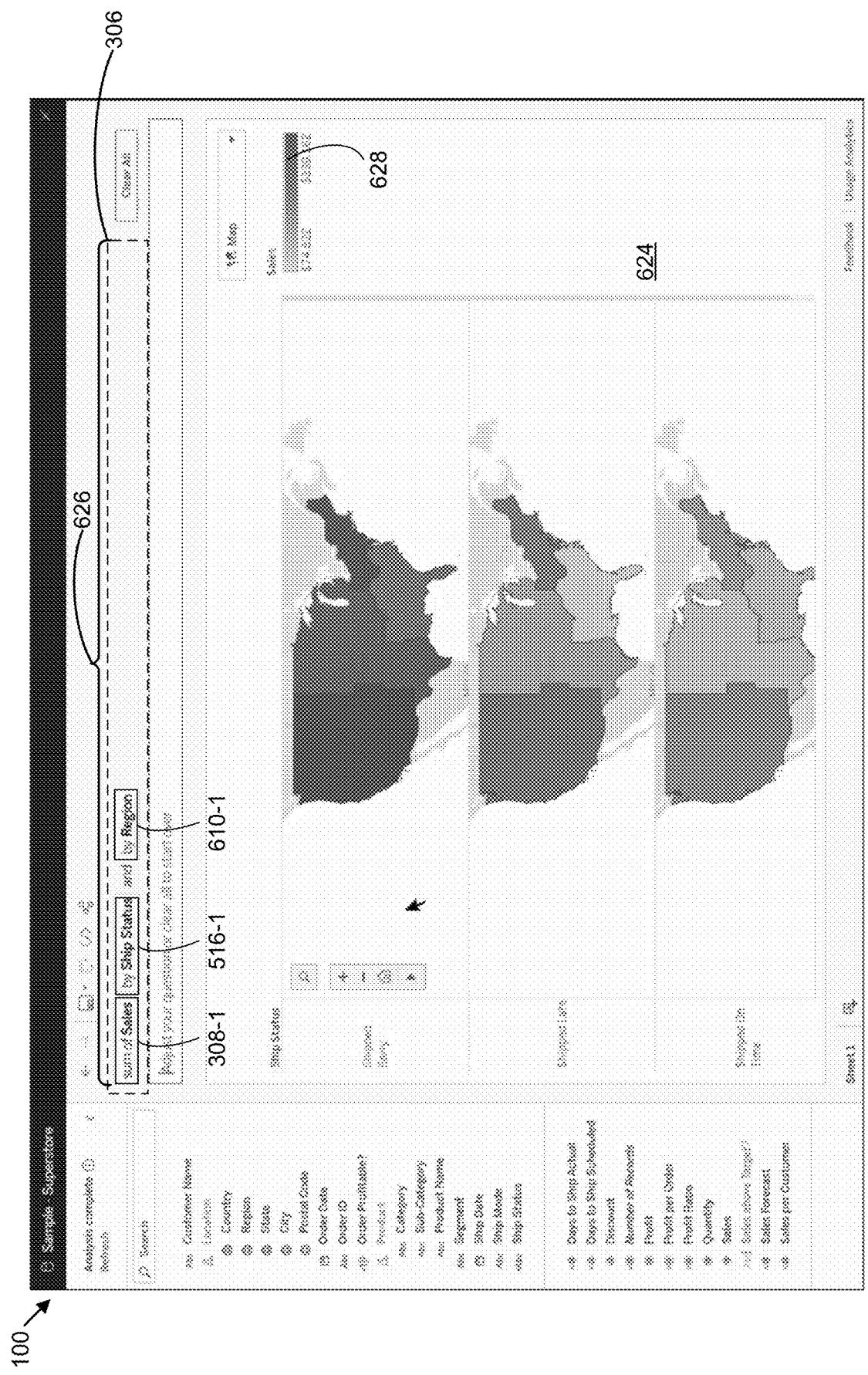

FIG. 6D shows a data visualization 624 (e.g., a map) that is automatically generated and displayed in the graphical user interface 100 in response to user selection of the interpretation 618. A comparison between phrases 626 in FIG. 6D and the phrases 610 in FIG. 6B shows that all phrases in FIG. 6B that contain the sort expression (that is, the phrase 516-2 "sort Ship Status in descending order by sum of Sales" and the phrase 610-2 "sort Region in descending order by sum of Sales") have been removed in the phrases 626. The data visualization 624 includes three maps representing the ship statuses "Shipped Early", "Shipped Late", and "Shipped on time." In each of these maps, the regions are divided into "Central," "East," "West," and "South," and are color-coded depending on the sum of sales. The data visualization includes a legend 628 to show how the colors correspond to sales. In the absence of sorting, the data visualization application has switched to using a map data visualization 624 rather than a bar chart 608.

In some implementations, in addition to using natural language commands to update an existing data visualization, such as in the examples described in FIGS. 2-6, a user can also interact directly with the phrases that define the data visualization (e.g., the phrases found in the region 306 in FIGS. 2-6) to update an existing data visualization. FIGS. 7A-7F illustrate this alternative.

FIGS. 7A-7F provide a series of screen shots for a graphical user interface 100 according to some implementations.

Figure 7A:
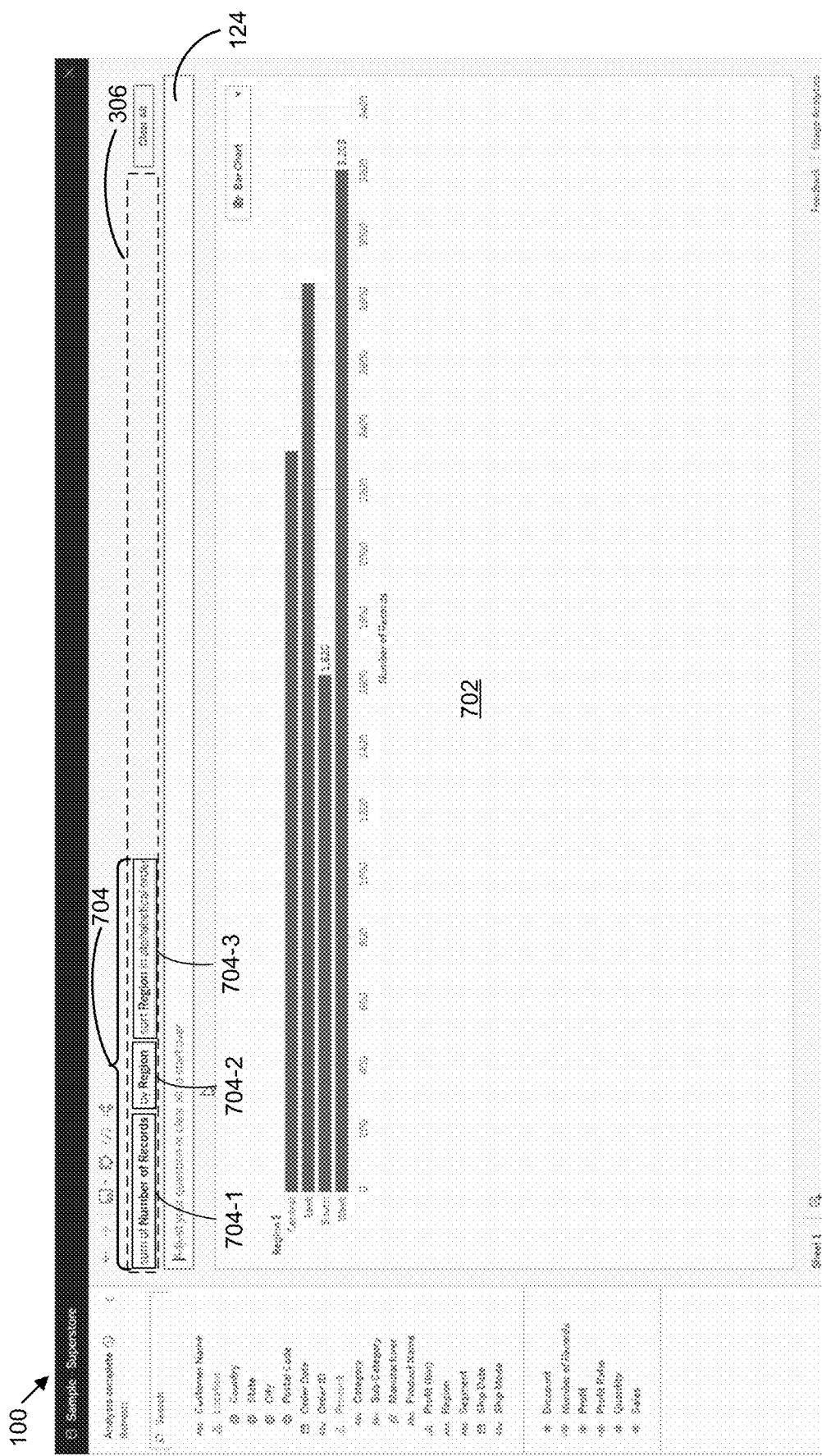
FIGS. 7A-7F provide a series of screen shots for a graphical user interface 100 according to some implementations.

FIG. 7A shows a data visualization 702 (e.g., a bar chart) that represents the number of records by region. The rows in the bar chart correspond to the regions "Central," "East," "South," and "West." The rows are displayed in alphabetical order. The region 306 includes phrases 704 that define the data visualization 702. The phrases 704 include a first phrase 704-1 "sum of Number of Records", a second phrase 704-2 "by Region", and a third phrase 704-3 "sort Region in alphabetical order."

Figure 7B:
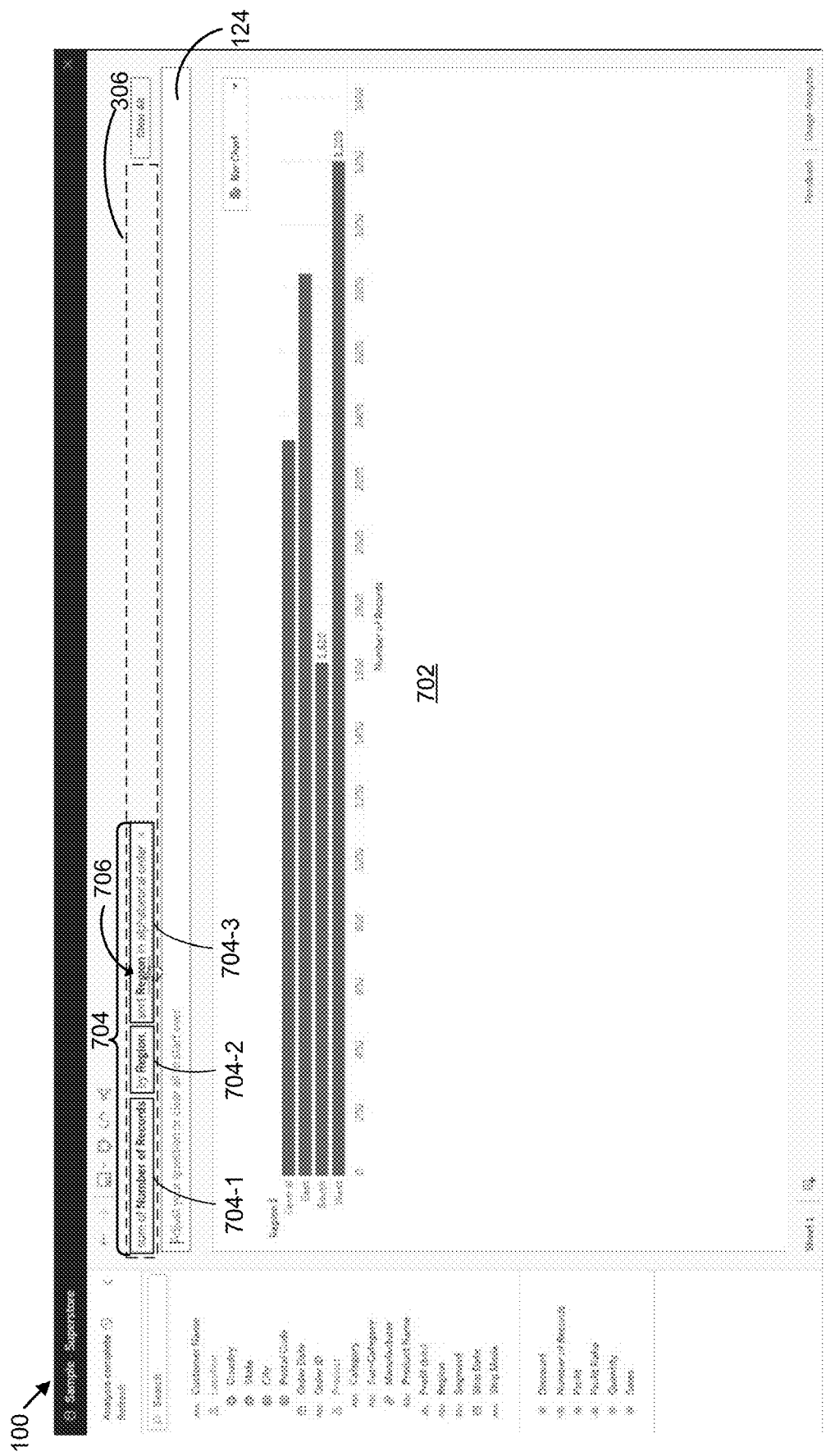
Figure 7C:
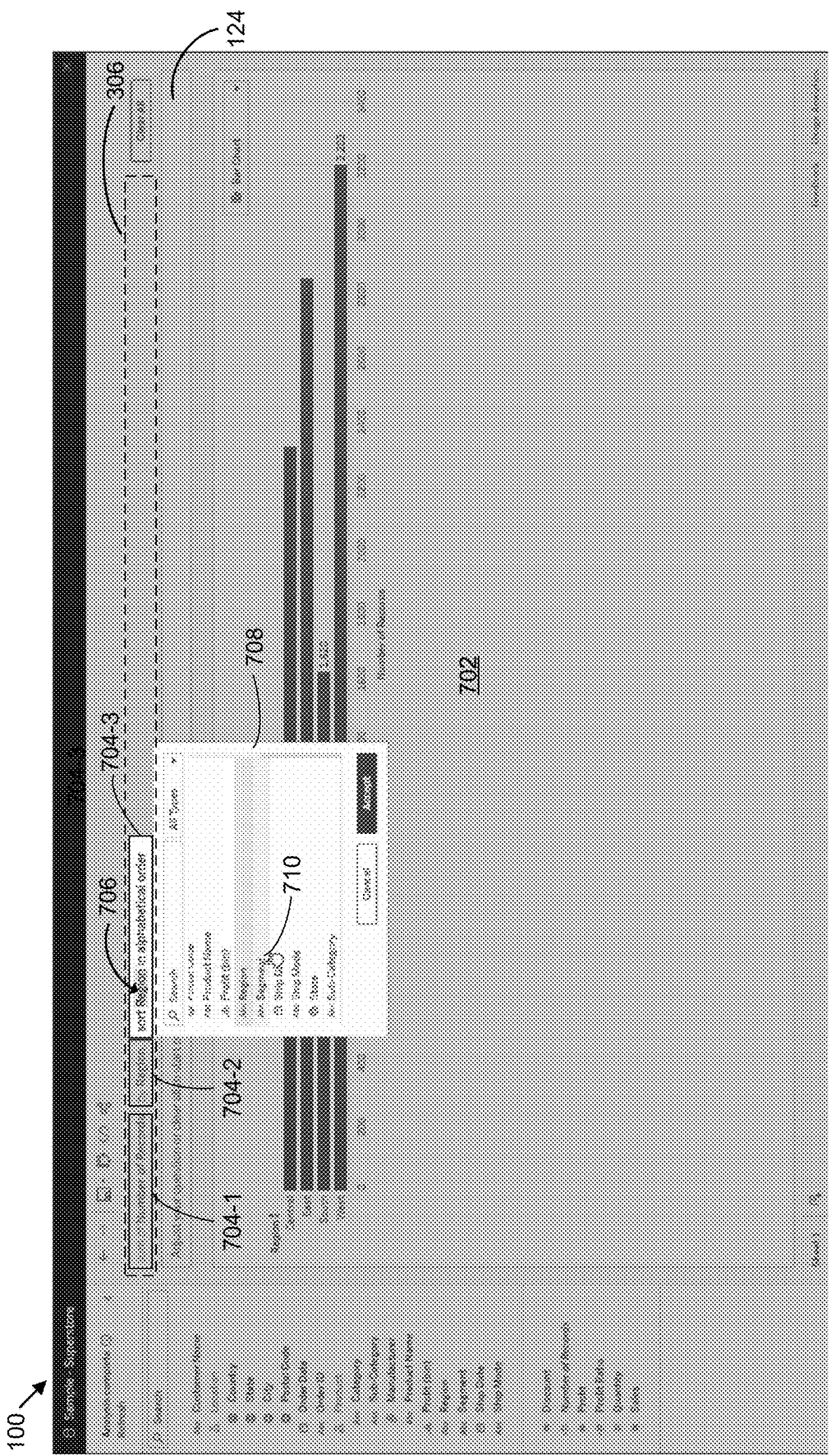
Figure 7D:
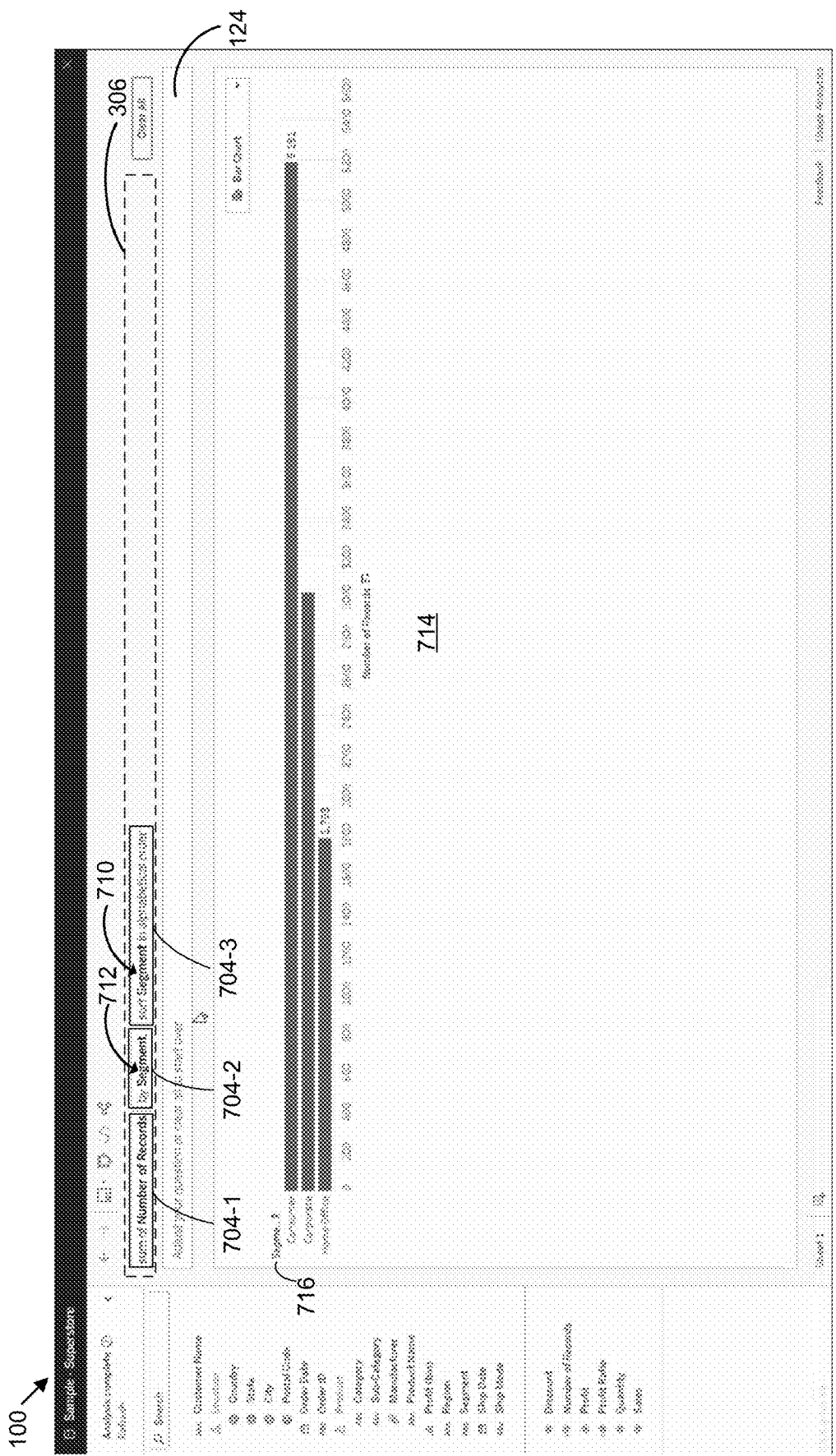

In some instances, a user selects (e.g., via a mouse click, hover, or other input) a first term in a phrase of the phrases. For example, FIG. 7B illustrates a user hovering over the term "Region" 706 in the third phrase 704-3 "sort Region in alphabetical order". In some implementations, in response to the user selection, the term is visually distinguished within the natural language input. For example, the selected term "Region" 706 is underlined in response to the user hovering over the term. In some implementations, in response to the user selection, a widget is generated (e.g., using the widget generation module 254), as shown in FIG. 7C. For example, the widget 708 prompts the user with user-selectable options (e.g., including alternative terms) to replace the selected term 706. The user in FIG. 7C selects an option 710 "Segment" from the widget 708. In response to the user's selection, the term 706 "Region" is replaced with the selected term 710 "Segment" in the third phrase 704-3 "sort [term] in alphabetical order." The user commits the selected term 710 "Segment" (e.g., by selecting "Accept"). This is shown in FIG. 7D.

In some instances, a second phrase (or a term within a second phrase) is dependent on the edited phrase (or the edited term within the edited phrase). For example, the second phrase 704-2 "by Region" is dependent on the third phrase 704-3 "sort Region in alphabetical order" because the sorting field must be compatible with the grouping field. In accordance with a determination that the second phrase is dependent on the third phrase, the user's input to replace the term 704 "Region" with the term 710 "Segment" in the third phrase 704-3 also causes the computing device to automatically update the second phrase 704-2, replacing "Region" with "Segment" 712, as illustrated in FIG. 7D. The second phrase is updated by the computing device automatically without user input (e.g., the user does not manually change "by Region" to "by Segment" after modifying the first term). Further, FIG. 3D illustrates an updated data visualization 714 representing the updated phrases, now sorting the bars in the bar chart by segment in alphabetical order, as indicated by the updated column header 716.

Figure 7E:
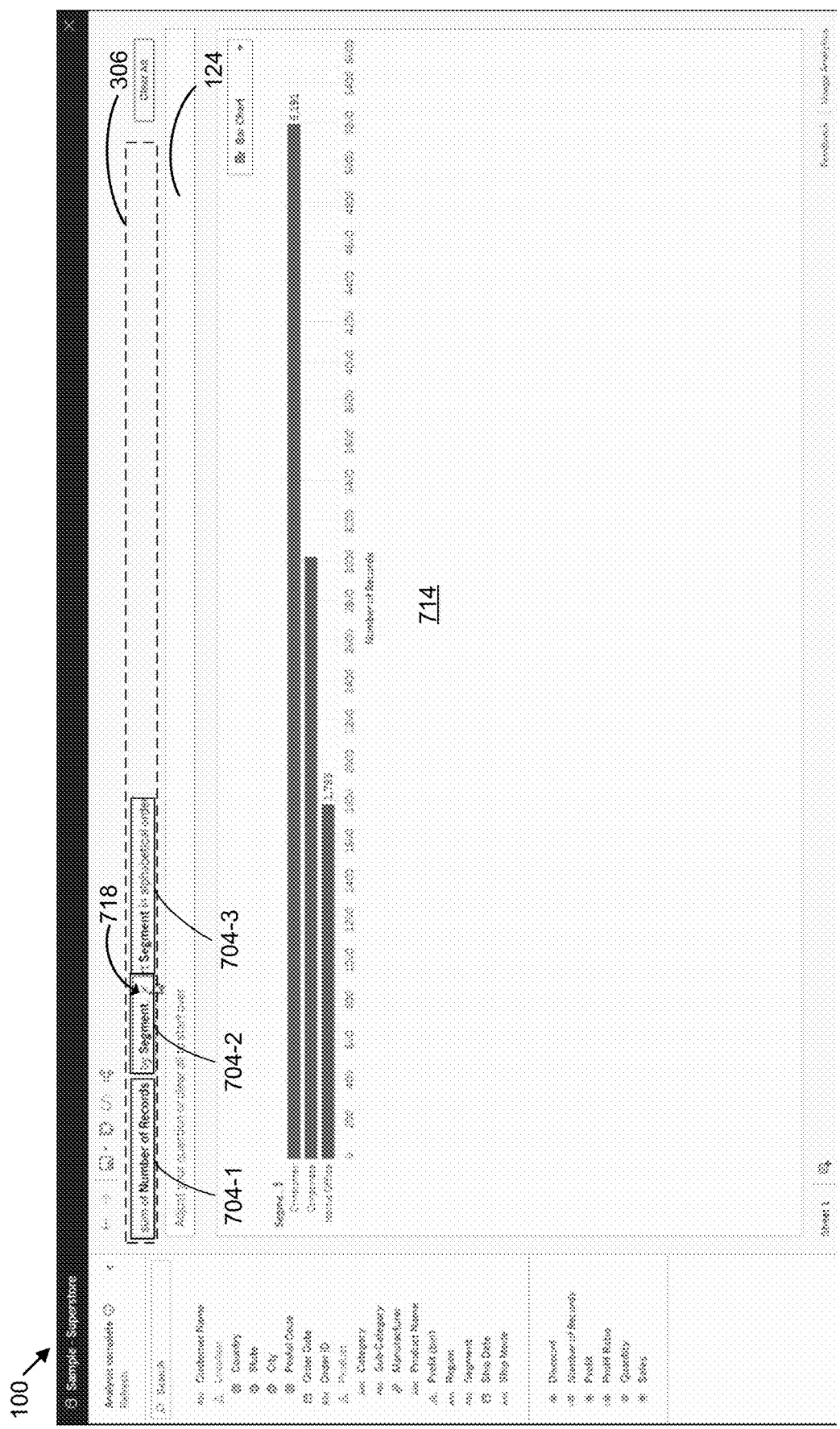
Figure 7F:
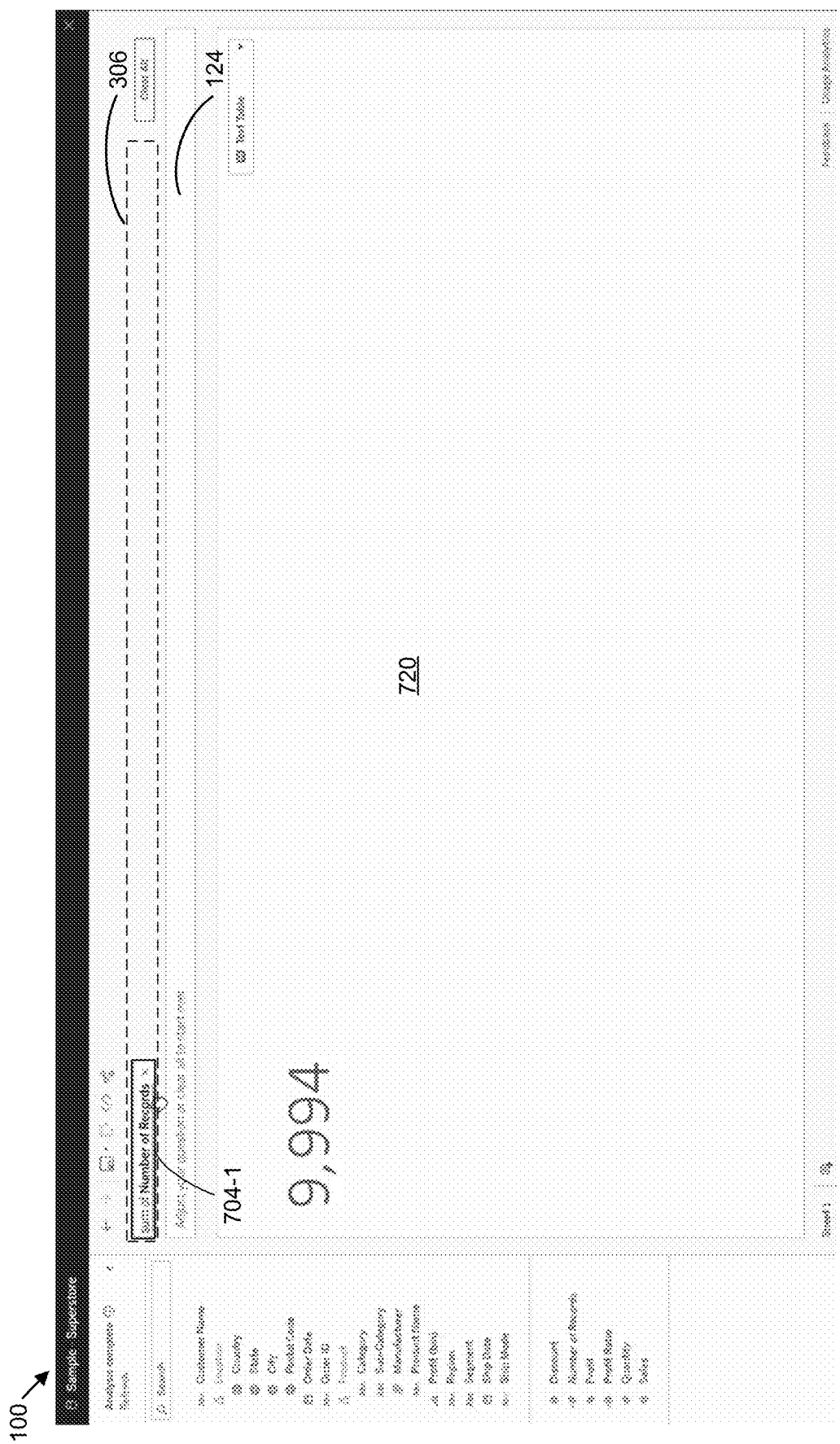

FIGS. 7E and 7F illustrate another example of a user input modifying a term in a phrase, which causes the device to update another phrase (e.g., that is dependent on the first phrase). For example, the user input in FIG. 7E illustrates a user hovering over the second phrase 704-2 "by Segment". In some implementations, the phrases are removable (e.g., may be deleted) by a user input selecting an "x" option 718 (e.g., illustrated in FIG. 7E with a user input indication hovering over the "x" option 718). For example, the "x" option 718 is dynamically generated in response to a user input (e.g., hover) over the text box that includes the phrase. In this example, the computing device determines that the second phrase 704-2 "by Segment" and the third phrase 704-3 "sort Segment in alphabetical order" are dependent on each other.

The user input modifies the second phrase 704-2 by removing the second phrase from the phrases 704. In response to removing the second phrase 704-2 "by Segment", the computing device updates the third phrase 704-3 "sort Segment in alphabetical order" by removing the third phrase. The resulting updated natural language expression is shown in FIG. 7F. As shown in the Figure, the second phrase 704-2 "by Segment" is removed and the third phrase 704-3 "sort Segment in alphabetical order" is automatically removed by the computing device without user input. For example, the user only selected the "x" option 718 for the second phrase, and the computing device, determining that the third phrase is dependent on the second phrase, automatically removed the third phrase instead of raising an error. Thus, the user did not need to manually remove the third phrase in order to fix the expression. FIG. 7F also shows the updated data visualization 720 corresponding to a text table representing the phrase 704-1, "sum of Number of Records." Because there is no data field to specify grouping, all of the rows of data are grouped together to create a single total "9,994" (a text table with a single row and single column).

FIGS. 8A-8F provide a series of screen shots for a graphical user interface 100, which updates the view type of the data visualization based on changes to natural language input.

Figure 8A:
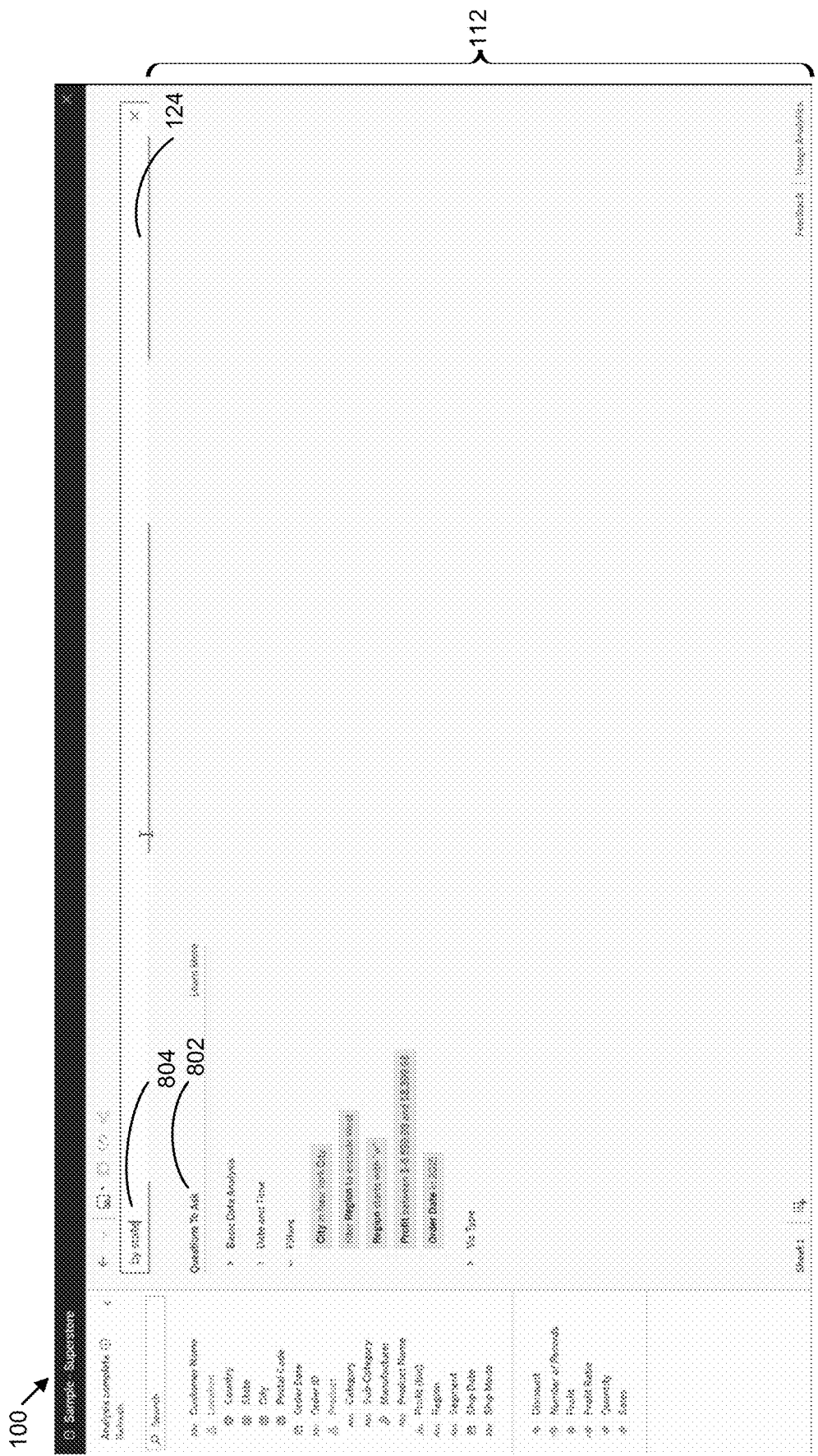
FIGS. 8A-8F provide a series of screen shots for a graphical user interface 100, which updates the view type of the data visualization based on changes to natural language input, according to some implementations.

In some implementations, and as illustrated in FIG. 8A, the data visualization region 112 displays guidelines 802 (e.g., tips or pointers) to assist the user in interacting with the data source. Further details about the guidelines are described in U.S. patent application Ser. No. 16/601,437, filed Oct. 14, 2019, titled "Incremental Updates to Natural Language Expressions in a Data Visualization User Interface," which is hereby incorporated by reference herein in its entirety.

FIG. 8A illustrates a user interaction with the graphical user interface 100. In this example, the user inputs a natural language command 804 "by state" in the command box 124.

Figure 8B:
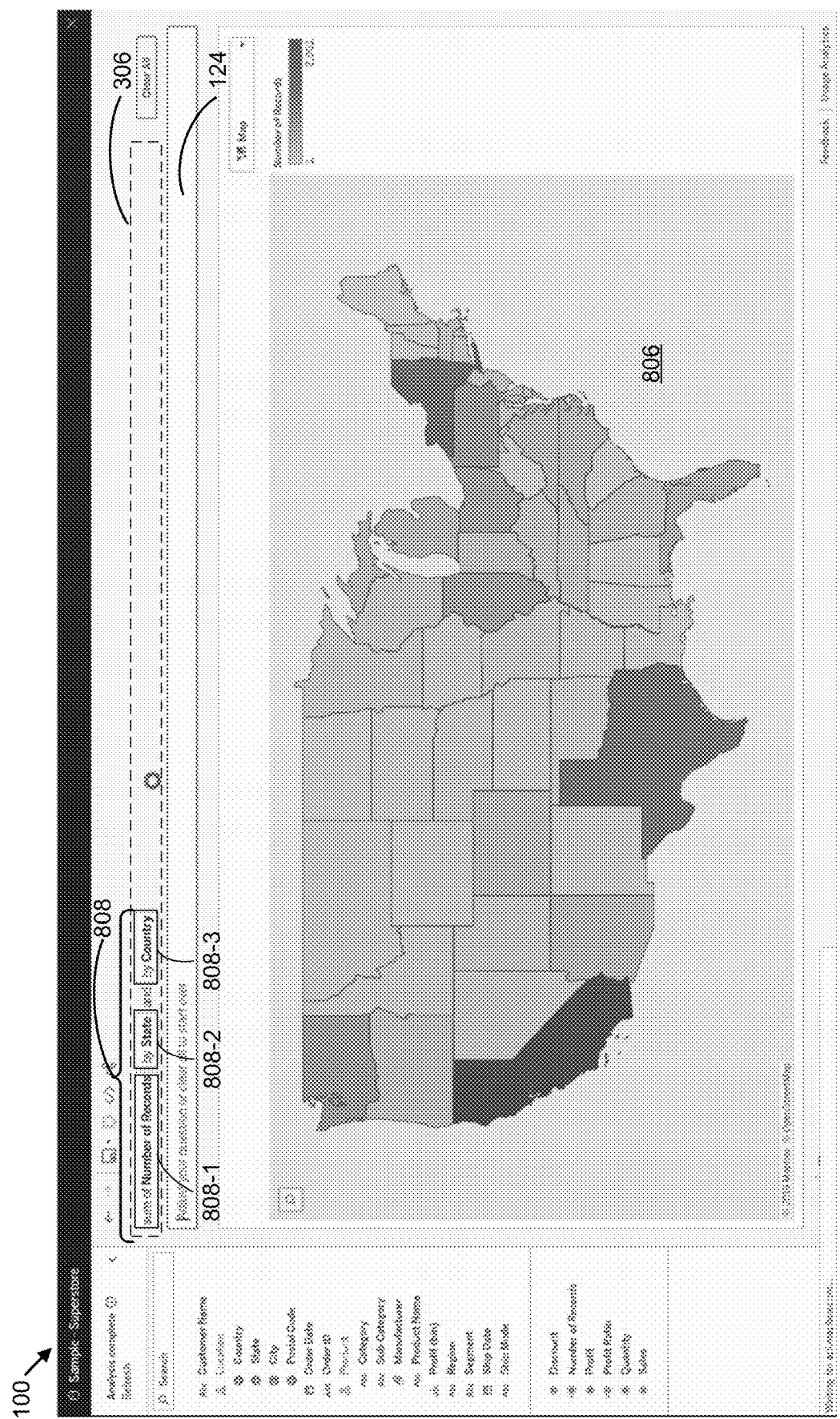

FIG. 8B illustrates a data visualization 806 (e.g., a map) that is generated and displayed in the graphical user interface 100 in response to the command 804. In some implementations, the data visualization application 230 generates a default type of data visualization (e.g., a map or a treemap) in response to a command "by State." In some implementations, the data visualization application 230 also infers default components/fields to be included in the data visualization. As shown in FIG. 8B, the phrases 808 that define the map 806 include a first phrase 808-1 "sum of Number of Records", a second phrase 808-2 "by State", and a third phrase 808-3 "by Country." In this example, the phrases 808-1 and 808-3 are inferred by the data visualization application. In some implementations, the default components/fields are inferred based on one or more of: a closeness of match between extracted analytical phrases and a canonical representation of an analytical expression; the frequency of usage of a field name (e.g., from previous user history); and/or the saliency or weight of a missing term that is inferred from the natural language command, as described in U.S. patent application Ser. No. 16/601,437.

Figure 8C:
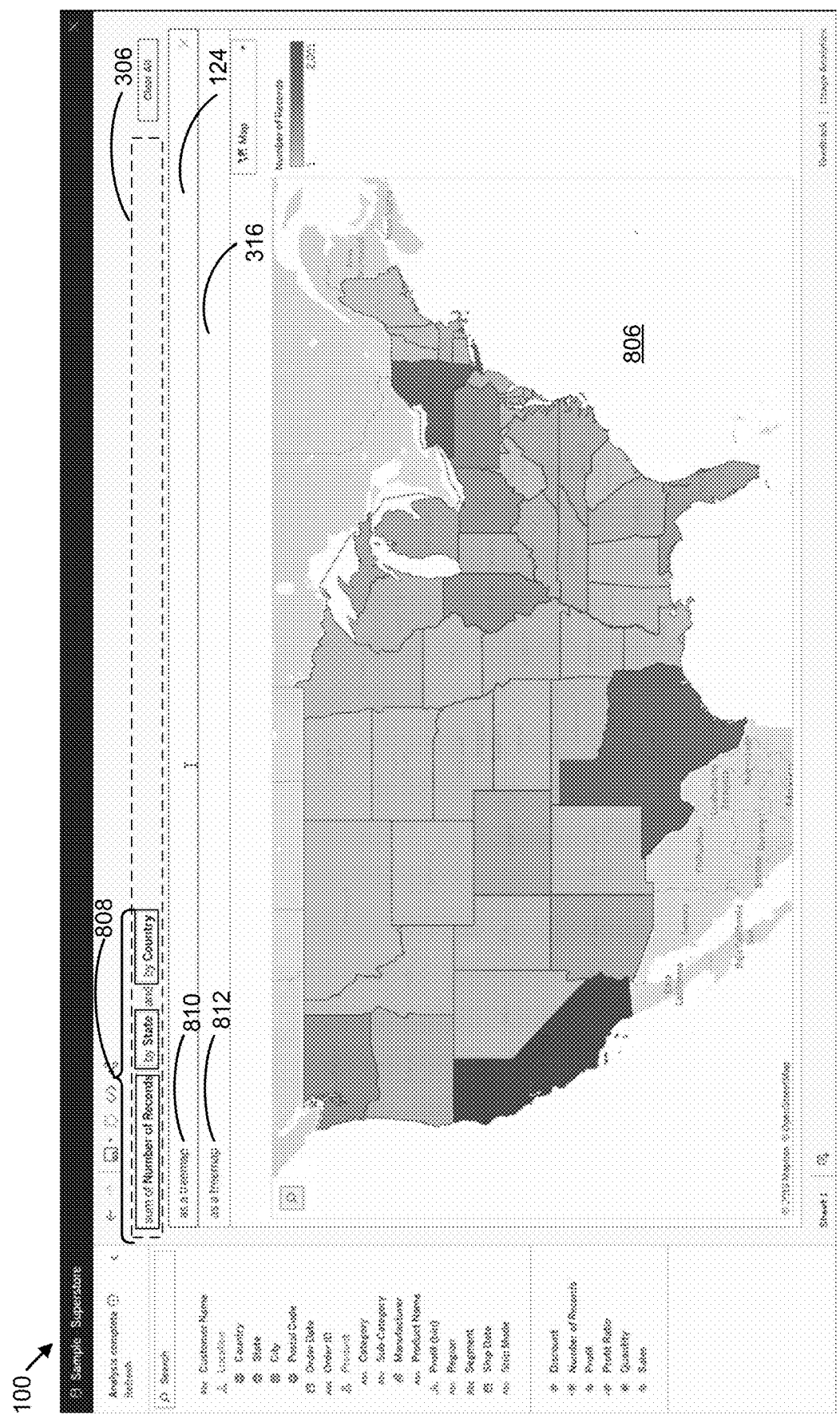

In some implementations, a user specifies the data visualization type as part of the natural language input. For example, as illustrated in FIG. 8C, a user inputs a natural language command 810 "as a treemap" in the command box 124. In response to the natural language command 810, the graphical user interface 100 displays an interpretation 812 "as a treemap" in the dropdown menu 316. The interpretation 812 corresponds to a proposed action to display the data visualization as a treemap.

Figure 8D:
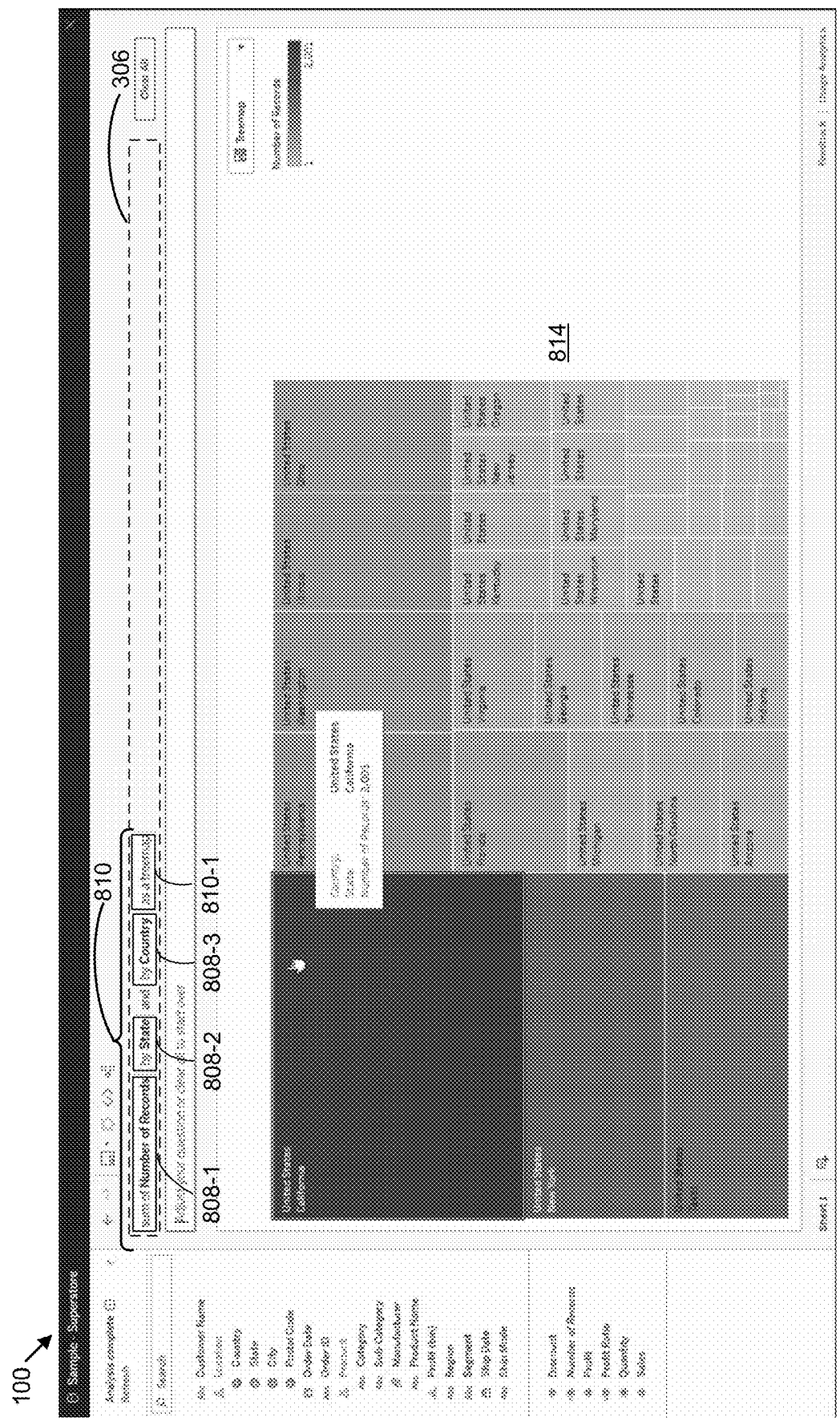

FIG. 8D illustrates an updated data visualization 814 (e.g., a treemap) that is generated and displayed in the graphical user interface 100 in response to user selection of the interpretation 812. The phrase 810-1 "as a treemap" has been added to the phrases 810.

Figure 8E:
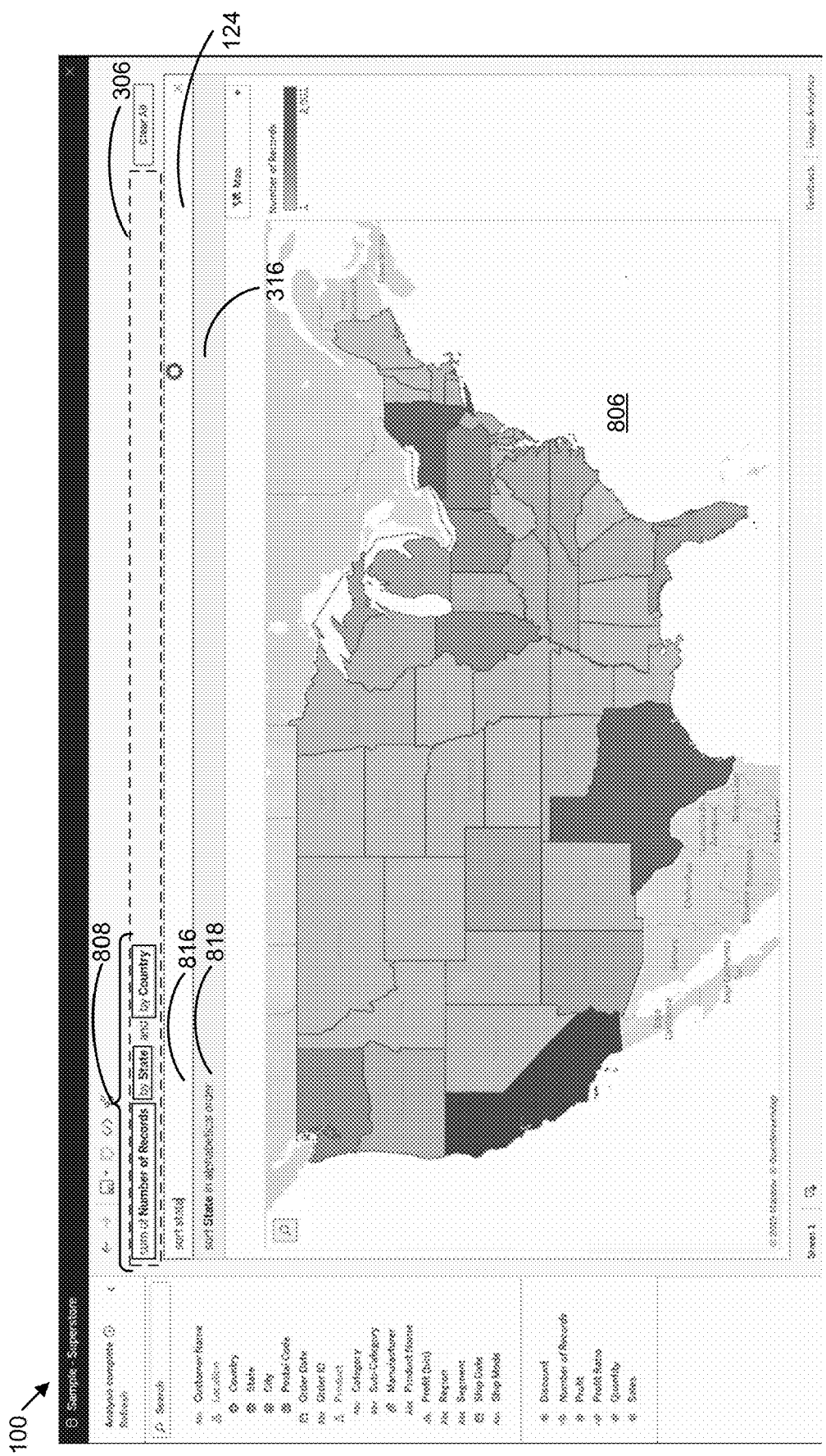

FIG. 8E illustrates another user interaction with the data visualization 806 of FIG. 8B. In this example, the user inputs a natural language command 816 "sort state" in the command box 124. In response to the natural language command 816, the graphical user interface 100 displays an interpretation 818 "sort State in alphabetical order" in the dropdown menu 316. The interpretation 818 corresponds to a proposed action to sort values of the field "State" in alphabetical order.

Figure 8F:
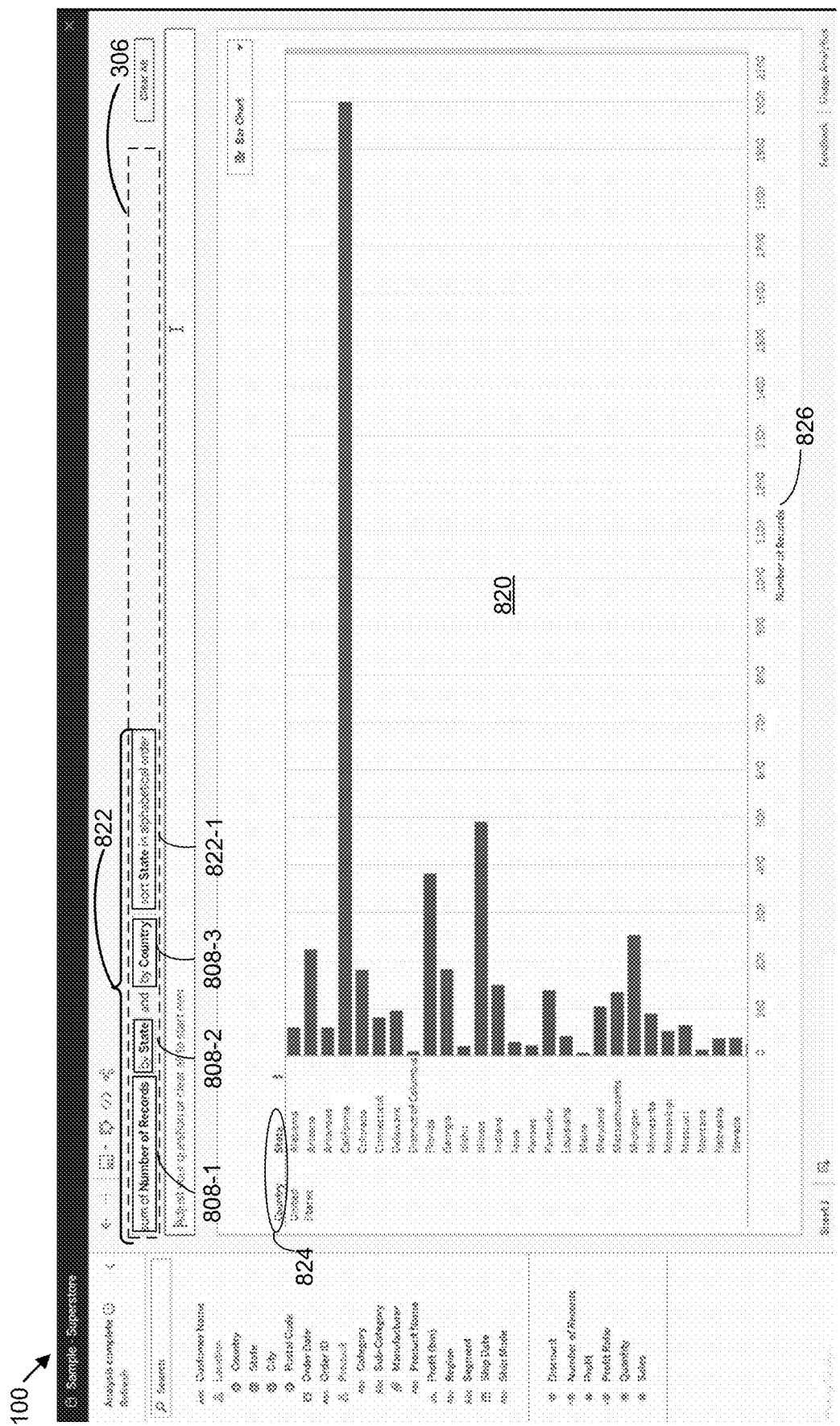

FIG. 8F illustrates an updated data visualization 820 (e.g., a bar chart) that is generated and displayed in the graphical user interface 100 in response to user selection of the interpretation 818. In some implementations, and as illustrated in FIG. 8F, if the initial data visualization is not compatible with a sort expression (such as a map or a treemap), the data visualization application 230 automatically switches to another visualization type (e.g., to a bar chart) that is compatible for visualizing the sort operation.

In FIG. 8F, the y-axis 824 of the bar chart 820 includes the dimensions "Country" and "State," and shows the breakdown of the sum of records by state for country (e.g., United States). The states are sorted in alphabetical order. The x-axis 826 shows the number of records for each state.

FIGS. 9A-9J provide a series of screen shots for updating date fields, according to some implementations.

Figure 9A:
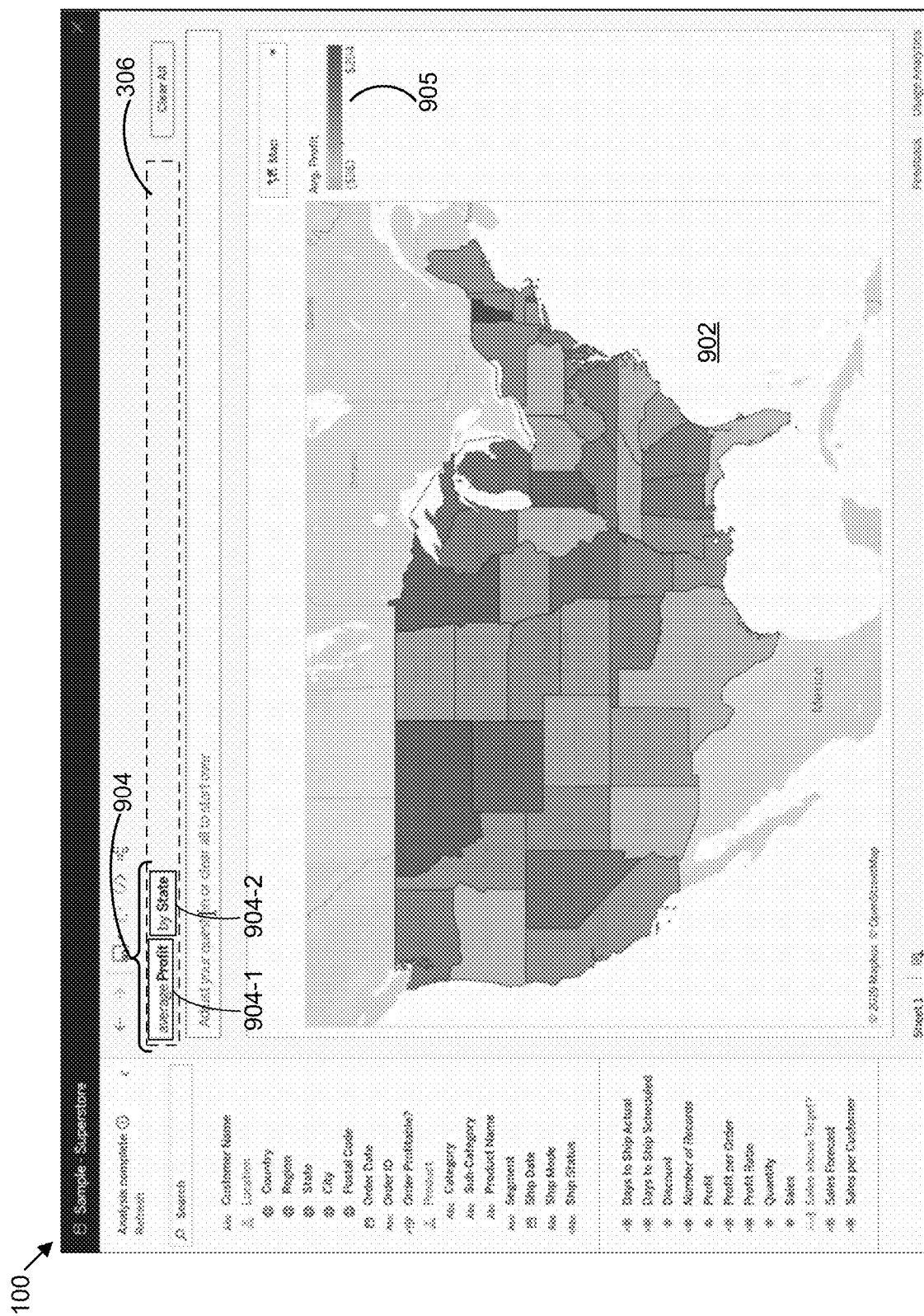
FIGS. 9A-9J provide a series of screen shots for updating date fields, according to some implementations.

FIG. 9A illustrates a data visualization 902 (e.g., a map) that is displayed in the graphical user interface 100. In this example, the data visualization 902 is a map of average profit by state, in which the average profit is calculated for the entire range of dates of the data source. The legend 905 shows the range of average profit (in dollars) and their corresponding color shades. The data visualization 902 is based on the phrase 904, including the first phrase 904-1 "average Profit" and the second phrase 904-2 "by State".

Figure 9B:
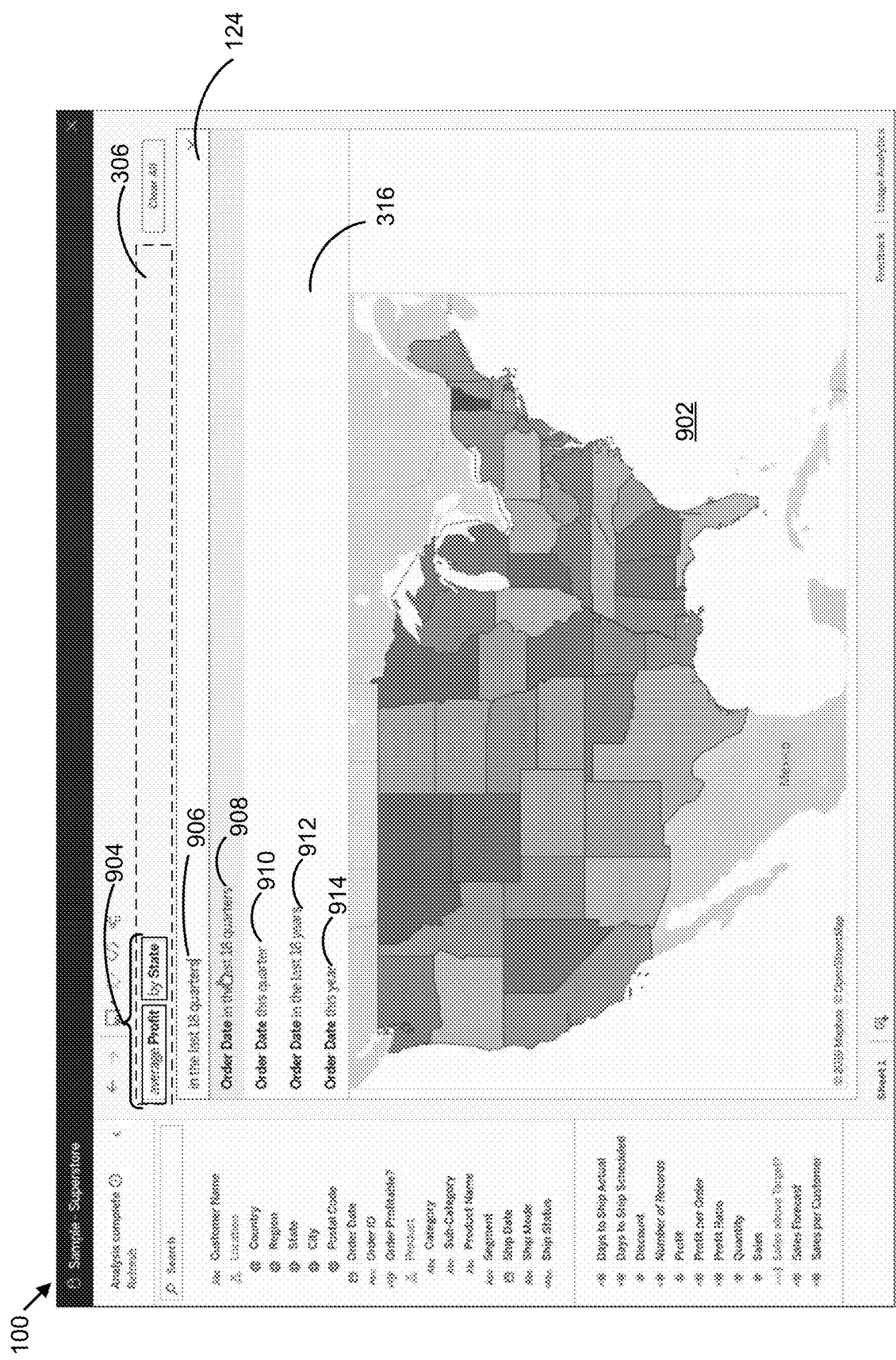

FIG. 9B illustrates a user interaction with the graphical user interface 100. In this example, the user inputs a natural language command 906 "in the last 18 quarters" in the command box 124. In response to the natural language command 906, the graphical user interface 100 displays a first interpretation 908 "Order Date in the last 18 quarters", a second interpretation 910 "Order Date in this quarter", a third interpretation 912 "Order Date in the last 18 years", and a fourth interpretation 914 "Order Date this year." The first interpretation 908 corresponds to a proposed action to filter the displayed data by the field (e.g., a date field) "Order Date," to a time range of "the last 18 quarters" (e.g., the past 18 quarters relative to the current quarter). The second interpretation 910 corresponds to a proposed action to filter the displayed data by "Order Date" to a time range comprising "this quarter" (e.g., the current quarter of the current calendar year). The third interpretation 912 corresponds to a proposed action to filter the displayed data by "Order Date" to the time range of "the last 18 years." The fourth interpretation 914 corresponds to a proposed action to filter the displayed data by "Order Date" for the time range "this year" (e.g., the current year).

Figure 9C:
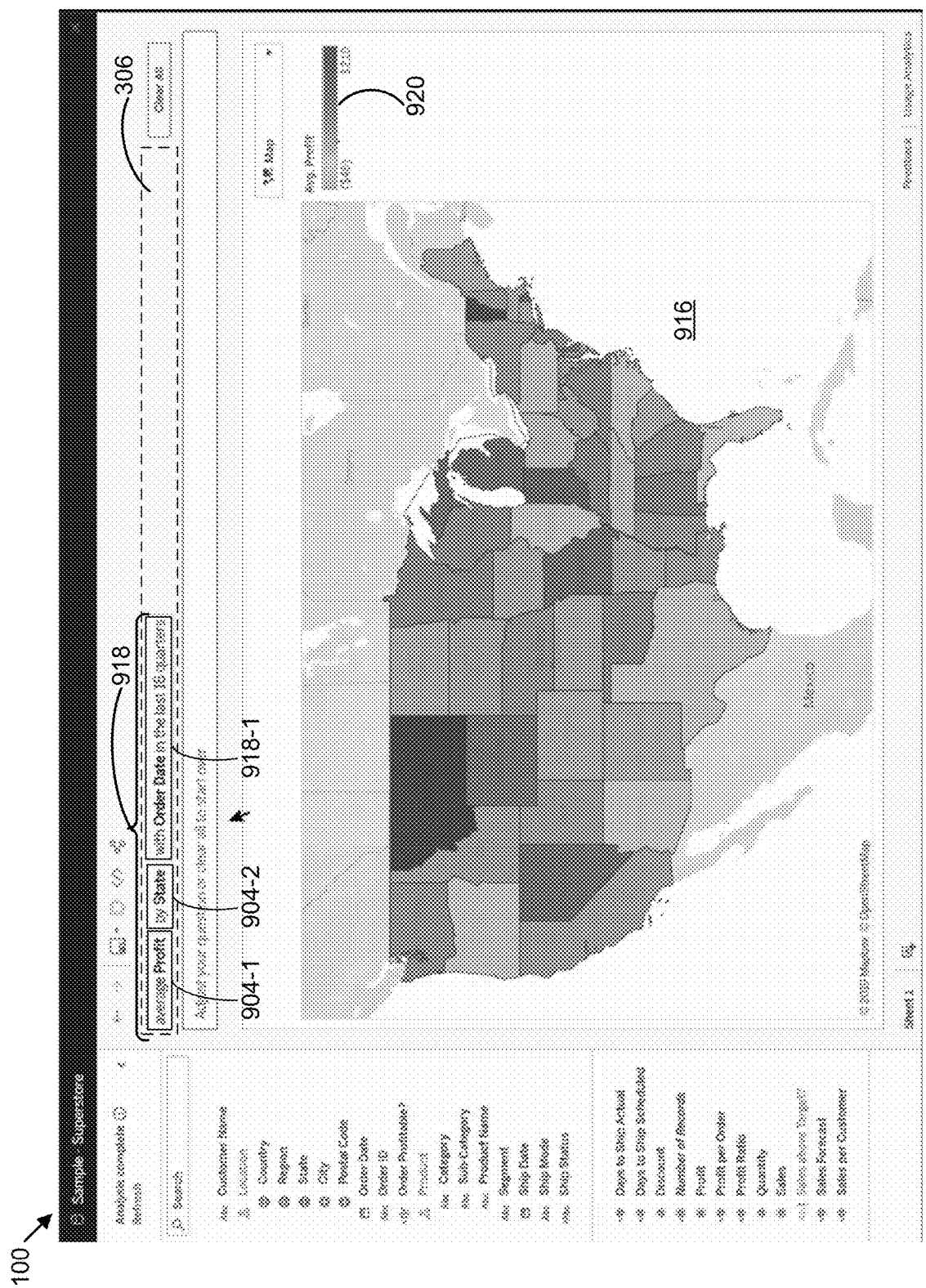

FIG. 9C illustrates an updated data visualization 916 (e.g., a map) that is generated and displayed in the graphical user interface 100 in response to user selection of the interpretation 908. In this example, the data visualization 916 is a map of average profit by state, in which the average profit is computed by applying a filter to the order date, for the last 18 quarters. The updated phrases 918 include the phrase 918-1 "with Order Date in the last 18 quarters". The legend 920 shows the updated range of average profit (in dollars) and their corresponding color shades.

Figure 9D:
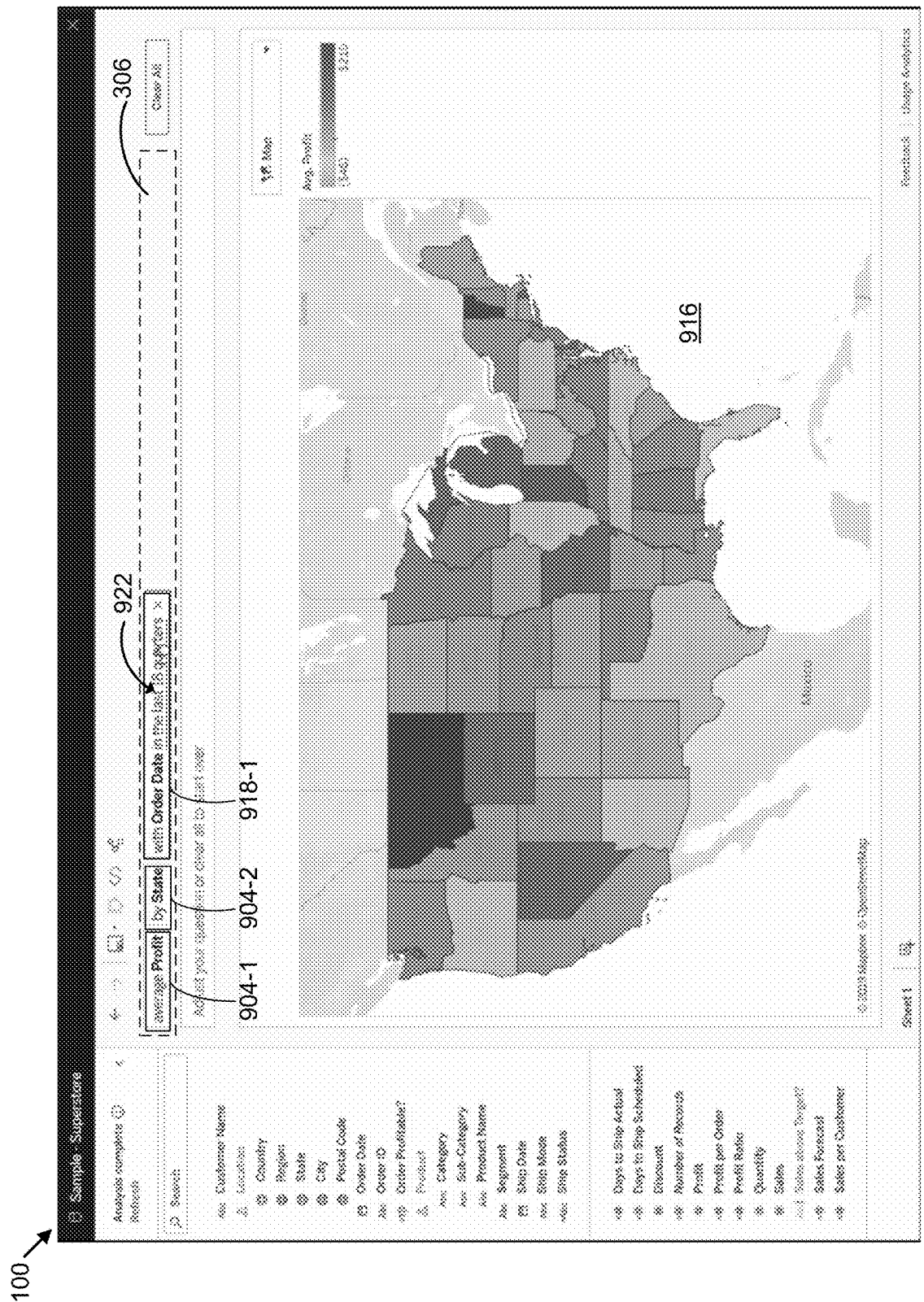
Figure 9E:

FIG. 9D illustrates a user hovering over the term 922 "in the last 18 quarters" in the third phrase 918-1 "with Order Date in the last 18 quarters". In response to user selection of the term 922 "in the last 18 quarters" in FIG. 9D, a widget 924 (e.g., a date widget) is generated and displayed (e.g., using the widget generation module 254), as illustrated in FIG. 9E. The widget 924 displays a range of dates 926 "4/1/2015 to 9/30/2019", corresponding to the time range "in the last 18 quarters" in the phrase 918-1.

In some implementations, and as illustrated in FIG. 9E, the widget 924 includes one or more user-selectable options. In this example, the user-selectable options include options that have a predefined time range, such as the option 928

"Previous quarter", the option 930 "This quarter", and the option 932 "Following quarter." The user-selectable options also include options that have a user-defined time range, such as the option 934 "Last 18 quarters", in which the numerical value "18" (element 940) can be modified by the user, and the option 936 "Next quarters," in which the numerical value is also user-modifiable. The range of dates include past dates (e.g., the options 928 and 934), current dates (e.g., the option 930), and future dates (e.g., the options 932 and 936). The bubble 938 next to the option 934 indicates that option 934 is the currently selected option. The user-selectable options further includes a unit of time option 942, which allows the user to select different units of time (e.g., days, weeks, months, quarters, and years), which in turn translate to different ranges of dates, as explained below.

In some implementations (not shown), the widget 924 includes an option that allows the user to define start and end dates. For example, instead of quarters of a calendar year, the user may enter a range of dates such as "04/18/2019 to 10/25/2019".

Figure 9F:
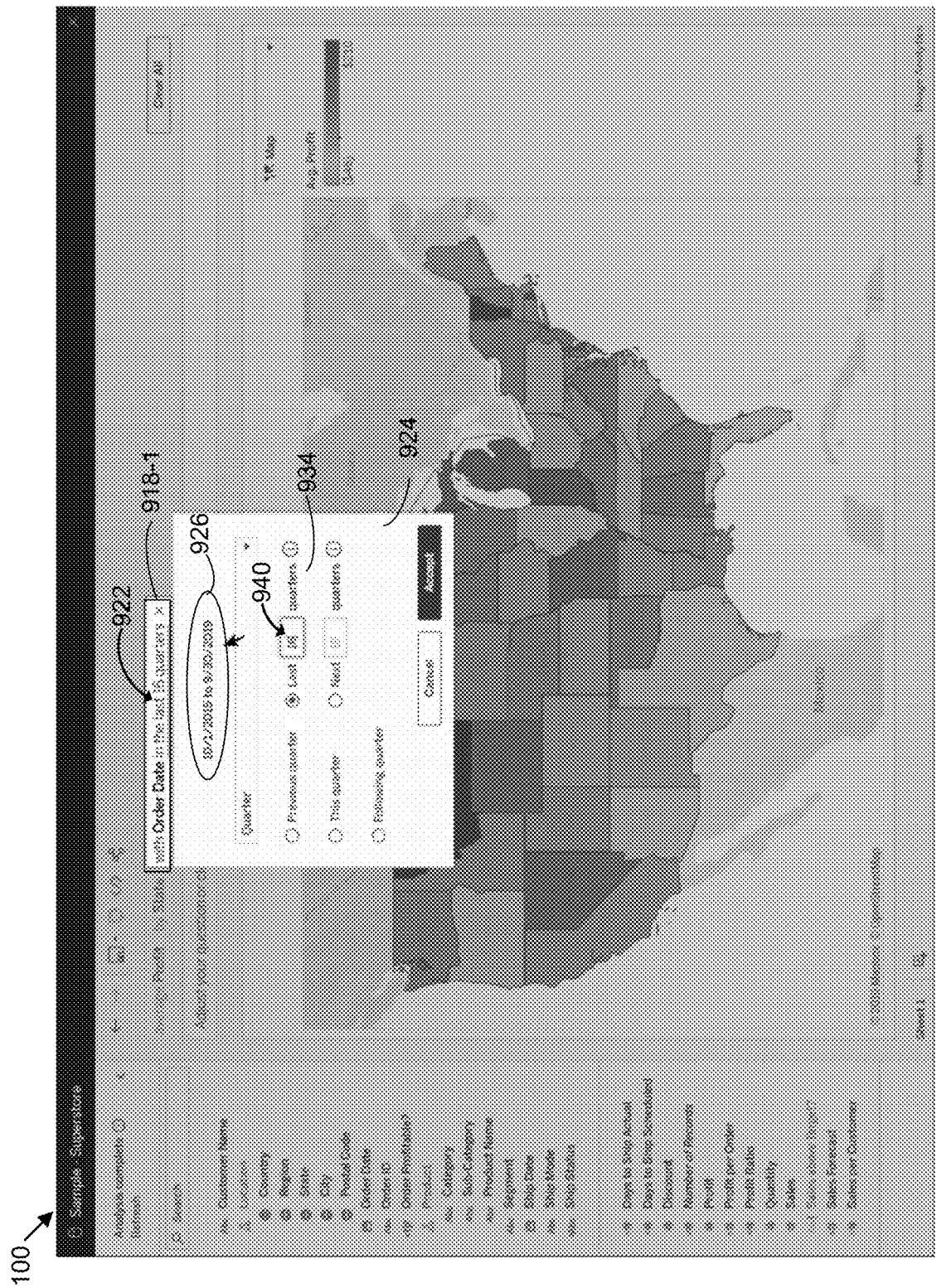

FIG. 9F illustrates a user interaction with the widget 924. In this example, the widget 924 receives user input that modifies the number 940 in option 934 from "Last '18' quarters" in FIG. 9E to "Last '16' quarters" in FIG. 9F. In response to the user input, the widget 924 displays an updated range of dates 926 "10/1/2015 to 9/30/2019", corresponding to the range of dates specified in the user input. The term 922 in the third phrase 918-1 is also updated to "with Order Date in the last 16 quarters", consistent with the user input. Thus, the inclusion of the range of dates feature improves upon the data visualization experience by informing the user, before generating a visualization, the range of dates that will define the data visualization upon user commitment (e.g., by selecting the "Accept" button).

Figure 9G:
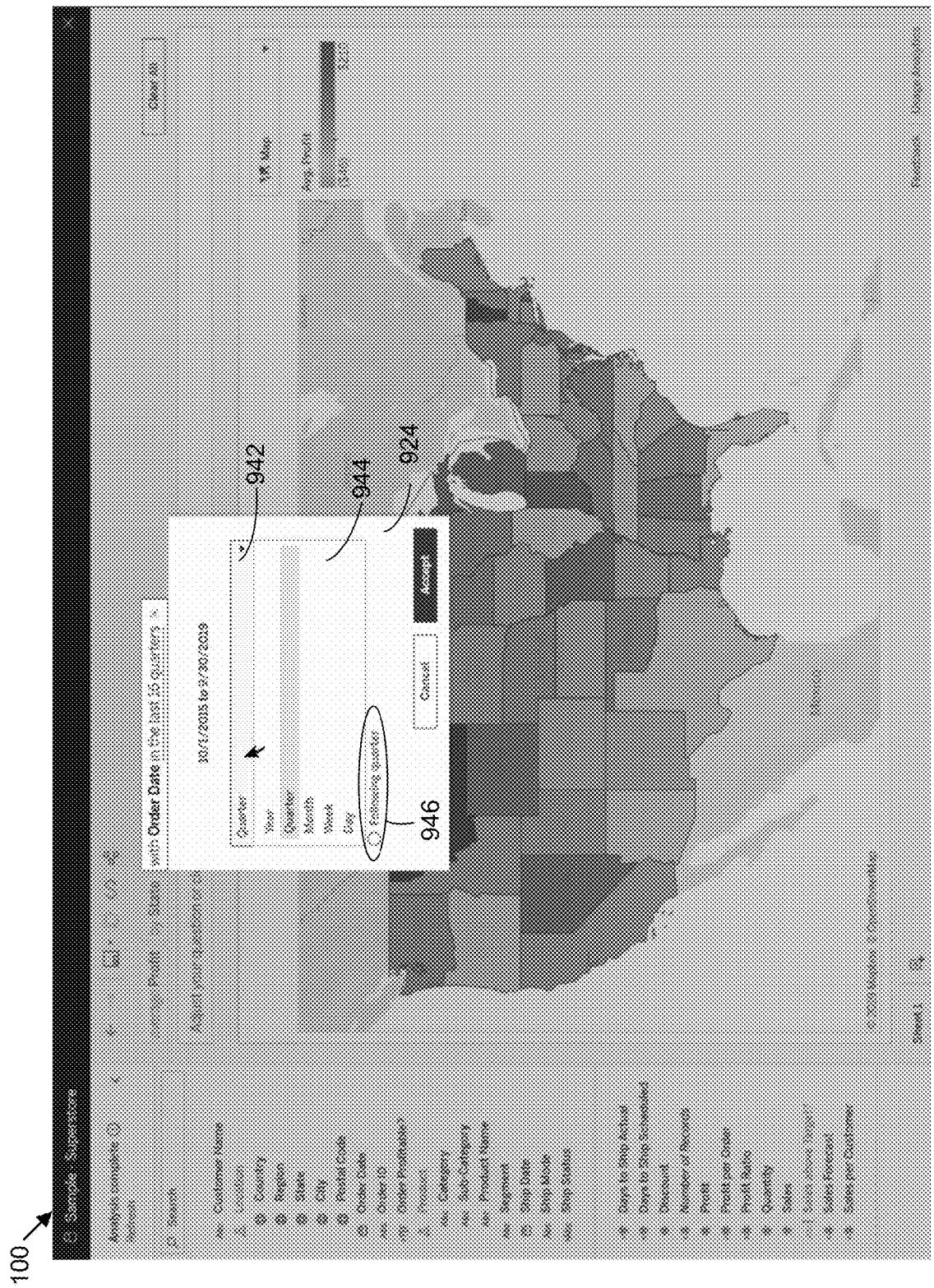

FIG. 9G illustrates another user interaction with the widget 924. In this example, the widget 924 receives user selection of the unit of time option 942. In response to the user selection, the widget 824 displays a dropdown menu 942 that includes options "Year," "Quarter," "Month," "Week," and "Day," each representing a different unit of time. There is also an option 946 for a "Following [unit of time]," which enables future range of dates to be specified.

Figure 9H:
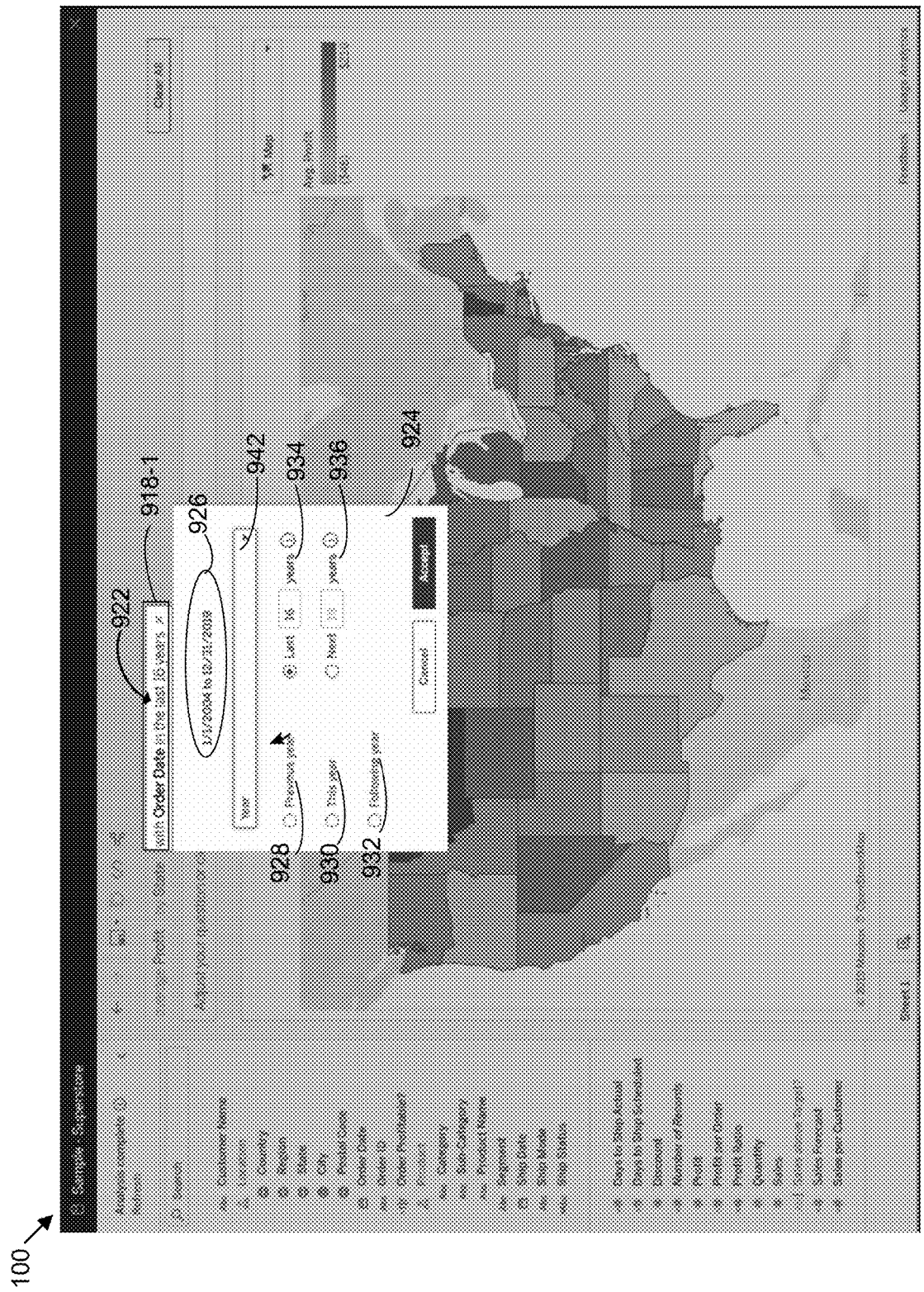

FIG. 9H illustrates user selection of the option "Year" in the unit of time option 942. In response to the user selection, the Widget Generation Module 254 updates the unit of time in the user-selectable options 928, 930, 932, 934, and 936 from "quarter" in FIG. 9E to "year" in FIG. 9G. The widget 924 displays the options with the updated unit of time. The widget 924 also displays an updated range of dates 926 "1/1/2004 to 12/31/2019", corresponding to the range of dates of the selected option 934. The term 922 in the third phrase 918-1 is also updated to "with Order Date in the last 16 years," consistent with the user selection.

Figure 9I:
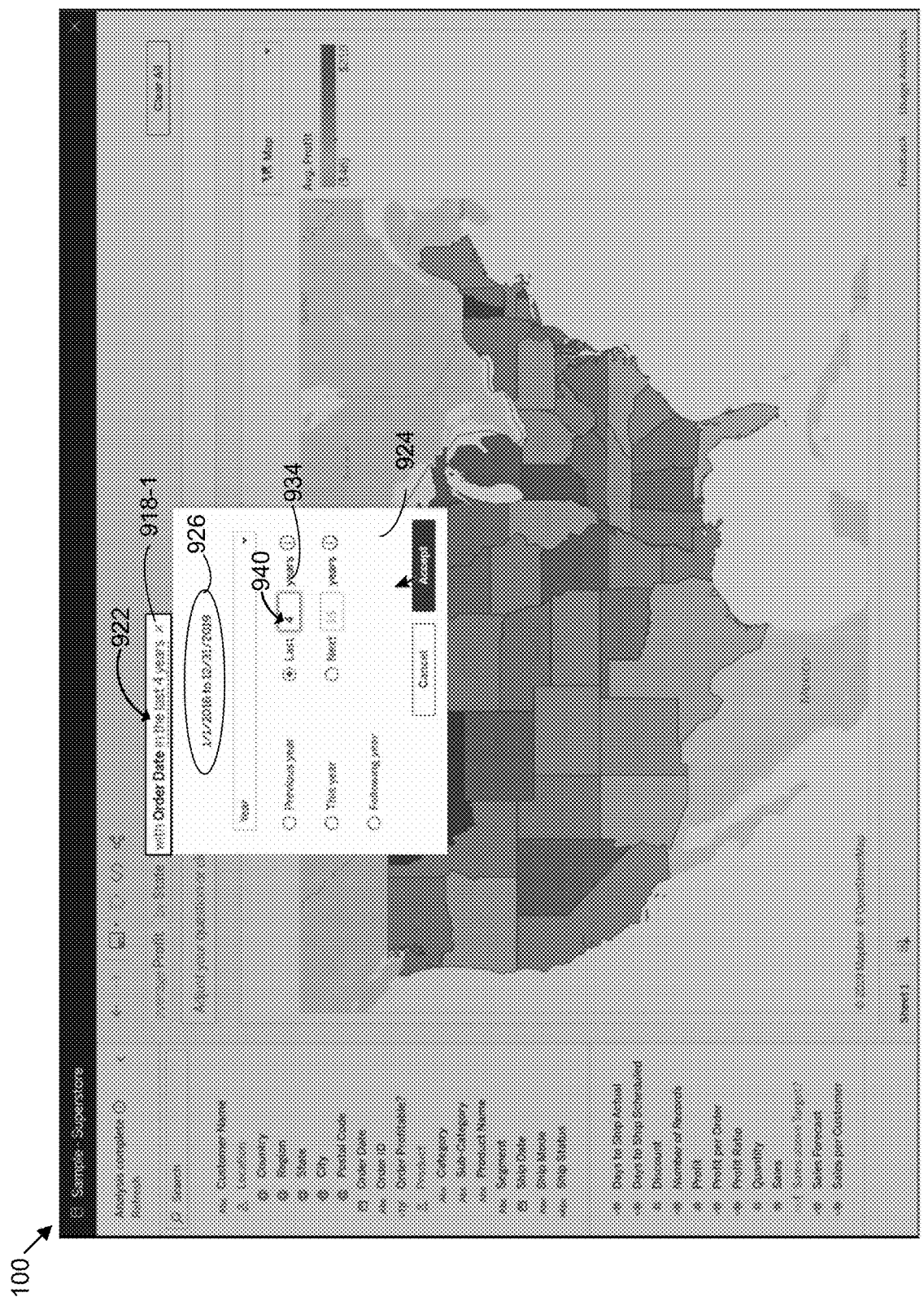

FIG. 9I illustrates another user interaction with the widget 924. In this example, the widget 924 receives user input that modifies the number 940 in option 934 from "Last '16' years" in FIG. 9H to "Last '4' years" in FIG. 9I. In response to the user input, the widget 924 displays an updated range 926 "1/1/2016 to 12/31/2019," which corresponds to the range of dates for the last 4 years. The graphical user interface 100 also displays an updated third phrase 918-1, in which the term 922 is changed to "in the last 4 years."

Figure 9J:
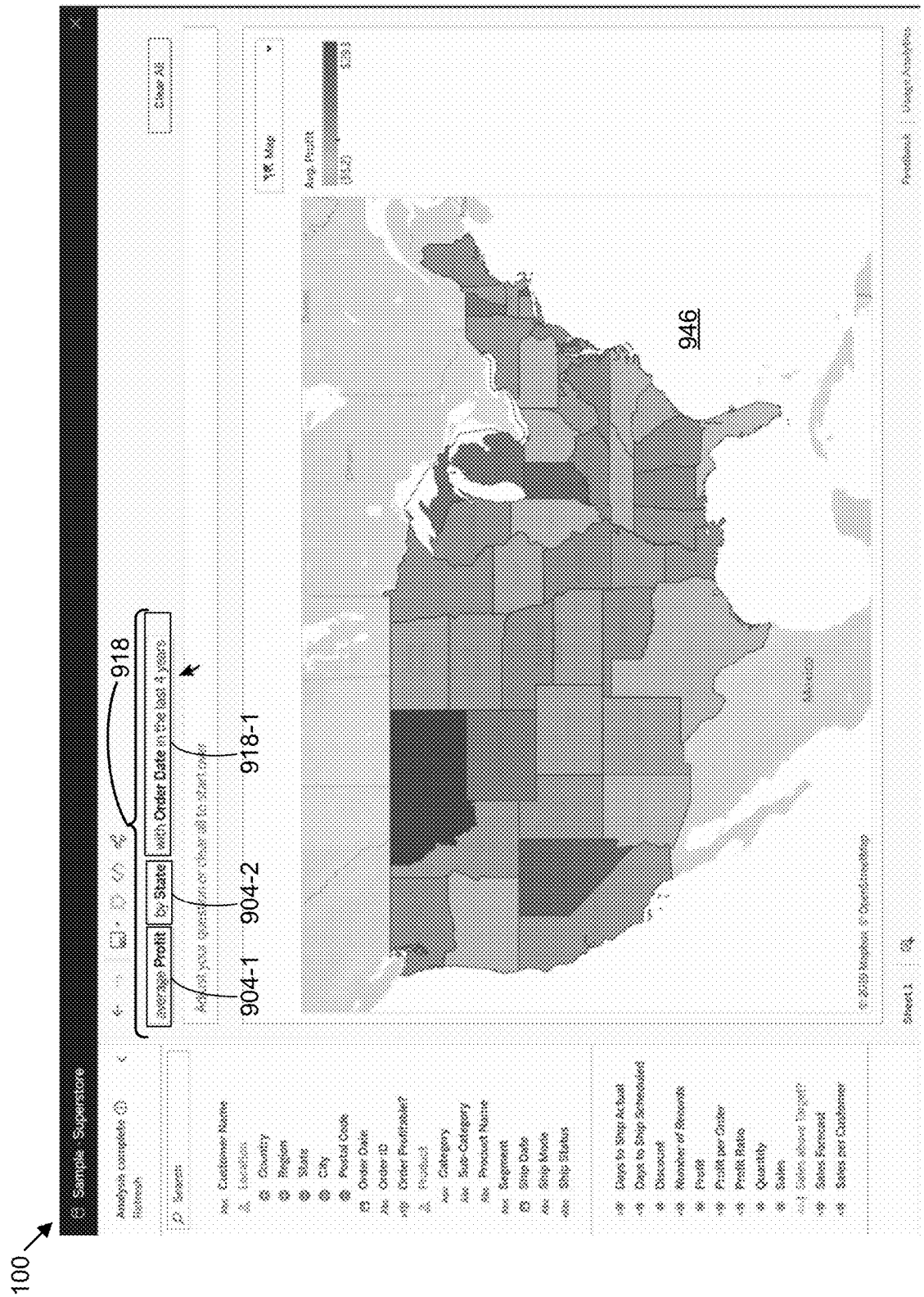
Figure 10A:
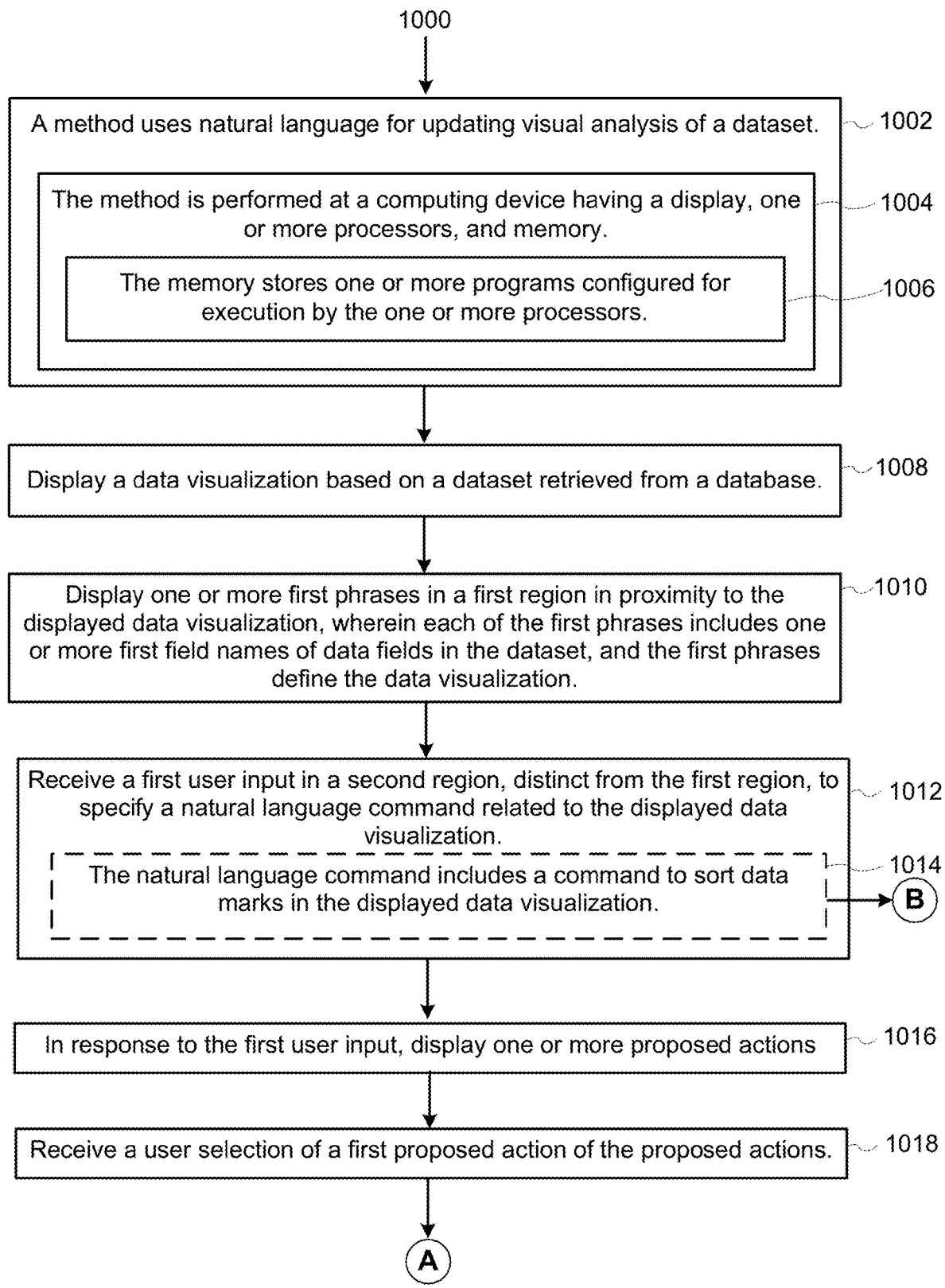
Figure 10B:
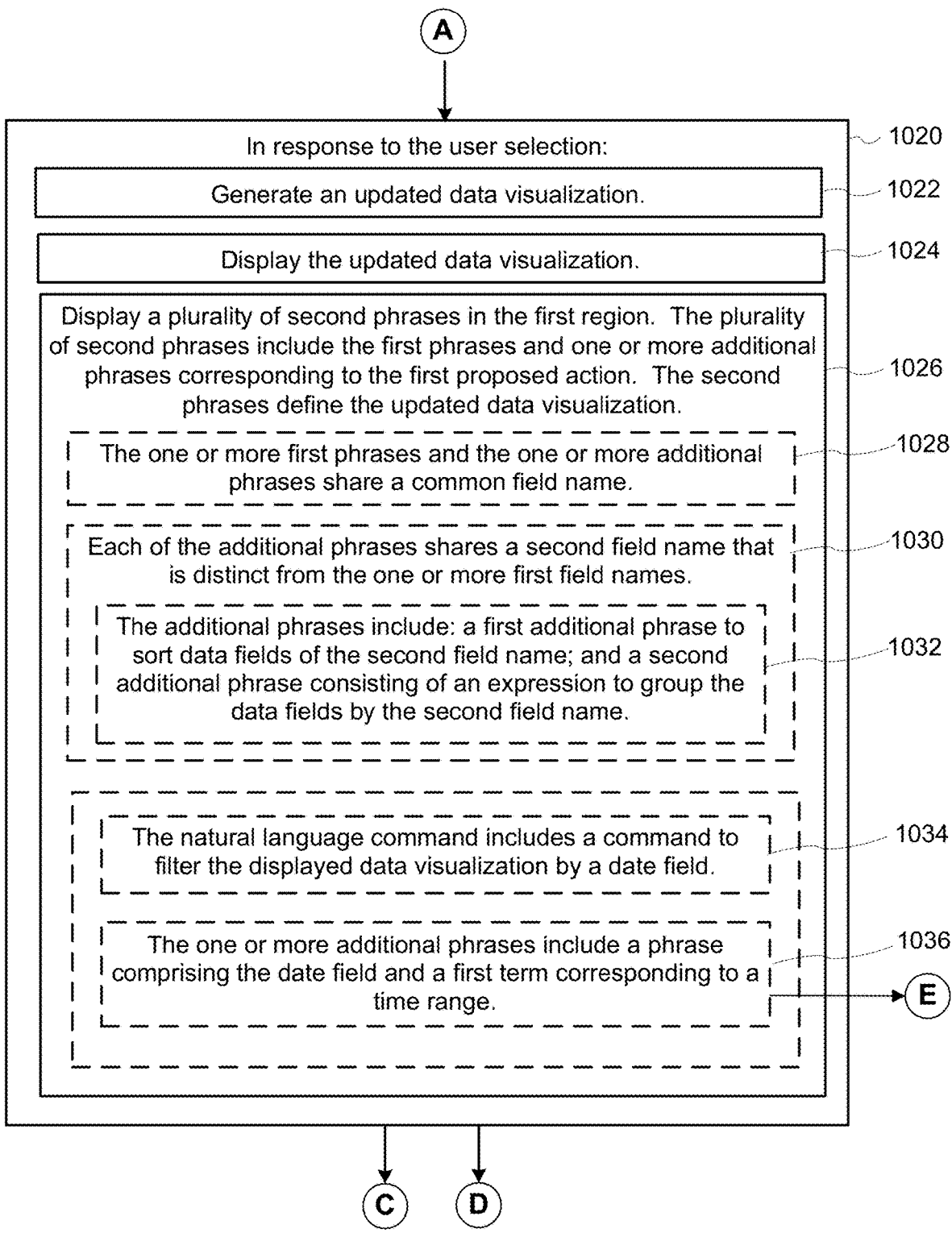
Figure 10D:
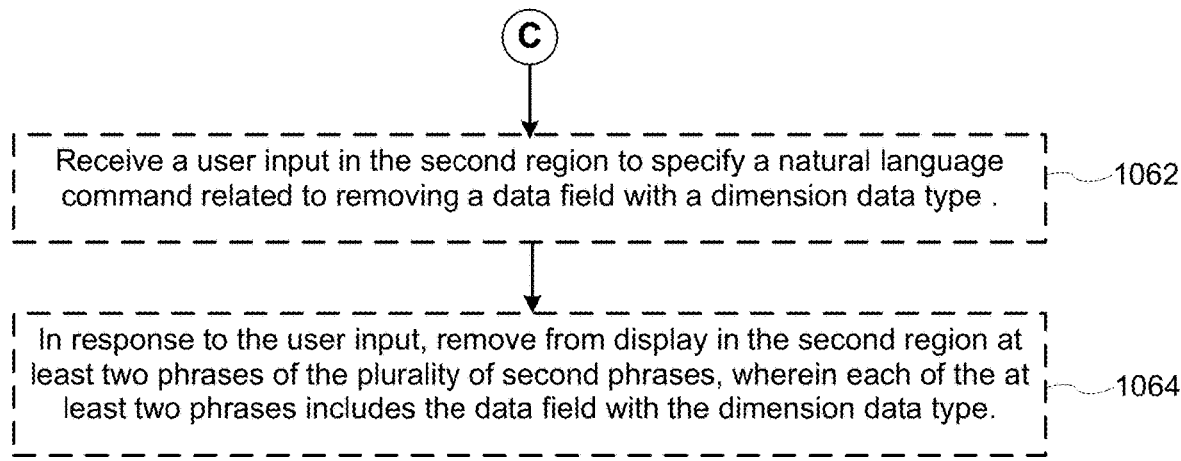
Figure 10E:
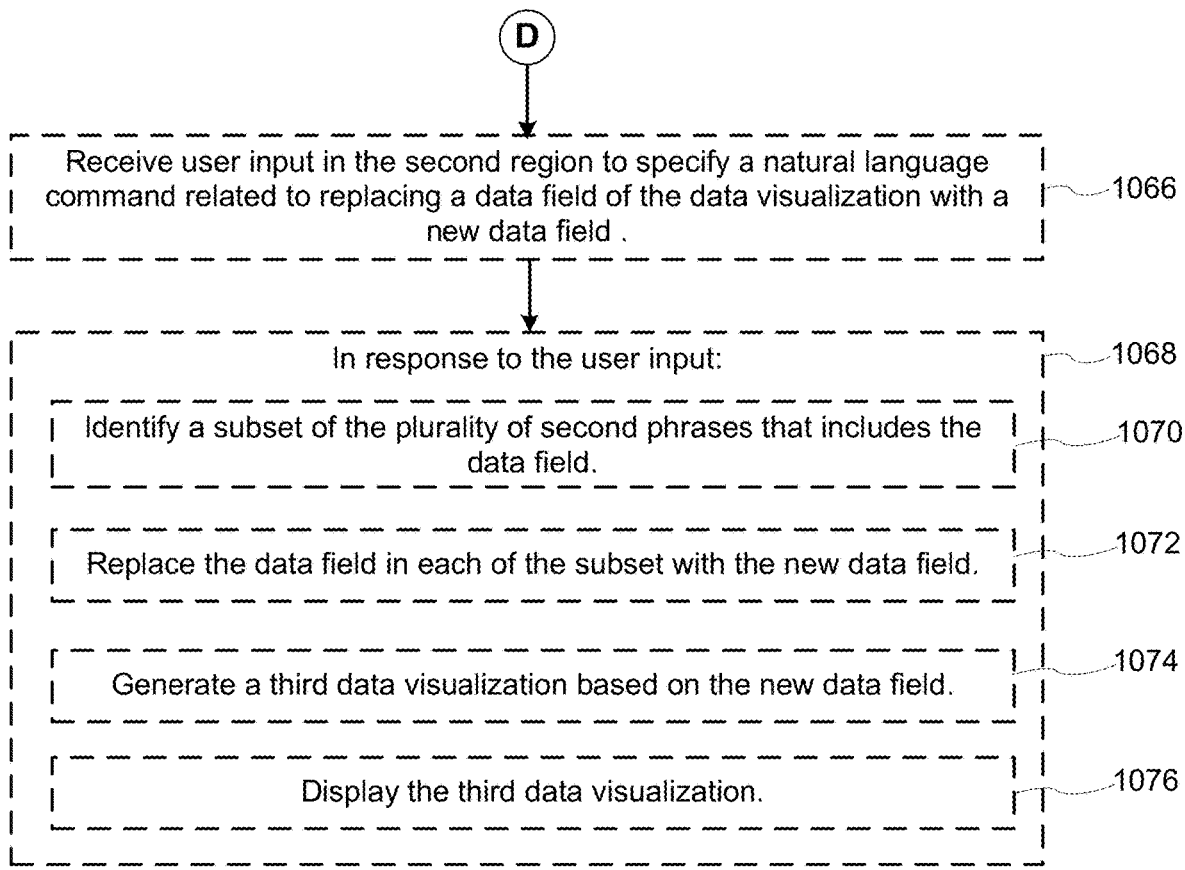
Figure 10F:
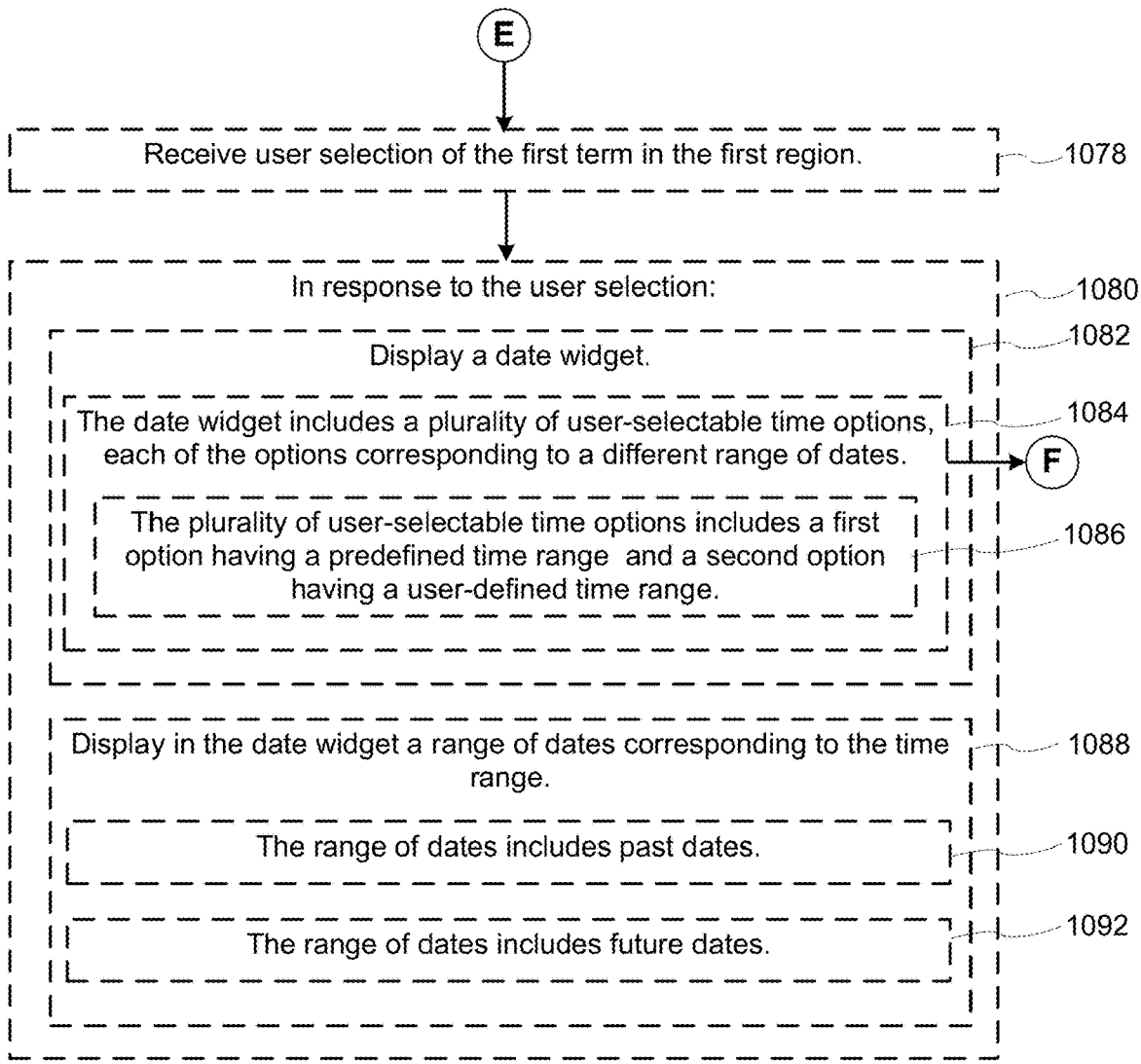
Figure 10G:
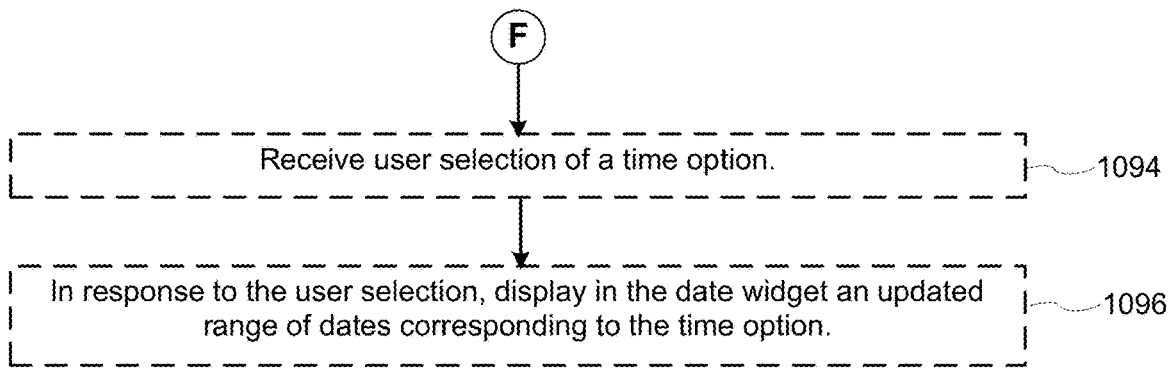

FIG. 9J illustrates a data visualization 946 (e.g., a map) that is automatically generated and displayed in the graphical user interface 100 in response to user commitment of the selection and input in FIGS. 9H and 9I (e.g., by selecting "Accept" button in FIG. 9I). The data visualization 946 is defined by the phrases 918 "average Profit" 904-1, "by State" 904-2, and "with Order Date in the last 4 years" 918-1.

FIGS. 10A-10E provide a flowchart of a method 1000 for updating (1002) visual analysis of datasets according to some implementations. The method 1000 is also called a process.

The method 1000 is performed (1004) at a computing device 200 that has a display 212, one or more processors 202, and memory 206. The memory 206 stores (1006) one or more programs configured for execution by the one or more processors 202. In some implementations, the operations shown in FIGS. 3A to 9J correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 1000 may be combined and/or the order of some operations may be changed.

The computing device 200 displays (1008) a data visualization based on a dataset retrieved from a database. For example, the computing device displays the data visualization 302 as illustrated in FIG. 3A.

The computing device 200 displays (1010) one or more first phrases in a first region in proximity to the displayed data visualization. Each of the first phrases includes one or more first field names of data fields in the dataset. The first phrases define the data visualization. For example, the computing device displays one or more phrases 308 in the region 306 as illustrated in FIG. 3A. The phrases 308 include the phrase 308-1 "sum of Sales" and the phrase 308-2 "by Region," which define the data visualization 302. The phrase 308-1 "sum of Sales" includes the field name "Sales." The phrase 308-2 "by Region" includes the field name "Region."

The computing device 200 receives (1012) a first user input in a second region, distinct from the first region, to specify a natural language command related to the displayed data visualization. For example, the computing device receives the user input via the command box 124 of the graphical user interface 100. The command box 124 is distinct from the region 306, as illustrated in FIGS. 3A to 9J.

In some instances, the natural language command includes (1014) a command to sort data marks in the displayed data visualization. For example, as illustrated in FIG. 3B, the natural language command 310 "sort Region" includes a command to sort data marks of the data field "Region" in the displayed data visualization 302.

In response to the first user input, the computing device displays (1016) one or more proposed actions. For example, the computing device displays the proposed action 312 "sort Region in descending order by sum of Sales" and the proposed action 314 "sort Region in alphabetical order," as illustrated in FIG. 3B.

The computing device 200 receives (1018) user selection of a first proposed action of the proposed actions. For example, the computing device receives user selection of the proposed action 314 "sort Region in alphabetical order."

In response (1020) to the user selection, the computing device 200 generates (1022) an updated data visualization.

The computing device 200 displays (1024) the updated data visualization. For example, the computing device displays the updated data visualization 318.

The computing device 200 displays (1026) a plurality of second phrases in the first region. The plurality of second phrases include (1026) the first phrases and one or more additional phrases corresponding to the first proposed action. The second phrases define (1026) the updated data visualization. For example, the computing device displays updated phrases 320, as illustrated in FIG. 3C. The updated phrases 320 define the data visualization 318. The updated phrases 320 include the phrase 308-1 "sum of Sales" and the phrase 308-2 "by Region," and an additional phrase 320-1 "sort Region in alphabetical order" corresponding to the proposed action 314.

In some instances, the one or more first phrases and the one or more additional phrases share (1028) a common field name. For example, the phrase 308-2 "by Region" and the additional phrase 320-1 "sort Region in alphabetical order" share a common field name "Region."

In some instances, each of the additional phrases shares (1030) a second field name that is distinct from the one or more first field names. For example, as illustrated in FIG. 6A, the phrases 516 that define the data visualization 512 include the phrase 308-1 "sum of Sales," the phrase 516-1 "by Ship Status", and the phrase 516-2 "sort Ship Status in descending order by sum of Sales." The phrases 516 include the field names "Sales" and "Ship Status." In FIG. 6B, the phrases 610 that define the data visualization include the phrases 516 of FIG. 6A, a first additional phrase 610-1 "by Region", and a second additional phrase 610-2 "sort Region in descending order by sum of Sales." Each of the additional phrases (e.g., the phrases 610-1 and 610-2) shares a field name "Region" that is distinct from the field names included in the phrases 516.

In some instances, the additional phrases include (1032) a first additional phrase to sort data fields by the second field name and a second additional phrase consisting of an expression to group the data fields by the second field name. For example, in FIG. 6B, the additional phrases include the phrase 610-2 "sort Region in descending order by sum of Sales," which includes a sort expression to sort data fields by "Region." The additional phrases also include the phrase 610-1 "by Region," which consists of an expression to group the data fields by "Region."

In some implementations, the natural language command includes (1034) a command to filter the displayed data visualization by a date field. The one or more additional phrases include (1036) a phrase comprising the date field and a first term corresponding to a time range. For example, as illustrated in FIG. 9B, in response to the natural language command 906 "in the last 18 quarters," the computing device displays the interpretation 908 "Order Date in the last 18 quarters." The interpretation 908 corresponds to a proposed action to filter "average profit by state" based on the attribute (e.g., field) "Order Date" having values "in the last 18 quarters." The phrase 918-1 "with Order Date in the last 18 quarters" comprises the date field "Order Date" and comprises a term "in the last 18 quarters" corresponding to a time range (e.g., past 18 quarters).

In some instances, the computing device 200 receives (1038) a second user input to modify a field name that is included in a phrase of the plurality of second phrases. In response (1050) to the second user input, the computing device 200 updates (1052) the phrase with a modified field name based on the second user input. The computing device 200 updates (1054), automatically and without user intervention, a different phrase of the plurality of second phrases with the modified field name. The computing device 200 displays (1056) in the first region the updated phrase and the updated different phrase. The computing device 200 generates (1058) a second data visualization based on the modified field name. The computing device 200 further displays (1060) the second data visualization.

For example, as illustrated in FIGS. 7C, the computing device receives a user input to change the field "Region" to the field "Segment" in the phrase 704-3 "sort Region in alphabetical order." In response to the user input, the computing device changes the phrase 704-3 to "sort Segment to alphabetical order," as illustrated in FIG. 7D. The computing device also updates, automatically and without user intervention, the phrase 704-2, changing it from "by Region" to "by Segment," as illustrated in the transition from FIG. 7C to FIG. 7D. The computing device generates a second data visualization 714 based on the modified field name.

In some instances, receiving (1040) a second user input to modify a field name that is included in a phrase of the plurality of second phrases includes receiving (1042) user selection of the field name in the phrase in the first region. In response (1044) to the user selection, the computing device 200 displays (1046) a data widget that includes a plurality of user-selectable options. Each of the options corresponds to a field name in the data set. The computing device 200 receives (1048) user selection of a first option of the plurality of user-selectable options. The first option corresponds to the modified field name.

For example, in FIG. 7B, the computing device receives user selection of the term "Region" 706 in the region 306 of the graphical user interface 100. In response to the user selection, the computing device displays widget 708. The widget 708 includes a plurality of user-selectable option, such as "Product name," "Profit," "Ship Date," "Ship Mode," and "State," each corresponding to a field name in the data set. The computing device receives user selection of the field name "Segment" that is displayed in the widget 708.

In some implementations, the method 1000 further comprises: receiving (1062) a user input in the second region to specify a natural language command related to removing a data field with a dimension data type. In response to the user input, the computing device 200 removes (1064) from display in the second region at least two phrases of the plurality of second phrases. Each of the at least two phrases includes the data field with the dimension data type. For example, the computing device receives a user input in the command box 124 to specify the natural language command 402 "remove region." The natural language command 402 is related to removing the field "Region," which has a dimension data type (e.g., the field Region includes categorical data such as "East," "Central," South," and "West"). In response to the natural language command 402, the computing device 200 removes from display in the region 306 the phrase 308-2 "by Region" and the phrase 320-1 "sort Region in alphabetical order." Each of the phrases 308-2 and 320-1 includes the data field "Region."

In some implementations, the method 1000 further comprises: receiving (1066) user input in the second region to specify a natural language command related to replacing a data field of the data visualization with a new data field. In response (1068) to the user input, the computing device 200 identifies (1070) a subset of the plurality of second phrases that includes the data field. The computing device 200 replaces (1072) the data field in each of the subset with the new data field. The computing device 200 generates (1074)

a third data visualization based on the new data field. The computing device 200 then displays (1076) the third data visualization.

For example, the computing device receives user input in the command box 124 to specify the natural language command 502 "replace ship mode with ship status." The command 502 is related to replacing a data field "Ship Mode" of the data visualization 410 with a new data field "Ship Status." In response to the user input, the computing device identifies, from the phrases 412, a first phrase 338-1 "by Ship Mode" and a second phrase 338-2 "sort Ship Mode in descending order by sum of Sales" that include the data field "Ship Mode." The computing device 200 replaces the data field in the phrases 338-1 and 338-2 with the new data field "Ship Mode." This is illustrated in FIG. 5B, in which phrases 516 include a first updated phrase 516-1 "by Ship Status" and a second updated phrase 516-2 "sort Ship Status in descending order by sum of Sales." The computing device generates a data visualization 512 based on the new data field "Ship Status." The computing device then displays the data visualization 512.

In some instances, the method 1000 further comprises: receiving (1078) user selection of the first term in the first region. In response (1080) to the user selection, the computing device 200 displays (1082) a date widget. For example, in FIG. 9D, the computing device receives user selection of the term 922 "in the last 18 quarters" in the region 306. In response to the user selection of the term 922, the computing device displays a widget 924 (e.g., a date widget), as illustrated in FIG. 9E.

In some instances, the computing device 200 further displays (1088) in the date widget a range of dates corresponding to the time range. For example, in FIG. 9E, the computing device displays, in the widget 924, a range of dates 926 "4/1/2015 to 9/30/2019" corresponding to the time range "in the last 18 quarters."

In some instances, the range of dates includes (1090) past dates. See, e.g., the elements 928 and 934 in FIGS. 9E and 9H.

In some instances, the range of dates includes (1092) future dates. See, e.g., the elements 932 and 936 in FIGS. 9E and 9H.

In some instances, the date widget includes (1084) a plurality of user-selectable time options. Each of the options corresponds to a different range of dates. See, e.g., the elements 928, 930, 932, 934, and 936 in FIGS. 9E and 9H.

In some instances, the plurality of user-selectable options includes (1086) a first option having a predefined time range (e.g., the option 928 "Previous year", the option 930 "This year" and the option 932 "Following year" in FIG. 9H) and a second option having a user-defined time range (See, e.g., the option 934 "last [X] years" and the option 936 "next [X] years" in FIG. 9H, where the user is able to specify the value for X).

In some instances, the method 1000 further comprises receiving (1094) a user selection of a time option. In response to the user selection, the computing device 200 displays (1096) in the date widget an updated range of dates corresponding to the time option. For example, as illustrated in FIG. 9I, the computing device receives user selection of the option 934 "Last 4 years." In response to the user selection, the computing device displays in the widget 924 an updated range 926 of dates "1/1/2016 to 12/31/2019" corresponding to the past four years.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of using natural language for updating visual analysis of datasets, comprising:
at a computing device having a display, one or more processors, and memory storing one or more programs configured for execution by the one or more processors:
displaying a data visualization based on data fields in a dataset retrieved from a database;
displaying one or more first phrases in a first region, wherein each of the one or more first phrases includes one or more first field names of the data fields in the dataset, and the one or more first phrases define the data visualization;
receiving a first user input in a second region, distinct from the first region, to specify a natural language command related to the displayed data visualization;
in response to receiving the first user input:
identifying one or more analytical expressions representing the natural language command, each of the analytical expressions including a respective one or more of the first field names of the data fields in the dataset; and
displaying one or more proposed actions, each proposed action to apply a respective one of the identified analytical expressions to the displayed data visualization;
receiving user selection of a first action of the proposed actions; and
in response to receiving the user selection:

generating an updated data visualization by applying the analytical expression corresponding to the first action;
displaying the updated data visualization; and
displaying a plurality of second phrases in the first region, wherein the plurality of second phrases includes the one or more first phrases and one or more additional phrases corresponding to the first action, and wherein the second phrases define the updated data visualizations;
receiving user input in the second region to specify a natural language command related to removing a data field with a dimension data type; and
in response to receiving the user input, removing, from display in the second region, one or more phrases of the plurality of second phrases, wherein each of the one or more phrases includes the data field with the dimension data type.

2. The method of claim 1, wherein the natural language command includes a command to sort data marks in the displayed data visualization.

3. The method of claim 1 wherein each of the additional phrases shares a second field name that is distinct from the one or more first field names.

4. The method of claim 3, wherein the additional phrases include:
a first additional phrase to sort data fields by the second field name; and
a second additional phrase consisting of an expression to group the data fields by the second field name.

5. The method of claim 1 further comprising:
receiving a second user input to modify a field name that is included in a phrase of the plurality of second phrases;
in response to the second user input:
updating the phrase with a modified field name based on the second user input; and
updating, automatically and without user intervention, a different phrase of the plurality of second phrases with the modified field name;
displaying, in the first region, the updated phrase and the updated different phrase;
generating a second data visualization based on the modified field name; and
displaying the second data visualization.

6. The method of claim 5, wherein receiving the second user input to modify the field name that is included in a phrase of the plurality of second phrases includes:
receiving user selection of the field name in the phrase in the first region;
in response to the user selection:
displaying a data widget that includes a plurality of user-selectable options, each of the user-selectable options corresponding to a field name in the dataset; and
receiving user selection of a first option of the plurality of user-selectable options, the first option corresponding to the modified field name.

7. The method of claim 1, further comprising:
receiving user input in the second region to specify a natural language command related to replacing a data field of the data visualization with a new data field; and
in response to the user input:
identifying a subset of the plurality of second phrases that includes the data field; and
replacing the data field in each of the subset with the new data field;

generating a third data visualization based on the new data field; and
displaying the third data visualization.

8. The method of claim 1, wherein the one or more first phrases and the one or more additional phrases share a common field name.

9. A computing device, comprising:
one or more processors;
memory coupled to the one or more processors;
a display; and
one or more programs stored in the memory and configured for execution by the one or more processors, the one or more programs comprising instructions for:
displaying a data visualization based on data fields in a dataset retrieved from a database;
displaying one or more first phrases in a first region, wherein each of the one or more first phrases includes one or more first field names of the data fields in the dataset, and the one or more first phrases define the data visualization;
receiving a first user input in a second region, distinct from the first region, to specify a natural language command related to the displayed data visualization;
in response to receiving the first user input:
identifying one or more analytical expressions representing the natural language command, each of the analytical expressions including a respective one or more of the first field names of the data fields in the dataset; and
displaying one or more proposed actions, each proposed action to apply a respective one of the identified analytical expressions to the displayed data visualization;
receiving user selection of a first action of the proposed actions;
in response to receiving the user selection:
generating an updated data visualization by applying the analytical expression corresponding to the first action;
displaying the updated data visualization; and
displaying a plurality of second phrases in the first region, wherein the plurality of second phrases includes the one or more first phrases and one or more additional phrases corresponding to the first action, and wherein the second phrases define the updated data visualization;
receiving a second user input to modify a field name that is included in a phrase of the plurality of second phrases; and
in response to receiving the second user input:
updating the phrase with a modified field name based on the second user input;
updating, automatically and without user intervention, a different phrase of the plurality of second phrases with the modified field name;
displaying, in the first region, the updated phrase and the updated different phrase;
generating a second data visualization based on the modified field name; and
displaying the second data visualization.

10. The computing device of claim 9, wherein:
the natural language command includes a command to filter the displayed data visualization by a date field; and
the one or more additional phrases includes a phrase comprising the date field and a first term corresponding to a time range.

11. The computing device of claim 10, the one or more programs further comprising instructions for:
    receiving user selection of the first term in the first region; and
    in response to the user selection:
        displaying a date widget; and
        displaying, in the date widget, a first date corresponding to a start date and a second date corresponding to a stop date in accordance with the time range.

12. The computing device of claim 11, wherein the date widget includes a plurality of user-selectable time options, each of the user-selectable time options corresponding to a different range of dates.

13. The computing device of claim 12, wherein the plurality of user-selectable time options includes a first option having a predefined time range and a second option having a user-defined time range.

14. The computing device of claim 12, the one or more programs further comprising instructions for:
    receiving user selection of a time option; and
    in response to the user selection, displaying, in the date widget, an updated start date and an updated stop date corresponding to the time option.

15. The computing device of claim 9, the one or more programs further comprising instructions for:
    receiving user input in the second region to specify a natural language command related to removing a data field with a dimension data type; and
    in response to the user input, removing, from display in the second region, one or more phrases of the plurality of second phrases, wherein each of the one or more phrases includes the data field with the dimension data type.

16. The computing device of claim 9, the one or more programs further comprising instructions for:
    receiving user input in the second region to specify a natural language command related to replacing a data field of the data visualization with a new data field; and
    in response to the user input:
        identifying a subset of the plurality of second phrases that includes the data field; and
        replacing the data field in each of the subset with the new data field;
        generating a third data visualization based on the new data field; and
        displaying the third data visualization.

17. A non-transitory computer readable storage medium storing one or more programs, the one or more programs comprising instructions, which when executed by a computing device, cause the computing device to perform operations comprising:
    displaying a data visualization based on data fields in a dataset retrieved from a database;
    displaying one or more first phrases in a first region, wherein each of the one or more first phrases includes one or more first field names of the data fields in the dataset, and the one or more first phrases define the data visualization;
    receiving a first user input in a second region, distinct from the first region, to specify a natural language command related to the displayed data visualization;
    in response to receiving the first user input:
        identifying one or more analytical expressions representing the natural language command, each of the analytical expressions including a respective one or more of the first field names of the data fields in the dataset; and
        displaying one or more proposed actions, each proposed action to apply a respective one of the identified analytical expressions to the displayed data visualization;
    receiving user selection of a first action of the proposed actions;
    in response to receiving the user selection:
        generating an updated data visualization by applying the analytical expression corresponding to the first action;
        displaying the updated data visualization; and
        displaying a plurality of second phrases in the first region, wherein the plurality of second phrases includes the one or more first phrases and one or more additional phrases corresponding to the first action, and wherein the second phrases define the updated data visualization;
    receiving user input in the second region to specify a natural language command related to removing a data field with a dimension data type; and
    in response to receiving the user input, removing, from display in the second region, one or more phrases of the plurality of second phrases, wherein each of the one or more phrases includes the data field with the dimension data type.

18. The non-transitory computer readable storage medium of claim 17, wherein each of the one or more first phrases is visually distinguished from the one or more additional phrases.

19. The non-transitory computer readable storage medium of claim 17, wherein each of the one or more first phrases is selectable independently of the one or more additional phrases.

20. The non-transitory computer readable storage medium of claim 17, wherein the one or more proposed actions includes a proposed action that modifies the first user input.

21. The non-transitory computer readable storage medium of claim 17, wherein:
    the first user input includes a field name corresponding to a first data field in the dataset; and
    at least one of the one or more proposed actions includes modifying representation of the first data field in the data visualization.

22. The non-transitory computer readable storage medium of claim 17, wherein at least one of the one or more proposed actions includes modifying representation of a first data field in the data visualization, and the first data field corresponds to a field name not included in the natural language command.

23. The non-transitory computer readable storage medium of claim 17, wherein each of the analytical expressions is an aggregate expression, a group expression, a filter expression, a limit expression, or a sort expression.

* * * * *